(12) United States Patent
Mei et al.

(10) Patent No.: US 9,123,168 B2
(45) Date of Patent: Sep. 1, 2015

(54) OUTPUT ORDERING OF DOMAIN COORDINATES FOR TESSELLATION

(71) Applicant: QUALCOMM Incorporated, San Diego, CA (US)

(72) Inventors: Chunhui Mei, San Diego, CA (US); Nariman Moezzi Madani, San Diego, CA (US); Vineet Goel, Winter Park, FL (US); Usame Ceylan, Orlando, FL (US); Guofang Jiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 13/754,005

(22) Filed: Jan. 30, 2013

(65) Prior Publication Data

US 2014/0210819 A1    Jul. 31, 2014

(51) Int. Cl.
*G06T 15/30*  (2011.01)
*G06T 17/20*  (2006.01)
*G06T 15/00*  (2011.01)

(52) U.S. Cl.
CPC ............... *G06T 17/20* (2013.01); *G06T 15/005* (2013.01)

(58) Field of Classification Search
CPC ....... G06T 17/20; G06T 15/005; G06T 15/40; G06T 2200/28; G06T 2210/52

USPC ........................................................ 345/423
See application file for complete search history.

(56) References Cited

U.S. PATENT DOCUMENTS

| | | |
|---|---|---|
| 2010/0214294 A1 | 8/2010 | Li et al. |
| 2010/0253683 A1 | 10/2010 | Munkberg et al. |
| 2011/0057931 A1 | 3/2011 | Goel et al. |
| 2011/0128285 A1 | 6/2011 | Gong |
| 2011/0267346 A1 | 11/2011 | Howson |
| 2011/0310102 A1 | 12/2011 | Chang |

OTHER PUBLICATIONS

Hanika, et al., "Two-Level Ray Tracing with Reordering for Highly Complex Scenes", Jun. 2010, XP002721770, pp. 145-152.
International Search Report and Written Opinion—PCT/US2013/076655—ISA/EPO—Mar. 26, 2014, 12 pp.
Loop, et al., "Approximating Subdivision Surfaces with Gregory Patches for Hardware Tessellation", Dec. 1, 2009, XP002721769, 9 pp.
Storsjo, "Efficient Triangle Reordering for Improved Vertex Cache Utilisation in Realtime Rendering", May 13, 2008, XP002721768, 100 pp.

*Primary Examiner* — Peter Hoang
(74) *Attorney, Agent, or Firm* — Shumaker & Sieffert, P.A.

(57) ABSTRACT

Systems and methods for a tessellation are described. For tessellation, a tessellation unit may divide a domain into a plurality of portions, where at least one portion is a contiguous portion. The tessellation unit may output domain coordinates of primitives along diagonal strips within the contiguous portion to increase the likelihood that patch coordinates that correspond to the domain coordinates are stored in a reuse buffer.

26 Claims, 26 Drawing Sheets

OUTPUT ORDERING OF DOMAIN COORDINATES FOR TESSELLATION

TECHNICAL FIELD

This disclosure relates to techniques for graphics processing, and more specifically to tessellation in graphics processing.

BACKGROUND

A graphics processing unit (GPU) may implement a graphics processing pipeline that includes a tessellation stage. The tessellation stage converts a surface into a plurality of primitives on the GPU, resulting in a more detailed surface. For example, the GPU can receive information for a coarse surface, and generate a high resolution surface, rather than receiving information for the high resolution surface. Receiving information for the high resolution surface, rather than the coarse surface, may be bandwidth inefficient because the amount of information needed to define the high resolution surface may be much greater than the amount of information needed to define the coarse surface.

SUMMARY

In general, the techniques described in this disclosure are directed to a sequence in which a tessellation unit outputs domain coordinates of primitives, generated during tessellation, within a domain. For example, the tessellation unit may divide a domain into a plurality of portions, and at least one of the portions may be a contiguous portion. The tessellation unit may output the domain coordinates of primitives arranged in diagonal strips, where the diagonal strips reside within the contiguous portion.

In one example, the disclosure describes a method for tessellation. The method includes dividing, with a tessellation unit, a domain into a plurality of portions. In this example, at least one of the portions is a contiguous portion. The method also includes outputting, with the tessellation unit, domain coordinates of primitives within a first diagonal strip that is within the contiguous portion, and outputting, with the tessellation unit, domain coordinates of primitives within a second diagonal strip that is within the contiguous portion. In this example, the second diagonal strip is one of parallel with the first diagonal strip, or tangent with the first diagonal strip. The method also includes outputting, with the tessellation unit, domain coordinates of primitives within a third diagonal strip that is within the contiguous portion. In this example, the third diagonal strip is parallel with at least the first diagonal strip. Also, in this example, a number of primitives within the third diagonal strip is different than a number of primitives within the first diagonal strip and the second diagonal strip.

In one example, the disclosure describes a device that includes a graphics processing unit (GPU) comprising a tessellation unit. The tessellation unit is configured to divide a domain into a plurality of portions. In this example, at least one of the portions is a contiguous portion. The tessellation unit is also configured to output domain coordinates of primitives within a first diagonal strip that is within the contiguous portion, and output domain coordinates of primitives within a second diagonal strip that is within the contiguous portion. In this example, the second diagonal strip is one of parallel with the first diagonal strip, or tangent with the first diagonal strip. The tessellation unit is also configured to output domain coordinates of primitives within a third diagonal strip that is within the contiguous portion. In this example, the third diagonal strip is parallel with at least the first diagonal strip. Also, in this example, a number of primitives within the third diagonal strip is different than a number of primitives within the first diagonal strip and the second diagonal strip. The device also includes a reuse buffer configured to store patch coordinates that correspond to one or more of the outputted domain coordinates of primitives within the first, second, and third diagonal strips.

In one example, the disclosure describes a device comprising a graphics processing unit (GPU). The GPU includes means for dividing a domain into a plurality of portions. In this example, at least one of the portions is a contiguous portion. The GPU also includes means for outputting domain coordinates of primitives within a first diagonal strip that is within the contiguous portion, and means for outputting domain coordinates of primitives within a second diagonal strip that is within the contiguous portion. In this example, the second diagonal strip is one of parallel with the first diagonal strip, or tangent with the first diagonal strip. The GPU also includes means for outputting domain coordinates of primitives within a third diagonal strip that is within the contiguous portion. In this example, the third diagonal strip is parallel with at least the first diagonal strip. Also, in this example, a number of primitives within the third diagonal strip is different than a number of primitives within the first diagonal strip and the second diagonal strip.

In one example, the disclosure describes a computer-readable storage medium comprising instruction stored thereon that when executed cause one or more processors to divide a domain into a plurality of portions. In this example, at least one of the portions is a contiguous portion. The instructions also cause the one or more processors to output domain coordinates of primitives within a first diagonal strip that is within the contiguous portion, and output domain coordinates of primitives within a second diagonal strip that is within the contiguous portion. In this example, the second diagonal strip is one of parallel with the first diagonal strip, or tangent with the first diagonal strip. The instructions also cause the one or more processors to output domain coordinates of primitives within a third diagonal strip that is within the contiguous portion. In this example, the third diagonal strip is parallel with at least the first diagonal strip. Also, in this example, a number of primitives within the third diagonal strip is different than a number of primitives within the first diagonal strip and the second diagonal strip.

The details of one or more examples are set forth in the accompanying drawings and the description below. Other features, objects, and advantages will be apparent from the description and drawings, and from the claims.

DETAILED DESCRIPTION

Figure 1:
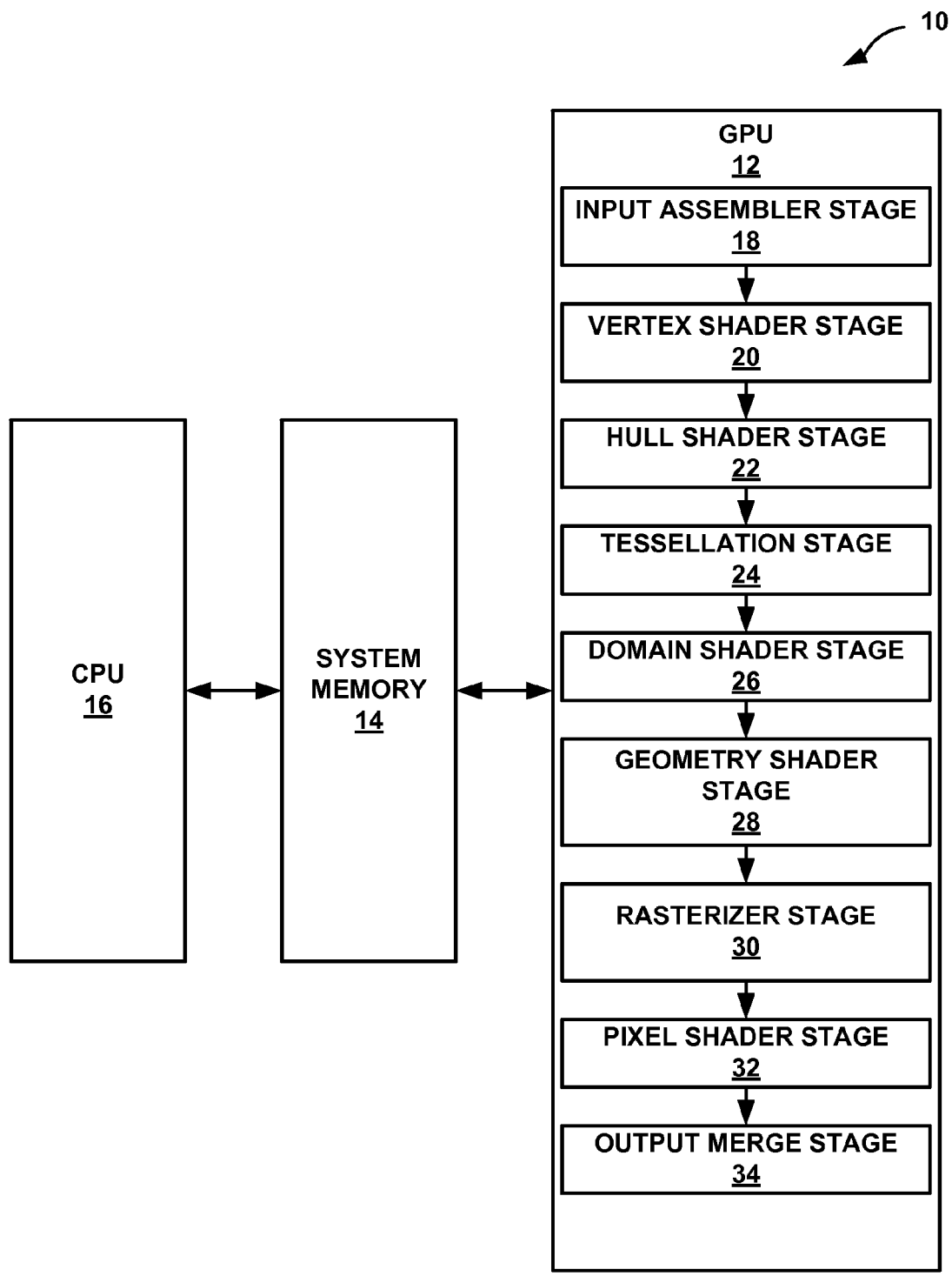
FIG. 1 is a conceptual diagram illustrating an example of a graphics processing unit (GPU) that may implement an example of a graphics processing pipeline in accordance with one or more examples described in this disclosure.

Modern mobile devices, such as laptop computer, tablet computers, smartphones, and digital media players, include a CPU (Central Processing Unit), a graphics processing unit (GPU) and system memory. When rendering graphics as part of executing an application, the CPU transmits instructions and graphics data to the GPU. In some examples, the graphics data may be in the form of vertices, which may comprise one or more data structures that describes a point in 2D or 3D space.

The application executing on the CPU may communicate with the GPU in accordance with an application programming interface (API). For instance, the application may communicate with the GPU in accordance with the DirectX® API developed by Microsoft® or the OpenGL® API developed by the Khronos Group, as two examples. For purposes of illustration and understanding, the techniques described in this disclosure are generally described in the context of the DirectX and OpenGL APIs. However, aspects of this disclosure should not be considered limited to the DirectX and OpenGL APIs, and the techniques described in this disclosure may be extended to other APIs as well.

DirectX and OpenGL each define graphics processing pipelines that are to be implemented by a GPU. These graphics processing pipelines may include a combination of programmable stages, as well as fixed-function stages. Some recent versions of the APIs, such as the Direct3D 11 API and the OpenGL 4.x API, include a tessellation process that is to be performed by the GPU.

The tessellation process refers to dividing a portion (referred to as patch) of a surface of an object into a plurality of smaller portions, and interconnecting the smaller portions together. This results in a more highly detailed surface, as compared to the surface prior to tessellation. Tessellation allows the application executing on the CPU to define the surface with low resolution, which may require few points, and allows the GPU to generate a higher resolution surface.

To implement tessellation, the GPU may include a tessellation unit, which may be a fixed-function unit, although aspects of this disclosure do not require the tessellation unit to be a fixed-function unit. Examples of the tessellation unit include the tessellation stage (in the DirectX pipeline) and the primitive generator (in the OpenGL 4.x pipeline). The tessellation unit may be configured to construct primitives within a domain. This domain should not be confused with the patch. The patch is a portion of the surface of an object that is to be rendered. The domain may be considered as a template within which the tessellation unit constructs primitives, and is separate from the patch. The tessellation unit may define the vertices of the primitives in domain coordinates. Domain coordinates are based on a coordinate system that is local to the tessellation unit and used by the tessellation unit to define points within the domain.

A domain shader (in the DirectX pipeline) or a tessellation evaluation shader (in the OpenGL 4.x pipeline) may receive the domain coordinates from the tessellation unit and transforms the domain coordinates to patch coordinates. Patch coordinates are based on a coordinate system used by the GPU for defining points within the patch. The domain shader or tessellation evaluation shader may be considered as mapping the domain coordinates of vertices of the primitives within the domain to points within the patch (e.g., vertices of primitives within the patch), and interconnecting these mapped points within the patch to add resolution to the patch (e.g., add primitives within the patch to add resolution to the patch).

In some examples, the tessellation unit may output the domain coordinates for each vertex of a primitive to a reuse buffer, sometimes referred to as a post-transformation vertex cache (PTVC). A controller may determine whether the reuse buffer stores patch coordinates for the domain coordinates outputted by the tessellation unit. If the controller determines that the reuse buffer does not store the patch coordinates for the domain coordinates outputted by the tessellation unit, then the controller may cause an instance of the domain shader or tessellation evaluation shader to execute to transform the domain coordinates of the vertex of the primitive within the domain into the patch coordinates for a vertex of a primitive that is to be added into the patch. The controller may then store the patch coordinates in the reuse buffer. If, however, the controller determines that the reuse buffer already stores the patch coordinates for the domain coordinates outputted by the tessellation unit, the controller may not cause an instance of the domain shader or tessellation evaluation shader to execute.

In general, execution of the domain shader or tessellation evaluation shader may require substantial processing time which may slow the tessellation process. The techniques described in this disclosure relate to a sequence in which the tessellation unit may output the vertices of the primitives within the domain to increase the likelihood that the reuse buffer already stores the patch coordinates for the domain coordinates of the vertices of the primitives outputted by the tessellation unit. This may potentially result in fewer instances of the execution of the domain shader or the tessellation evaluation shader, which in turn may result in a faster completion of the tessellation process, as compared to other techniques.

In the techniques described in this disclosure, the tessellation unit may output the vertices of the primitives in the domain in a particular sequence. As described in more detail, the tessellation unit may output the vertices of primitives within a portion of the domain. For example, the tessellation unit may divide the domain into a plurality of portions. At least one of the portions may encompass a contiguous area within the domain, and may be referred to as a contiguous portion. As described in more detail, a contiguous portion of the domain may mean that there is no gap, within the portion, that excludes primitives within the domain.

As described in more detail, the tessellation unit may output vertices of primitives, where the primitives are arranged in one or more diagonal strips within the contiguous portion. For instance, the tessellation unit may output vertices of primitives that reside within a first diagonal strip, where the first diagonal strip resides within the contiguous portion.

After outputting the vertices of primitives that reside within the first diagonal strip, the tessellation unit may output the vertices of primitives that reside within a second diagonal strip, where the second diagonal strip resides within the contiguous portion. In some examples, the second diagonal strip may be parallel with the first diagonal strip. In other examples, the second diagonal strip may be tangent with the first diagonal strip.

After outputting vertices of primitives that reside within the second diagonal strip, the tessellation unit may then output vertices of primitives that reside within a third diagonal strip, and so forth. The third diagonal strip may be parallel with the first diagonal strip. The tessellation unit may output primitives within the diagonal strips until the tessellation unit completes outputting the primitives within one of the portions of the domain. The tessellation unit may output primitives within another portion in the domain in a substantially similar manner.

FIG. 1 is a conceptual diagram illustrating an example of a graphics processing unit (GPU) that may implement an example of a graphics processing pipeline in accordance with one or more examples described in this disclosure. FIG. 1 illustrates a device 10 that includes graphics processing unit (GPU) 12, system memory 14, and central processing unit (CPU) 16. Examples of device 10 include, but are not limited to, mobile wireless devices (e.g., wireless telephones), video gaming consoles that include video displays, mobile video conferencing units, laptop computers, desktop computers, tablet computers, television set-top boxes, and the like.

CPU 16 may execute various types of applications. Examples of the applications include web browsers, e-mail applications, spreadsheets, video games, or other applications that generate viewable objects for display. Instructions for execution of the one or more applications may be stored within system memory 14. CPU 16 may transmit graphics data of the generated viewable objects to GPU 12 for further processing.

For example, GPU 12 may be specialized hardware that allows for massively parallel processing, which functions well for processing graphics data. In this way, CPU 16 offloads graphics processing that is better handled by GPU 12. CPU 16 may communicate with GPU 12 in accordance with a particular application processing interface (API). Examples of such APIs include the DirectX® API by Microsoft® and the OpenGL® by the Khronos group; however, aspects of this disclosure are not limited to the DirectX and the OpenGL APIs, and may be extended to other types of APIs that have been developed, are currently being developed, or are to be developed in the future.

Figure 2:
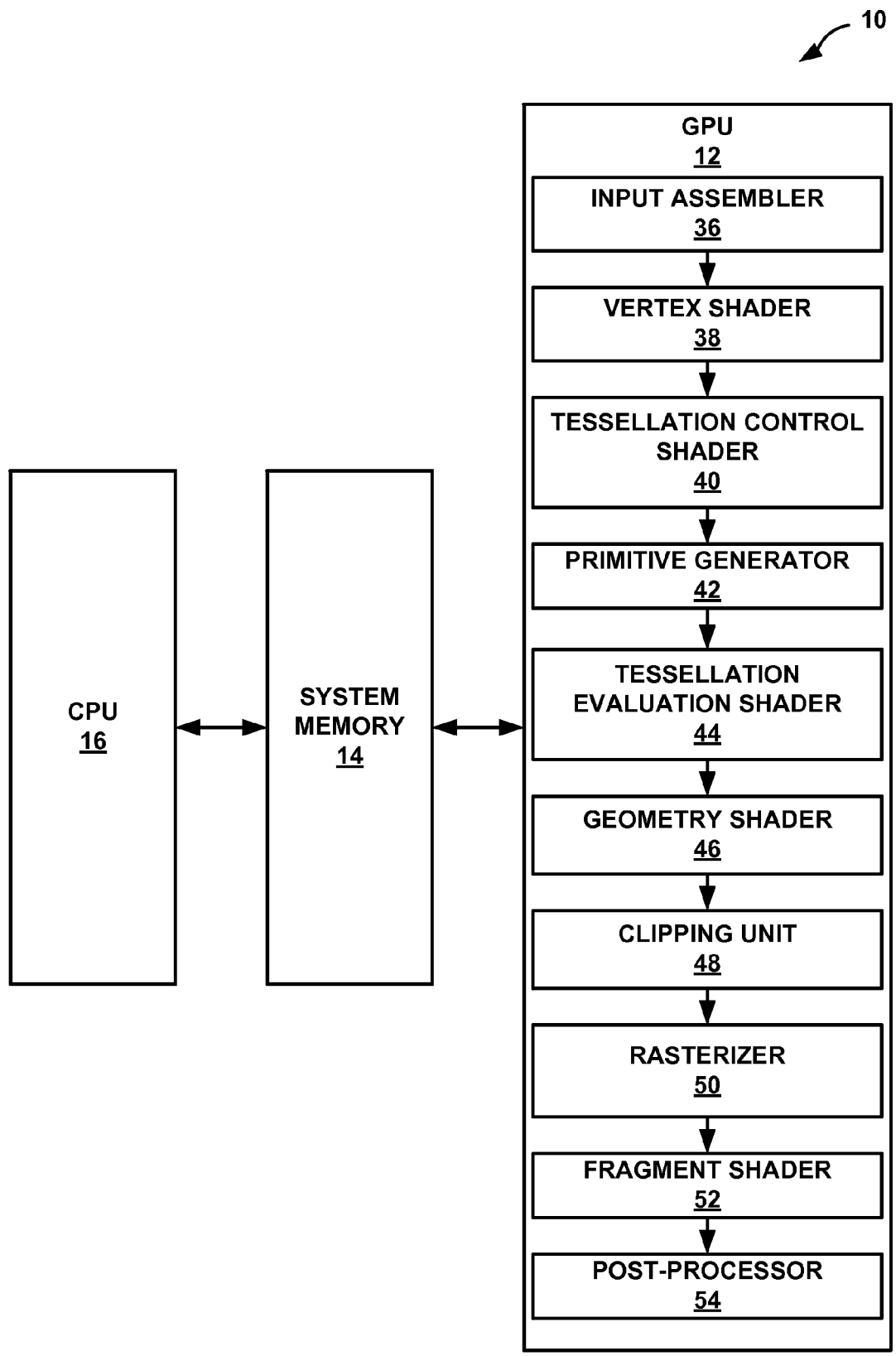
FIG. 2 is a conceptual diagram illustrating another example of a GPU that may implement another example of a graphics processing pipeline in accordance with one or more examples described in this disclosure.

In addition to defining the manner in which GPU 12 is to receive graphics data from CPU 16, the APIs may define a particular graphics processing pipeline that GPU 12 is to implement. GPU 12, in FIG. 1, illustrates the graphics processing pipeline defined by the DirectX 11.x API, such as the Direct3D 11 API. As described in more detail, FIG. 2 illustrates the graphics processing pipeline of the OpenGL 4.x API.

Examples of CPU 16 and GPU 12 include, but are not limited to, a digital signal processor (DSP), general purpose microprocessor, application specific integrated circuit (ASIC), field programmable logic array (FPGA), or other equivalent integrated or discrete logic circuitry. In some examples, GPU 12 may be specialized hardware that includes integrated and/or discrete logic circuitry that provides GPU 12 with massive parallel processing capabilities suitable for graphics processing. In some instances, GPU 12 may also include general purpose processing, and may be referred to as a general purpose GPU (GPGPU). The techniques described in this disclosure may also be applicable to examples where GPU 12 is a GPGPU.

System memory 14 may comprise one or more computer-readable storage media. Examples of system memory 14 include, but are not limited to, a random access memory (RAM), a read only memory (ROM), an electrically erasable programmable read-only memory (EEPROM), flash memory, or any other medium that can be used to carry or store desired program code in the form of instructions and/or data structures and that can be accessed by a computer or a processor.

In some aspects, system memory 14 may include instructions that cause CPU 16 and/or GPU 12 to perform the functions ascribed to CPU 16 and GPU 12 in this disclosure. Accordingly, system memory 14 may be a computer-readable storage medium having instructions stored thereon that, when executed, cause one or more processors (e.g., CPU 16 and GPU 12) to perform various functions.

System memory 14 may, in some examples, be considered as a non-transitory storage medium. The term "non-transitory" may indicate that the storage medium is not embodied in a carrier wave or a propagated signal. However, the term "non-transitory" should not be interpreted to mean that system memory 14 is non-movable or necessarily static in its content. As one example, system memory 14 may be removed from device 10, and moved to another device. As another example, a system memory, substantially similar to system memory 14, may be inserted into device 10. In certain examples, a non-transitory storage medium may store data that can, over time, change (e.g., in RAM).

The execution of the applications on CPU 16 causes CPU 16 to generate a plurality of primitives that connect together to form the viewable content. Examples of the primitives include points, lines, triangles, squares, or any other type of polygon. CPU 16 may define these primitives by their respective vertices. For example, CPU 16 may define coordinates and color values for the vertices. The coordinate values may be three-dimensional (3D) coordinates or 2D coordinates.

In some cases, CPU 16 may also generate a special type of primitive referred to as a patch. Similar to the other primitive types, a patch may be defined by a plurality of vertices, referred to as control points of a patch. Unlike other primitive types, the patch may not be any particular shape. For example, CPU 16 may interconnect the control points of the patch in any manner, so that the interconnected control points form any desired shape. For other primitive types such as triangles, CPU 16 may define the specific manner in which the vertices are interconnected (e.g., such that interconnection of the vertices results in a triangle).

Also, unlike other primitive types, the number of control points in a patch may be variable. For example, the application executing on CPU 16 may define a maximum number of control points that are allowed for a patch, or the maximum number of control points may be user-defined. In some examples, the number of control points in a patch may be one to thirty-two control points; however, the techniques described in this disclosure are not so limited.

CPU 16 may utilize the control patch for purposes of tessellation. As described above, a tessellation process refers to CPU 16 defining a portion of a surface of a viewable object in low resolution, and tessellating the portion to generate a higher resolution version of the surface. For example, CPU 16 may define control points of the patch such that when the control points are interconnected the patch forms a portion of a surface of a viewable object. If a surface were to be formed only from the control points of the patch, the surface may not appear with high resolution and may appear jagged. With tessellation, additional primitives are added to the patch, such that when the primitives are interconnected, the interconnection of these primitives adds detail to the patch, which increases the resolution of the patch and results in higher quality viewable content.

GPU 12 may be configured to implement tessellation. In this way, CPU 16 may not need to define the vertices for all the additional primitives needed to generate the higher resolution patch, which saves on computations performed by CPU 16. Also, CPU 16 may need to transmit fewer vertices (e.g., the vertices of the control points, and not the vertices of the primitives to be added), and GPU 12 may correspondingly need to receive fewer vertices, which promotes bandwidth efficiency due to fewer accesses to system memory 14.

To perform graphics operations, GPU 12 may implement a graphics processing pipeline. The graphics processing pipeline includes performing functions as defined by software or firmware executing on GPU 12 and performing functions by fixed-function units that are hardwired to perform specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility, such as programmable functional flexibility provided by software or firmware.

As indicated above, the graphics processing pipeline illustrated in FIG. 1 is a graphic processing pipeline substantially as defined by Direct3D 11. In this example, GPU 12 may include one or more of input assembler stage 18, vertex shader stage 20, hull shader stage 22, tessellation stage 24, domain shader stage 26, geometry shader stage 28, rasterizer stage 30, pixel shader stage 32, and output merge stage 34. GPU 12 may include more stages than those illustrated, and in some examples, GPU 12 may not necessarily include all of the illustrated stages. Also, the specific ordering of the stages is provided for purposes of illustration and should not be considered limiting.

In techniques described in this disclosure, CPU 16 may output the control points of a patch to system memory 14. GPU 12 may then retrieve the control points from system memory 14. In this manner, CPU 16 may transmit the control points to GPU 12. As used in this disclosure, CPU 16 transmitting to GPU 12, or GPU 12 receiving from CPU 16, may generally include CPU 16 writing to system memory 14, from which GPU 112 reads. Alternatively, it may be possible for CPU 16 to directly transmit to GPU 12, and for GPU 12 to directly receive from CPU 16.

Input assembler stage 18 may read the control points from system memory 14 as defined by CPU 16, and assemble the control points to form the patch. For instance, input assembler stage 18 may read the coordinates, color values, and other such information of the control points. The coordinates, color values, and other such information may be commonly referred to as attributes of the control points. Based on the attributes of the control points, input assembler stage 18 may determine the general layout of the patch. In this manner, input assembler stage 18 may assemble the control points to form the patch. Input assembler stage 18 may be a fixed-function logic unit or a programmable unit.

Vertex shader stage 20 may process the vertices (e.g., the control points of the patch) from input assembler stage 18. For example, vertex shader stage 20 may perform per-vertex operations such as transformations, skinning, morphing, and per-vertex lighting. Vertex shader stage 20 may be a shader.

Hull shader stage 22 receives the control points of the patch, as processed by vertex shader stage 20, process the control points, and outputs control points for a processed patch. In other words, hull shader stage 22 receives an input patch, as processed by vertex shader stage 20, processes the input patch, and outputs an output patch. Hull shader stage 22 may perform various functions for processing the input patch. For example, hull shader stage 22 may modify the coordinates of the control points to change the locations of the control points, or may even add or delete control points.

In addition, hull shader stage 22 may determine values that indicate how many primitives are to be added to the patch generated by hull shader stage 22 (i.e., the output patch). Hull shader stage 22 may utilize various criteria to determine how many primitives are to be added to the patch. Described below are two example criteria that hull shader stage 22 may utilize to determine how many primitives are to be added to the patch. However, aspects of this disclosure are not so limited, and hull shader stage 22 may utilize any criteria to determine how many primitives should be added to the patch.

As one example, hull shader stage 22 may utilize information indicative of the depth of the patch to determine how many primitives should be added. For instance, a patch that is further away, from the perspective of the viewer, may not need high resolution because objects further in distance appear blurry in real life. However, a patch that is closer, from the perspective of the viewer, may need higher resolution because objects closer in distance appear sharper in real life. In this example, hull shader stage 22 may determine that fewer primitives should be added to the patch that is further away, and more primitives should be added to the patch that is closer, relative to one another.

As another example, hull shader stage 22 may determine how many primitives should be added based on the size of the patch. For a smaller sized patch, hull shader stage 22 may determine that fewer primitives should be added because the patch encompasses a smaller area. For a larger sized patch, hull shader stage 22 may determine that more primitives should be added because the patch encompasses a larger area.

Based on a determination of how many primitives should be added, hull shader stage 22 may output a domain type and values that indicate how many primitives are to be added to the patch to tessellation stage 24. The values that indicate how many primitives are to be added to the patch, in the Direct3D 11 API, are referred to as tessfactors.

The domain may be a considered as a template shape that tessellation stage 24 uses for tessellation purposes. Examples of the domain type include a line, a triangle, a quad (e.g., a four sided polygon), or any other type of polygon. The domain may be a two-dimensional (2D) shape, even if the patches define a three-dimensional (3D) surface or a 2D surface. When the domain is a line, the domain may be a one-dimensional (1D) shape (i.e., a line), even if the patches define a 3D surface, a 2D surface, or a 1D surface. For purposes of illustration, the techniques described in this disclosure are described with respect to the domain being a 2D surface. For instance, the techniques are described with domain shapes that are the triangle or quad.

In some examples, hull shader stage 22 may not explicitly indicate the domain type. Rather, tessellation stage 24 may determine the domain type based on the number of transmitted tessfactors. For example, the presence of four tessfactors may indicate that the domain type is a triangle domain type, and the presence of six tessfactors may indicate that the domain type is a quad domain type.

In some examples, a quad domain may be defined by two-dimensional (2D) Cartesian coordinates (u, v). In some examples, a triangle domain may be defined by Barycentric coordinates. Barycentric coordinates utilize three coordinates to identify any point within the triangle. For example, the vertices of the triangle domain may be defined as (u, v, w), as described below in more detail. The location of any point within the triangle is defined by vertex weighting that indicates its proximity to a vertex. For instance, the closer a point is to a vertex, the higher its vertex weighting, and the further away the point is from the vertex, the lower its vertex weighting.

As an example, assume the vertices of the triangle are defined with Barycentric coordinates (u, v, w) as follows: (1, 0, 0), (0, 1, 0), and (0, 0, 1). In this example, the center point is located at (1/3, 1/3, 1/3) because the center point is equally distant from each of the vertices. Also, with the given definition of the vertex coordinates, in this example, the sum of the u, v, and w coordinates for any point within the triangle domain should equal one.

The Cartesian and Barycentric coordinates are described for purposes of illustration only, and should not be considered limiting. In other examples, it may be possible to define the quad domain with Barycentric coordinates or Cartesian coordinates, and the triangle domain with Cartesian coordinates or Barycentric coordinates. In general, a domain, of any type, may be defined using any coordinate system.

Tessellation stage 24 may tessellate the domain into a plurality of primitives (e.g., construct a plurality of primitives within the domain). It should be understood that, in this example, tessellation stage 24 is not tessellating the patch outputted by hull shader stage 22 into primitives, but rather tessellating the domain into the primitives. In some examples, tessellation stage 24 may not even have access to the patch outputted by hull shader stage 22. Tessellation stage 24 may be a fixed-function unit, although aspects of this disclosure need not be so limited.

Tessellation stage 24 may utilize the tessfactors outputted by hull shader stage 22 to tessellate the domain into a plurality of primitives. For example, in addition to defining the domain type (e.g., triangle or quad) the tessfactors may define how many rings are to be included within the domain.

A ring may be a series of concentric shapes within the domain, where the concentric shapes are the same shape as the domain shape. For example, if the domain shape is a quad, the perimeter of the quad may be considered as the outer ring. Hull shader stage 22 may define the number of inner rings, which may be series of smaller sized quads that reside within the quad domain. Similarly, if the domain shape is a triangle, the perimeter of the triangle may be considered as the outer ring, and the inner rings may be series of smaller sized triangles that reside within the triangle domain.

In addition to defining the number of rings within a domain, the tessfactors define the points that reside along the rings. The points that reside along the rings should not be confused with control points. The control points define the patch. The points that reside along the rings are points generated by tessellation stage 24 based on the tessfactors. These points are generated within the domain, and not within the patch.

Also, it is these points that tessellation stage 24 connects together to construct the plurality of primitives within the domain. For example, assume that the primitives that tessellation stage 24 will construct are triangles. In this example, tessellation stage 24 may connect one point that resides along the outer ring, with two points that reside along the inner ring to form a triangle primitive. Alternatively, tessellation stage 24 may connect two points that reside along the outer ring with one point that resides along the inner ring to form a triangle primitive. In this way, by defining the domain type, the number of rings within the domain, and the number of points along the outer and inner rings, hull shader stage 22 may define the number of primitives that tessellation stage 24 should construct within the domain.

In some examples, the number of points that can reside along an edge of ring may be one point to sixty-five points. For example, if the domain type is a triangle, than there may be up to 65 points per edge of the triangle domain. Similarly, if the domain type is a quad, than there may be up to 65 points per edge of the quad. However, the techniques described in this disclosure are not limited to an edge having a maximum of sixty-five points.

Furthermore, the number of points that reside along a ring may be different for outer and inner rings. For example, the number of points that reside along an edge of the outer ring may be more than or less than the number points that reside along an edge of the inner ring. It may also be possible that number of points that reside along the edge of the outer ring and the inner ring are the same number of points.

Moreover, the number points along an edge of the same ring may be different. For example, for a triangle domain, the number of points that reside along one of the edges may be different than the number of points that reside along one other edge, or both edges. Similarly, for a quad domain, the number of points that reside along one of the edges may be different than the number of points that reside along one, two, or all three other, remaining edges. It may also be possible for each of the edges of the rings to have the same number of points.

As described above, in some examples, tessellation stage 24 may not divide the patch into a plurality of primitives. Accordingly, in some examples, tessellation stage 24 may not receive any information such as the number of control points, the locations of the control points, or the size of the patch. Without any information as to the size of the patch and the locations of the control points, tessellation stage 24 may not be able to define the size of the domain that is used or the specific coordinates for the vertices of the domain.

To address this, tessellation stage 24 may rely upon a normalized coordinate system for defining the vertices of the domain, as well as for determining the locations of the interconnected points within the domain. As one example of the normalized coordinates, tessellation stage 24 may define the vertices of a quad domain, in u, v coordinates, as: (0, 0), (1, 0), (0, 1), and (1, 1), which is a unit square. Tessellation stage 24 may define the vertices of a triangle domain, in u, v, w coordinates, as: (0, 0, 1), (0, 1, 0), and (1, 0, 0), which is an equilateral triangle. Tessellation stage 24 may determine the coordinates for the interconnected vertices of the plurality of primitives in this normalized coordinate system. In other words, tessellation stage 24 may define the coordinates of the vertices of the primitives within the domain using a local normalized coordinate system. In this disclosure, the coordinates of the vertices as defined by tessellation stage 24 may be referred to as domain coordinates because these coordinate are with respect to a normalized coordinate system for the domain.

In the illustrated graphics pipeline, domain shader 26 may receive the domain coordinates for the vertices of the plurality of primitives in the normalized coordinate system (e.g., the u, v coordinates or the u, v, w coordinates, as applicable). The function of domain shader stage 26 may be to map the domain coordinates of the vertices, as received from tessellation stage 24, on to the patch. For example, while tessellation stage 24 may not receive information of the patch as defined by hull shader stage 22, domain shader stage 26 may receive such information from hull shader stage 22.

Domain shader stage 26 may transform the domain coordinates for a vertex of a primitive into patch coordinates of a vertex of a primitive that is to be added to the patch. The patch coordinates may be coordinates that are defined relative to the coordinate system used by GPU 12, and define points in the patch. For example, the domain coordinates of the vertex of a primitive in the domain may be based on a normalized coordinate system used to define points in a 2D domain. However, the patch may be defined in three-dimensions, and domain shader stage 26 may transform the domain coordinates of the vertex to identify a point on the patch.

For example, domain shader stage 26 may receive the coordinates of the control points of the patch from hull shader 22. With the coordinates of the control points of the patch from hull shader stage 22, domain shader stage 26 may determine the location of the vertex, as outputted by tessellation stage 24, on the patch. This identified point on the patch may be a vertex for a primitive that is added to the patch.

Figure 6:
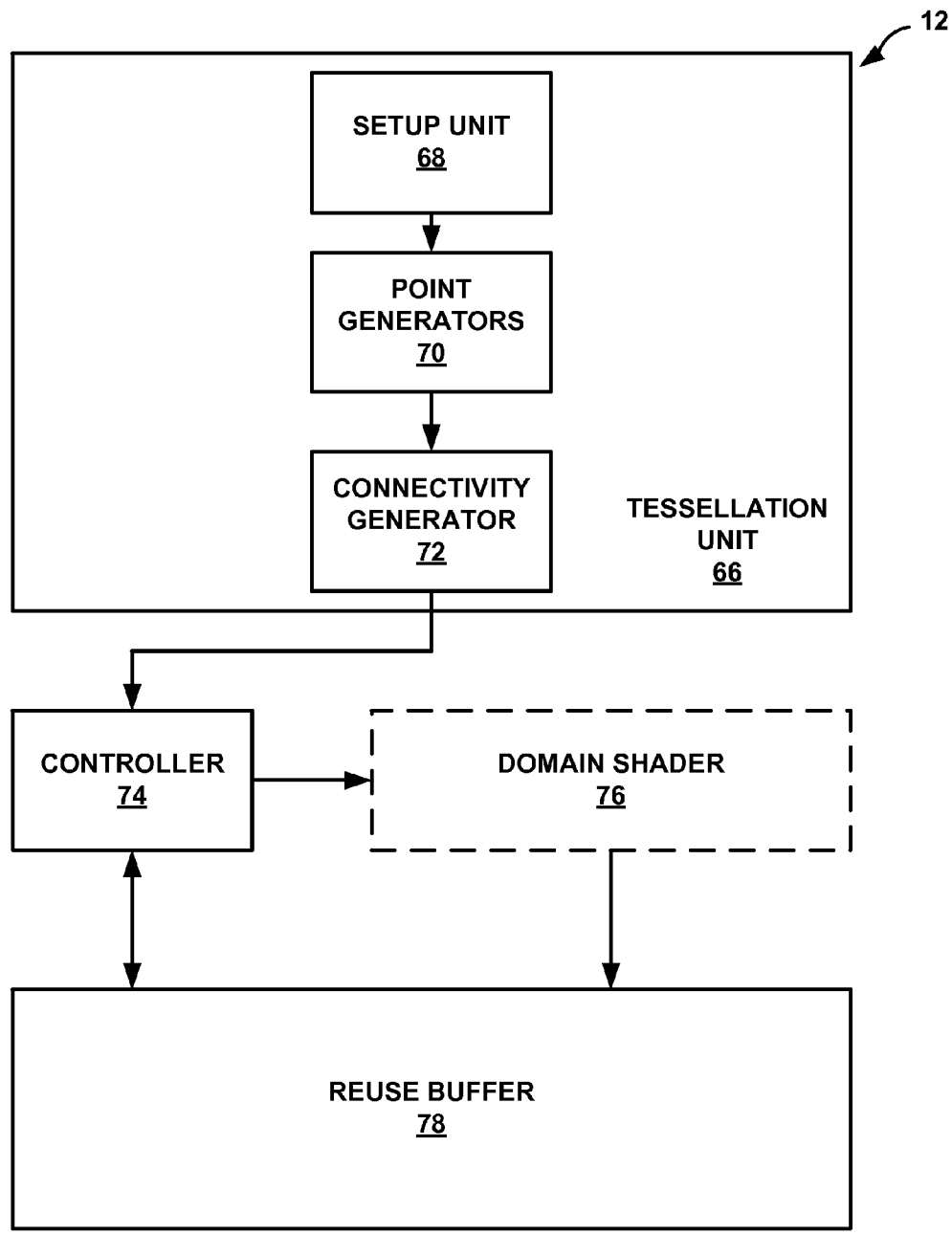
FIG. 6 is a block diagram illustrating a GPU in further detail in accordance with one or more examples described in this disclosure.

Tessellation stage 24 may output the domain coordinates for a vertex to a reuse buffer (not shown in FIG. 1, and shown in greater detail in FIG. 6). The reuse buffer may be referred to as a post-transformation vertex cache (PTVC). A controller (not shown in FIG. 1, and shown in greater detail in FIG. 6) may determine whether the reuse buffer stores patch coordinates that correspond to the domain coordinates of the vertex outputted by tessellation unit 24. As used in this disclosure, patch coordinates that correspond to the domain coordinates of the vertex outputted by tessellation unit 24 refer to patch coordinates that are generated by transforming the domain coordinates.

If the controller determines that the reuse buffer does not store the patch coordinates that correspond to the domain coordinates, the controller may execute an instantiation of domain shader stage 26. Domain shader stage 26 may receive the domain coordinates of the vertex outputted by tessellation stage 24, transform the domain coordinates to patch coordinates, and store the patch coordinates in the reuse buffer. If the controller determines that the reuse buffer stores the patch coordinates that correspond to the domain coordinates, the controller may not execute an instantiation of domain shader stage 26. In either case, the controller may then output the patch coordinates further along the graphics pipeline.

Because tessellation stage 24 outputs vertices of the plurality of primitives generated by tessellation stage 24, and domain shader stage 26 adds these primitives to the patch, the combination of hull shader stage 22, tessellation stage 24, and domain shader stage 26 together add additional primitives to the patch. This results in a mesh of primitives that are added to the patch creating a higher resolution, more detailed patch, as compared to the patch defined by CPU 16. In this manner, hull shader stage 22, tessellation stage 24, and domain shader stage 26 implement a tessellation process.

Geometry shader stage 28 receives the vertices of the primitives added to the patch by domain shader stage 26 and may further generate additional vertices for the primitives to add even more resolution. Rasterizer stage 30 receives the primitives from geometry shader stage 28 and converts the primitives into pixels for the display. For example, the primitives may be defined as vectors that indicate the interconnection of the primitives, and may be defined in a coordinate space that is independent of the display on which the image is to be displayed. Rasterizer stage 30 converts these vectors into the display coordinates, and performs any additional functions such as removing points within primitives that are occluded.

Pixel shader stage 32 receives the pixels as outputted by rasterizer stage 30 and performs post processing to assign color values to each of the pixels that are to be displayed. For example, pixel shader stage 32 may receive constant values stored in system memory 14, texture data stored in system memory 14, and any other data to generate per-pixel outputs such as color values. Pixel shader stage 32 may also output opacity values that indicate the opaqueness of the pixels.

Output merge stage 34 may perform any final pixel processing. For example, output merge stage 34 may utilize depth information to further determine whether any of the pixels should be removed from being displayed. Output merge stage 34 may also perform blending operations to generate final pixel values, which may include luma and chroma values or red-green-blue (RGB) values.

Output merge stage 34 may output the final pixel values to a frame buffer, generally located within system memory 14, but which may be located within GPU 12. A display processor (not shown) may retrieve the pixel values from the frame buffer and cause pixels of a display (not shown) of device 10 (e.g., via red, green and blue pixel components) to illuminate at specified intensity levels according to the pixel values to cause the display to display the image.

As described above, the controller may execute an instantiation of domain shader stage 26 whenever the reuse buffer does not store the patch coordinates for the corresponding domain coordinates of a vertex of a primitive within the domain. In general, execution of domain shader stage 26 may be processing-intensive and time consuming, and it may be desirable to limit the number of times domain shader stage 26 needs to execute. For example, a first primitive and a second primitive in the domain may share two vertices. In this example, after tessellation stage 24 outputs the domain coordinates of the vertices of the first primitive, the controller may execute three instantiations of domain shader stage 26 (i.e., one per vertex), and store the resulting patch coordinates in the reuse buffer. Then, after tessellation stage 24 outputs the domain coordinates for the vertices of the second primitive, the controller may execute one instantiation of domain shader stage 26. In this case, the reuse buffer may already store the patch coordinates for the two vertices that are shared between the first and second primitive. Accordingly, the controller may need to execute only one instantiation of domain shader stage 26 for the unshared vertex of the second primitive.

However, due to the limited storage capabilities of the reuse buffer, it may be possible that the patch coordinates for a vertex that is shared between two primitives is no longer stored in the reuse buffer when tessellation stage 24 outputs the domain coordinates for the shared vertex for the second time. For instance, in the previous example, due to the limited storage capabilities of the reuse buffer, it may be possible that the patch coordinates that correspond to the domain coordinates of one or both of the vertices that are shared between the first and second primitive are no longer stored in the reuse buffer when tessellation unit 24 outputs the domain coordinates of the vertices of the second primitive.

This may result in execution of instantiations of domain shader stage 26 for transforming domain coordinates that were previously transformed to patch coordinates. For instance, in the above example where the patch coordinates that correspond to the domain coordinates of the shared vertices are stored in the reuse buffer, the controller may execute only one instantiation of domain shader stage 26 to transform the domain coordinates of the unshared vertex of the second primitive to patch coordinates. However, in the above example where the patch coordinates that correspond to the domain coordinates of the shared vertices are not stored in the reuse buffer, the controller may execute three instantiation of domain shader stage 26 to transform the domain coordinates of the three vertices of the second primitive to patch coordinates.

Previously stored patch coordinates may not be available in the reuse buffer because the reuse buffer may implement a first-in-first-out replacement scheme. For example, when the reuse buffer is full (e.g., each slot within the reuse buffer stores a patch coordinate), the reuse buffer may remove (i.e., wash out) the earliest stored patch coordinates to free up storage space for the next patch coordinates that are to be stored. If the removed patch coordinates correspond to domain coordinates for a vertex of a primitive that is shared with another primitive, then the controller may cause the execution of another instantiation of the domain shader stage 26 to retransform the domain coordinates of the vertex into the patch coordinates when tessellation stage 24 outputs the vertices of the other primitive.

The techniques described in this disclosure are directed to the sequence in which tessellation stage 24 outputs vertices of the primitives. In some examples, tessellation stage 24 may output the vertices of primitives in such a sequence to increase the likelihood that shared vertices remain stored in the reuse buffer. For example, after outputting vertices of a first primitive, tessellation stage 24 may output vertices in such a sequence that vertices of the first primitive that are shared with subsequent primitives are within the reuse buffer when tessellation stage 24 outputs the vertices of these subsequent primitives.

Furthermore, the output sequence of the primitives may be such that when the reuse buffer is full, there are not many remaining primitives with a vertex whose domain coordinates correspond to the earliest stored patch coordinates. For instance, in the first-in-first-out replacement scheme, when the reuse buffer is full, the reuse buffer may remove the earliest stored patch coordinates. These patch coordinates may correspond to domain coordinates of a vertex within the primitive, where the vertex is not shared with many other primitives. In this way, even if the reuse buffer removes these patch coordinates, there may be limited impact on the number of instantiations of domain shader stage 26, as described below in more detail.

As described above, hull shader stage 22 may define the number of rings within the domain and the number of points that reside along each edge of the rings. Tessellation stage 24, in turn, may place points along the rings in the manner defined by hull shader stage 22. These points form the vertices of the primitives created by tessellation stage 24 in the domain. Tessellation stage 24 may interconnect these vertices together to form the primitives and output the domain coordinates for the vertices of these primitives.

In accordance with the techniques described in this disclosure, prior to outputting the domain coordinates for the vertices of the primitives, tessellation stage 24 may divide the domain into a plurality of portions. At least one of the portions may encompass a contiguous area within the domain, and may be referred to as a contiguous portion. In general, it may be possible for each of the portions to be contiguous portions; however, aspects of this disclosure are not so limited.

The contiguous portion may be defined by a plurality of edges. The plurality of edges forms a perimeter within the domain that tessellation stage 24 tessellates, and the portion may be the contiguous area of the domain within the perimeter. In the techniques described in this disclosure, the contiguous portion may include any primitive within the domain that falls within the perimeter of the contiguous portion.

For instance, the term contiguous means that there is no gap, within the portion, that excludes primitives within the domain. For example, if a primitive within the domain is within the perimeter of the portion, then that primitive is part of the portion. To further assist with understanding the concept of a contiguous portion, the contiguous portions should not be confused with the rings used to construct the primitives within the domain.

Some other techniques output the primitives within each of the rings used to construct the primitives. In these examples, a tessellation stage, other than tessellation stage 24, first outputs primitives along an outer ring. This outer ring forms a gap in the domain. For example, the center point within the domain falls within the area of the domain encompassed by the ring, but the tessellation stage of these other techniques excludes the center point when outputting the domain coordinates of vertices within the ring. In other words, these rings should not be considered as contiguous portions because the area within a ring is excluded from being part of the ring.

In accordance with the techniques described in this disclosure, tessellation stage 24 may output vertices of primitives, where the primitives are arranged in one or more diagonal strips within the contiguous portion. A diagonal strip of primitives includes four sides, where two of the four sides are parallel. The two parallel sides may each include at least one vertex of each of the primitives within the diagonal strip. Also, the number of vertices on each of the two parallel sides may be different.

For example, assume that a diagonal strip includes three primitives. In this example, a first side of the parallel sides of the diagonal strip may include three points, and a second side of the parallel sides of the diagonal strip may include two points. By interconnecting the three points on the first side with the two points on the second side, the tessellation unit may construct the three primitives within the diagonal strip. In this example, the three points on the first side may form three vertices, and the two points on the second side may form two vertices. Because the primitives within the diagonal strip share vertices, tessellation stage 24 may construct the three primitives using only the three vertices that reside along the first side of the parallel sides of the diagonal strip, and the two vertices that reside along the second side of the parallel sides of the diagonal strip.

In some examples, tessellation stage 24 may output vertices of primitives that reside within a first diagonal strip, where the first diagonal strip resides within the contiguous portion. After outputting the vertices of primitives that reside within the first diagonal strip, tessellation stage 24 may output the vertices of primitives that reside within a second diagonal strip, where the second diagonal strip resides within the contiguous portion.

In some examples, the second diagonal strip may be parallel with the first diagonal strip. In these examples, the number of primitives within the second diagonal strip may be different than the number of primitives within the first diagonal strip. In other examples, the second diagonal strip may be tangent with the first diagonal strip. In these examples, the number of primitives within the second diagonal strip may be the same as the number of primitives within the first diagonal strip.

After outputting vertices of primitives that reside within the second diagonal strip, tessellation stage 24 may then output vertices of primitives that reside within a third diagonal strip. The third diagonal strip may be parallel with the first diagonal strip. Also, the number of primitives that reside within the third diagonal strip may be different than the number of primitives that reside within the first and second diagonal strips.

Tessellation stage 24 may output primitives within the diagonal strips until tessellation stage 24 completes outputting the primitives within one of the portions of the domain. Tessellation stage 24 may output primitives within another portion in the domain in a substantially similar manner.

By outputting vertices in the manner described above, GPU 12 may execute fewer instantiations of domain shader stage 26. For example, due to the limited size of the reuse buffer, the reuse buffer may not be able to store all of the vertices outputted by tessellation stage 24. For instance, as described above, the reuse buffer may implement a first-in-first-out replacement scheme when the reuse buffer is full and domain shader stage 26 is attempting to store newly transformed patch coordinates. The techniques described in this disclosure may increase the likelihood that, after domain shader stage 26 transforms vertices of a first primitive from domain coordinates to patch coordinates, the patch coordinates for vertices that are shared with a second primitive are not washed out of the reuse buffer before tessellation stage 24 outputs the domain coordinates of vertices of the primitives within the second diagonal strip, and similarly, for the third diagonal strip.

As described above, tessellation stage 24 may divide the domain into a plurality of portions. The manner in which tessellation stage 24 divides the domain into the plurality of portions may be based on the tessfactors outputted by hull shader stage 22 and the number of storage slots in the reuse buffer (i.e., the storage capability of the reuse buffer). For example, for a quad domain, hull shader stage 22 may output the number of segments into which each side of the ring is to be divided. The number of segments along each side of the ring is one example of the tessfactor outputted by hull shader stage 22.

The number of segments into which each side of the quad domain is to be divided may indicate the number of points on each side of the quad domain. For instance, if one side is to be divided into five segments, then tessellation stage 24 may determine that there are six points on the side (one point on each end of the side, and four points in the middle to divide the side into five segments).

For the quad domain, hull shader stage 22 may output a tessfactor for the vertical sides that define the number of segments into which the vertical sides are to be divided. This tessfactor may be referred to as $f_y$. Hull shader stage 22 may also output a tessfactor for the horizontal sides that define the number of segments into which the horizontal sides are to be divided. This tessfactor may be referred to as $f_x$.

Tessellation stage 24 may determine which one of these two tessfactors is smaller (or possibly equal) in value (e.g., whether $f_x \leq f_y$, or whether $f_y \leq f_x$). Assume that the smaller of two is referred to as $f_1$. Also, assume that the number of storage slots in the reuse buffer is C. In this example, tessellation stage 24 may determine whether $f_1+1$ is less than or equal to C−2. If $f_1+1$ is less than or equal to C−2, then tessellation stage 24 may divide the quad domain into two portions (e.g., divide the quad domain into duplets), where one or both of the two portions are contiguous portions.

In this example, tessellation stage 24 may output domain coordinates of vertices of the primitives within a first diagonal strip within a first contiguous portion of the two portions, followed by a second diagonal strip within the first contiguous portion. In this example, the second diagonal strip may be tangent with the first diagonal strip, and the number of primitives in the first diagonal strip and the second diagonal strip may be the same. Then, tessellation stage 24 may output domain coordinates of vertices of primitives within a third diagonal strip of the first contiguous portion. The third diagonal strip may be parallel with the first diagonal strip and the number of primitives within the third diagonal strip may be different than the number of primitives within the first and second diagonal strips.

Tessellation stage 24 may repeat outputting domain coordinates of primitives in a similar manner until tessellation stage 24 finishes outputting primitives within the first contiguous portion. Tessellation stage 24 may then proceed with the second contiguous portion, and output domain coordinates of vertices within the second contiguous portion in a substantially similar fashion. Outputting domain coordinates of the primitives in the example where $f_1+1$ is less than or equal to C−2 may be referred to as a first mode of operation of tessellation stage 24.

If tessellation stage 24 determines that $f_1+1$ is not less than or equal to C−2, tessellation stage 24 may determine whether $f_1/2+1$ is less than or equal to C−1. If $f_1/2+1$ is less than or equal to C−1, tessellation stage 24 may divide the quad domain into four portions (e.g., quadruplets), where one or more of the four portions are contiguous portions.

In this example, tessellation stage 24 may output domain coordinates of vertices of the primitives within a first diagonal strip within a first contiguous portion of the four portions, followed by a second diagonal strip within the first contiguous portion. In this example, the second diagonal strip may be parallel with the first diagonal strip, and the number of primitives in the first diagonal strip and the second diagonal strip may be different. Then, tessellation stage 24 may output domain coordinates of vertices of primitives within a third diagonal strip of the first contiguous portion. The third diagonal strip may be parallel with the first and second diagonal strips and the number of primitives within the third diagonal strip may be different than the number of primitives within the first and second diagonal strips.

Tessellation stage 24 may repeat outputting domain coordinates of primitives in a similar manner until tessellation stage 24 finishes outputting primitives within the first contiguous portion. Tessellation stage 24 may then proceed with the second contiguous portion, and output domain coordinates of vertices within the second contiguous portion in a substantially similar fashion, followed by the third and fourth portions. Outputting domain coordinates of the primitives in the example where $f_1/2+1$ is less than or equal to C–1 may be referred to as a second mode of operation of tessellation stage 24.

If tessellation stage 24 determines that $f_1/2+1$ is not less than or equal to C–1, tessellation stage 24 may divide the quad domain into more than four portions. In this example, tessellation stage 24 may operate in a third mode of operation. For instance, tessellation stage 24 may divide the quad domain into five portions. On four of the five portions, tessellation stage 24 may implement the first mode of operation. On the fifth portion, tessellation stage 24 may implement the second mode of operation.

It should be understood that although the previous examples described tessellation stage 24 as determining whether $f_1+1$ is less than or equal to C–2, or whether $f_1/2+1$ is less than or equal to C–1, aspects of this disclosure are not so limited. In general, any component may determine whether $f_1+1$ is less than or equal to C–2, or whether $f_1/2+1$ is less than or equal to C–1.

For example, GPU 12 may load hull shader stage 22 with the number of slots in the reuse buffer (i.e., the value of C), and hull shader stage 22 may perform the above determinations, and indicate to tessellation stage 24 the manner in which the domain is to be divided. As another example, a controller of GPU 12 may perform the above determinations, and indicate to tessellation stage 24 the manner in which the domain is to be divided.

The above examples described the first, second, or third modes of operation for a quad domain. Tessellation stage 24 may also implement the first, second, or third modes of operation for instances when the domain is a triangular domain. For a triangle domain, rather than defining a $f_x$ and $f_y$ tessfactor, hull shader stage 22 may define one tessfactor, referred to as $f_t$.

In this example, if $f_t+1$ is less than or equal to C–2, then tessellation stage 24 may implement the first mode of operation by dividing the triangle domain into two portions. In this example, one of the two portions may be sized differently than the other portion. Tessellation stage 24 may then output the domain coordinates of the primitives in the first, second, and third triangles as described above for the largest sized domain. For the smaller sized domain, tessellation stage 24 may implement the second mode of operation.

In this example, for the triangle domain, if $f_t+1$ is not less than or equal to C–2, and $f_t/2+1$ is less than or equal to C–1, tessellation stage 24 implements the second mode of operation. For instance, tessellation stage 24 may divide the triangle domain into three portions (e.g., triplets), and implement the second mode of operation on each of the three portions. In this example, if $f_t/2+1$ is not less than or equal to C–1, tessellation stage 24 implements the third mode of operation. For example, tessellation stage 24 may divide the triangle domain into more than three portions. Tessellation stage 24 may implement the second mode of operation on some of the portions, and implement the third mode of operation on some of the other portions.

In the example where the domain is a triangle domain, tessellation stage 24 may determine whether $f_t+1$ is less than or equal to C–2, or whether $f_t/2+1$ is less than or equal to C–1. However, as above, the techniques described in this disclosure are not so limited. In general, any other component may perform these determinations, and indicate to tessellation stage 24 the manner in which the triangle domain is to be divided.

The above example techniques may be applicable to the entirety of the domain when there is uniform tessellation. In uniform tessellation, the tessfactors for the outer rings are the same as the tessfactors for the inner rings. However, in other examples, hull shader stage 22 may define different numbers of tessfactors for the outer most ring, and the inner rings. For example, the outer most ring may be equivalent to the perimeter of the domain, and hull shader stage 22 may define a different number of segments on the outer most ring, as compared to the number of segments in the inner rings.

In this example, tessellation stage 24 may implement the first, second, or third mode of operation on the domain encompassed by the inner rings. For example, the first inner ring (e.g., ring after the outer most ring) may be considered as a subset domain, and tessellation stage 24 may implement the first, second, or third mode of operation on the subset domain. For the primitives in the outer most ring (i.e., part of the domain that is not part of the subset domain), tessellation stage 24 may output those primitives in any order.

FIG. 2 is a conceptual diagram illustrating another example of a graphics processing unit (GPU) that may implement another example of a graphics processing pipeline in accordance with one or more examples described in this disclosure. For instance, FIG. 1 illustrated a graphics processing pipeline formulated substantially in accordance with the DirectX 11.x API, such as the Direct3D 11 API. FIG. 2 illustrates the graphics processing pipeline substantially in accordance with the OpenGL 4.x API.

The OpenGL 4.x graphics processing pipeline may function in a substantially similar fashion as the Direct3D 11 graphics processing pipeline. Accordingly, for purposes of brevity, reference is made to FIG. 1 to describe components that are similar to both the Direct3D 11 graphics processing pipeline and the OpenGL 4.x graphics processing pipeline.

As illustrated in the example of FIG. 2, GPU 12 includes input assembler 36, vertex shader 38, tessellation control shader 40, primitive generator 42, tessellation evaluation shader 44, geometry shader 46, clipping unit 48, rasterizer 50, fragment shader 52, and post-processor 54. Similar to FIG. 1, in the example illustrated in FIG. 2, GPU 12 may include more or fewer components than those illustrated in FIG. 2. Also, the specific ordering of the unit is provided for purposes of illustration and should not be considered limiting.

In some ways, the tessellation process with the OpenGL 4.x graphics processing pipeline may be substantially similar to the tessellation process with the Direct3D 11 graphics processing pipeline. For example, OpenGL 4.x tessellation process may rely upon patches and control points, in the manner similar to that described above with respect to FIG. 1. For instance, input assembler 36 and vertex shader 38 of FIG. 2 may function substantially similar as input assembler stage 18 and vertex shader stage 20 of FIG. 1, respectively.

As more examples, for tessellation, tessellation control shader 40 of FIG. 2 may function substantially similarly to hull shader stage 22 of FIG. 1. However, tessellation control shader 40 outputs tessellation levels, which may be analogous to the tessfactors of Direct3D 11. For example, the tessellation levels of OpenGL 4.x may define the domain type, the number of rings within the domain, and the number of points per ring edge.

Primitive generator 42 may function in a substantially similar manner as tessellation stage 24. For example, primitive generator 42 may utilize the tessellation levels and the domain type to divide the domain into a plurality of primitives. Also, in accordance with techniques described in this disclosure, primitive generator 42 may output the domain coordinates of the primitives in the manner described above. For example, primitive generator 42 may output the domain coordinates of the vertices of primitives, where the primitives reside in diagonal strips.

Similar to tessellation stage 24 of FIG. 1, primitive generator 42 may divide the domain into a plurality of portions, where at least one portion is a contiguous portion. Primitive generator 42 may then output the domain coordinates of the vertices primitives within the contiguous portion. For example, primitive generator 42 may output domain coordinates of vertices of primitives that reside within a first diagonal strip, followed by a second diagonal strip, and a third diagonal strip. Furthermore, primitive generator 42 may implement the different example modes of operation described above with respect to tessellation stage 24.

Tessellation evaluation shader 44 of FIG. 2 may function substantially similarly to domain shader stage 26 of FIG. 1. For example, tessellation evaluation shader 44 may receive the vertices of the generated primitives from primitive generator 42 and add the primitive to the patch outputted by tessellation control shader 40. In this manner, the graphics processing pipeline of the OpenGL 4.x API may perform tessellation on a patch to increase the resolution of the patch.

Geometry shader 46 may function substantially similarly to geometry shader stage 28. The combination of clipping unit 48 and rasterizer 50, in FIG. 2, may function substantially similarly to rasterizer stage 30 in FIG. 1. Fragment shader 52 and post-processor 54 in FIG. 2 may function substantially similarly to pixel shader stage 32 and output merge stage 34 in FIG. 1, respectively. Post-processor 54 may output the final pixel values to a frame buffer and the display processor may retrieve the pixel values from the frame buffer and cause a display to illuminate according to the pixel values to display the image.

As described above, tessellation control shader 40, primitive generator 42, and tessellation evaluation shader 44 of FIG. 2 function substantially similarly to hull shader stage 22, tessellation stage 24, and domain shader stage 26 of FIG. 1, respectively, for implementing the tessellation process. Accordingly, both the Direct3D 11 and the OpenGL 4.x APIs rely upon two programmable shader units and one fixed-function unit to implement the tessellation process.

For purposes of generality, the techniques described in this disclosure may be described with a first tessellation shader unit, a tessellation unit, and a second tessellation shader unit. Examples of the first tessellation shader unit include hull shader stage 22 and tessellation control shader 40. Examples of the tessellation unit include tessellation stage 24 and primitive generator 42. Examples of the second tessellation shader unit include domain shader stage 26 and tessellation evaluation shader 44.

Also, Direct3D 11 uses the term "tessfactors" and OpenGL 4.x uses the term "tessellation levels," which may be considered analogous terms. For purposes of generality, this disclosure uses the term "tessellation factor," examples of which include tessfactors and tessellation levels. In this way, the first shader unit may be considered as outputting tessellation factors to the tessellation unit, and the tessellation unit may output vertices to the second shader unit in response to the tessellation factors.

It should be noted that while the Direct3D 11 and OpenGL 4.x utilize two shader units and one fixed-function unit, the techniques described in this disclosure are not so limited. For example, it may be possible in other systems for the first and second shader units to be fixed-function units and the tessellation unit to be a shader unit. As another example, all may be fixed-function units or all may be shader units, or any combination thereof.

Therefore, in some examples, it may be considered that a first unit performs functions similar to the first shader unit, but may be a shader unit or a fixed-function unit, a second unit performs functions similar to the tessellation unit, but may be a shader unit or a fixed-function unit, and a third unit performs functions similar to the second shader unit, but may be a shader unit or a fixed-function unit. Moreover, although the first shader unit, the tessellation unit, and the second shader unit are illustrated as separate units in FIGS. 1 and 2, aspects of this disclosure are not so limited. These units, and possibly any unit of the graphics processing pipelines illustrated in FIGS. 1 and 2, may be combined together into a common unit. Accordingly, while the functionality of these units is described separately for ease of description, these units may be implemented in shared hardware or as distinct components.

Figure 3:
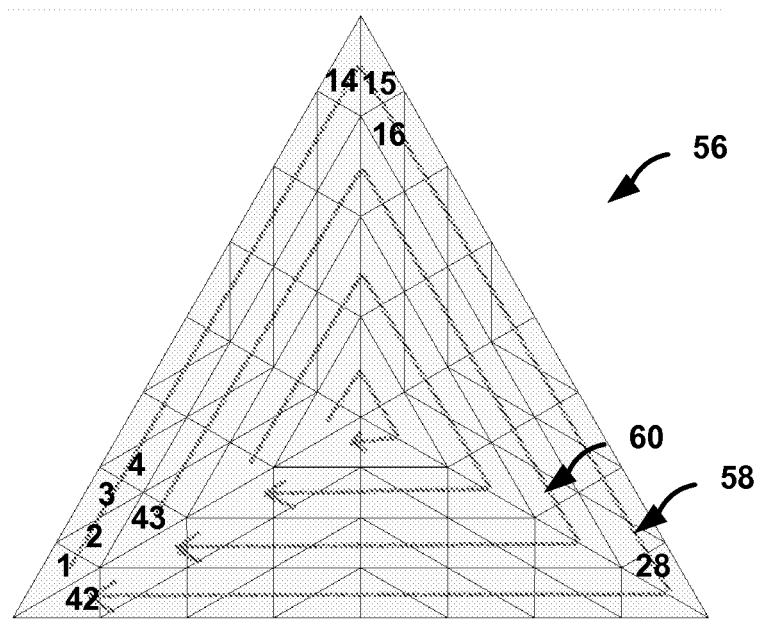
FIG. 3 is a diagram illustrating an example technique of outputting domain coordinates of vertices for tessellation.

FIG. 3 is a diagram illustrating an example technique of outputting domain coordinates of vertices for tessellation. The example illustrated in FIG. 3 may be implemented by other examples of a tessellation unit, and not tessellation stage 24 and primitive generator 42. FIG. 3 illustrates domain 56, which is a triangle domain, and the points and the primitive pattern are symmetric along the center of the lines of domain 56.

As illustrated, domain 56 is tessellated into a plurality of primitives (e.g., triangles). In some other examples, a tessellation unit, not like the tessellation unit of this disclosure, outputs domain coordinates of the vertices of the primitives in a ring-by-ring fashion, where the ring in this example is a triangle. For instance, FIG. 3 illustrates ring 58 and ring 60. Ring 58 is the outer most ring and includes primitives that border the boundary of domain 56. Ring 60 is the first inner ring because no primitive in ring 60 resides on the boundary of domain 56.

In some other techniques, the tessellation unit of these other techniques outputs the domain coordinates of all of the primitives that reside within ring 58. Then, the tessellation unit of these other techniques outputs the domain coordinates of all the primitives that reside within ring 60. As shown in FIG. 3, some of the primitives are numbered to assist with understanding. For example, the tessellation unit of these other techniques outputs the domain coordinates of primitive 1, followed by primitive 2, primitive 3, and so forth until primitive 42 because these primitives all reside within ring 58. Then, the tessellation unit of these other techniques outputs the domain coordinates of primitives in ring 60 starting from primitive 43.

In the example illustrated in FIG. 3, because primitive 1 is the first primitive of domain 56, after the tessellation unit of these other techniques outputs the domain coordinates of primitive 1, a domain shader executes three times to transform each of the three domain coordinates of primitive 1 into patch coordinates, and stores the corresponding patch coordinates in the reuse buffer. Then, after the tessellation unit of these other techniques outputs the domain coordinates of primitive 2, the domain shader may execute only one time because primitive 2 shares two vertices with primitive 1, and the patch coordinates for these two vertices may be stored in the reuse buffer. The domain shader may transform the unshared vertex of primitive 2 to transform the domain coordinates of the unshared vertex of primitive 2 into patch coordinates, and stored the corresponding patch coordinates in the reuse buffer.

The tessellation unit of these other techniques may output the domain coordinates of the primitives along ring 58 until the tessellation unit of these other techniques outputs the domain coordinates of primitive 42. As illustrated in FIG. 3, primitive 42 shares two vertices with primitive 1. However, due to the limited size of the reuse buffer, the reuse buffer may have removed the patch coordinates that correspond to the domain coordinates of primitive 1. In this case, the domain shader may execute three times, and re-transform the domain coordinates into patch coordinates of the vertices shared by primitive 1 and primitive 42. In other words, although the domain shader had already transformed domain coordinates of primitive 1 into patch coordinates, in these other techniques, the domain shader may have to once again transform domain coordinates of primitive 1 (i.e., the ones shared with primitive 42) into patch coordinates.

The tessellation unit, in these other techniques, may then output the domain coordinates of the vertices of primitive 43 in ring 60. As illustrated, primitive 43 shares two vertices with primitive 2, and primitive 2 shares one vertex with primitive 42. In this, the domain shader may execute twice. For instance, because primitive 43 shares one vertex with primitive 42, the patch coordinates for that vertex may be stored in the reuse buffer. However, for the vertex of primitive 43 that is shared with primitive 2 and not shared with primitive 42, due to the limited size of the reuse buffer, the reuse buffer may remove the patch coordinates that correspond to the domain coordinates of this vertex. In this case, the domain shader may need to execute to transform the domain coordinates of this vertex into patch coordinates even though the domain shader had previously transformed the domain coordinates of this vertex into patch coordinates.

Figure 4:
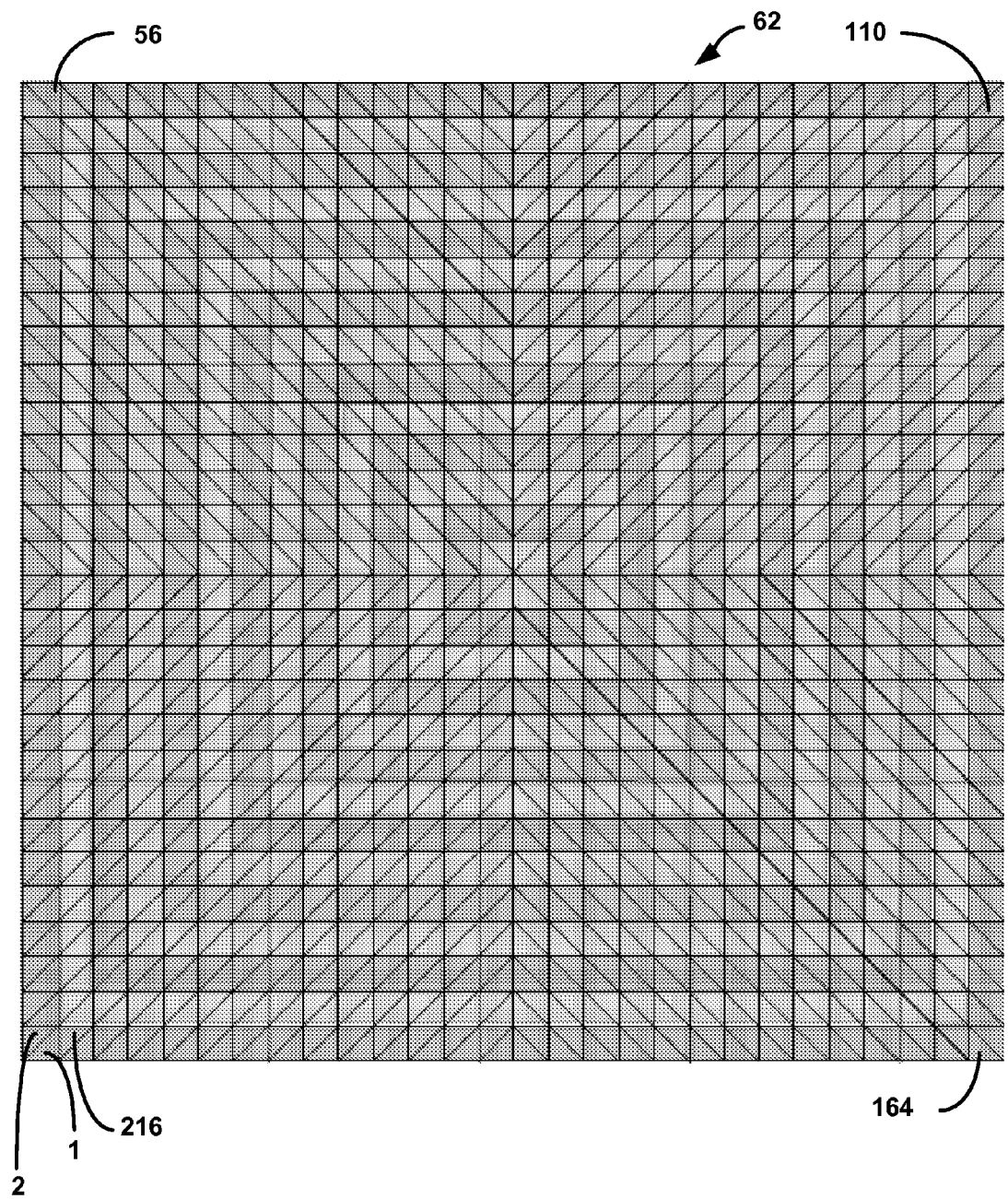
FIG. 4 is a diagram illustrating another example technique of outputting domain coordinates of vertices for tessellation.

FIG. 4 is a diagram illustrating another example technique of outputting domain coordinates of vertices for tessellation. The example illustrated in FIG. 4 may be implemented by other examples of a tessellation unit, and not tessellation stage 24 and primitive generator 42. FIG. 4 illustrates domain 62, which is a quad domain. The points and the primitive pattern are symmetric along the center of the lines of domain 62.

As illustrated, domain 62 is tessellated into a plurality of primitives (e.g., triangles). In some other examples, a tessellation unit, not like the tessellation unit of this disclosure, outputs domain coordinates of the vertices of the primitives in domain 62 in a ring-by-ring fashion, where the ring in this example is a rectangle.

For ease of description, only some of the primitives that reside in the outer ring of domain 62 are illustrated. For example, the outer ring of domain 62 includes primitive 1 to primitive 216. In this example, the tessellation unit of these other techniques outputs the domain coordinates for the vertices of primitive 1, followed by primitive 2, and so forth until primitive 216.

However, in these other techniques, by the time the tessellation unit of these other techniques, outputs the domain coordinates of primitive 216, the reuse buffer may have removed the patch coordinates that correspond to the domain coordinates of primitive 1. Accordingly, even though primitive 216 shares two vertices with primitive 1, the domain shader may need to execute three times to transform the domain coordinates of primitive 216 into corresponding patch coordinates.

Figure 5:
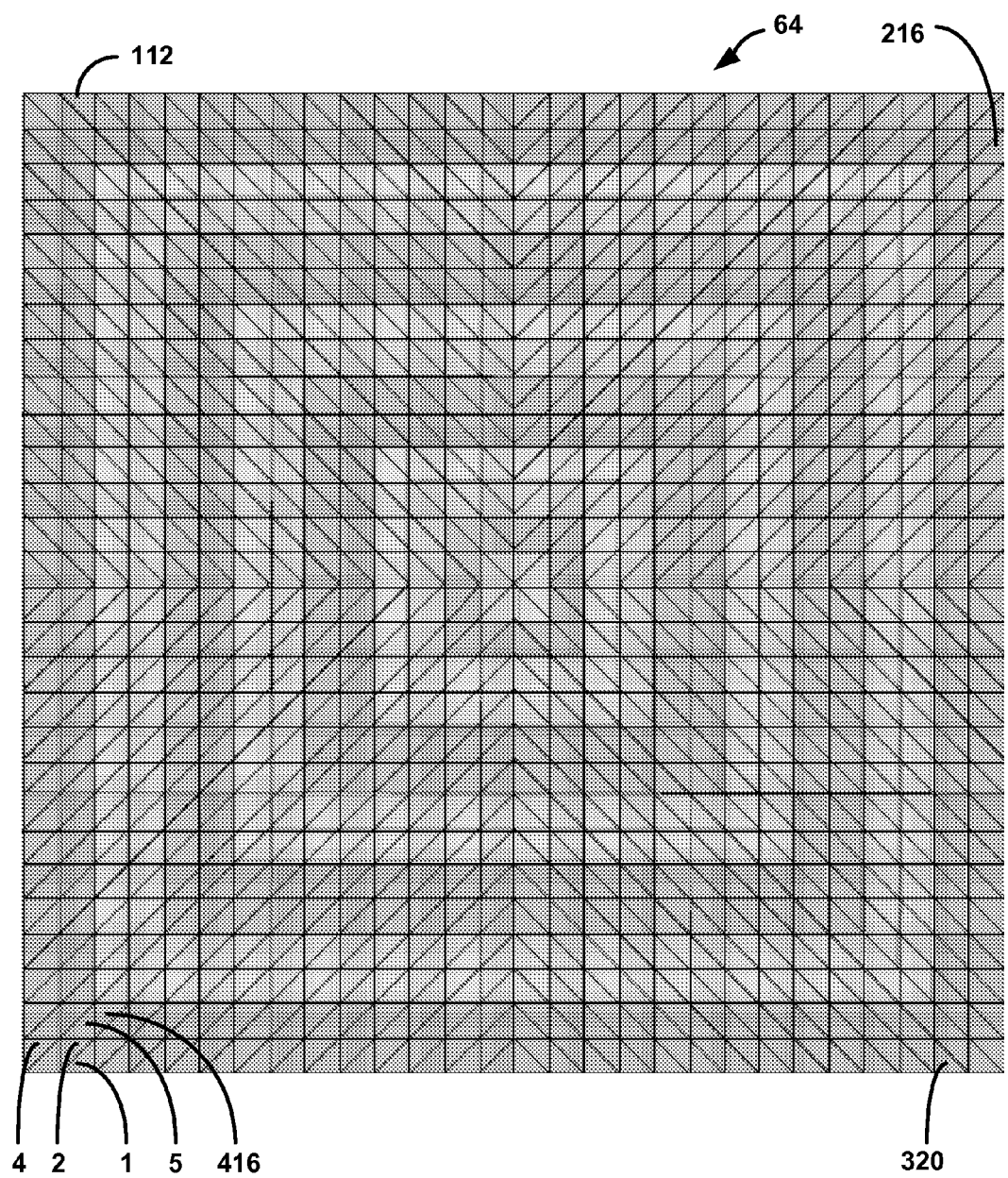
FIG. 5 is a diagram illustrating another example technique of outputting domain coordinates of vertices for tessellation.

FIG. 5 is a diagram illustrating another example technique of outputting domain coordinates of vertices for tessellation. The example illustrated in FIG. 5 may be implemented by other examples of a tessellation unit, and not tessellation stage 24 and primitive generator 42. FIG. 5 illustrates domain 64, which is a quad domain, and the points and the primitive pattern are symmetric along the center of the lines of domain 64.

The example illustrated in FIG. 5 is one example manner in which some other techniques attempted to reduce the number of executions of the domain shader. For example, in FIG. 4, the tessellation unit of these other techniques outputs primitives from one ring. In FIG. 5, the tessellation unit of these other techniques outputs domain coordinates of primitives in two rings simultaneously.

Such an output scheme may reduce the number of times the domain shader needs to execute. For example, when the tessellation unit of these other techniques outputs the domain coordinates of primitive 5, the patch coordinates for the domain coordinates that primitive 5 shares with primitives 1 and 2 may still be available in the reuse buffer. However, even the scheme illustrated in FIG. 5 may execute more instances of the domain shader than desirable. For example, when the tessellation unit of these other techniques outputs the domain coordinates of primitive 416, the patch coordinates for the domain coordinates of the vertices of primitive 5 that are shared with primitive 416 may no longer be stored in the reuse buffer.

In this way, in the examples illustrated in FIGS. 3 and 4, the tessellation unit of these other techniques generates one strip of primitives for each ring, and it may be possible for units further in the graphics pipeline (e.g., after the domain shader) to reuse the vertices in the reuse buffer between primitives in the same ring. However, it may not be possible for the units further in the graphics pipeline to reuse vertices for primitives across the rings due to the limited size of the reuse buffer. This results in extra executions of the domain shader.

For example, assume that the reuse buffer includes thirty-two cache slots. In the examples illustrated in FIGS. 3 and 4, there may be two cache misses for the same vertex. A cache miss may refer to an instance where the corresponding patch coordinates for a domain coordinate are not stored in the reuse buffer. For example, in the examples illustrated in FIGS. 3 and 4, after the domain shader transforms the domain coordinates into patch coordinates for a vertex, it may be possible that the domain shader will need to execute at least once more to transform the domain coordinates of this same vertex into patch coordinates, due to the limited size of the reuse buffer.

The example illustrated in FIG. 5 may reduce the number of executions of the domain shader, relative to the techniques illustrated in FIGS. 3 and 4. However, in some examples, there may be up to sixty-four vertices along an edge of a ring. In this case, even the example illustrated in FIG. 5 may result in multiple executions of the domain shader to transform the domain coordinates of the same vertex into patch coordinates.

Accordingly, the techniques illustrated with FIGS. 3-5 may place limitations on the efficiency of the reuse buffer. For example, the patch coordinates that correspond to the domain coordinates for vertices in one ring are lost when outputting domain coordinates for the second ring. Also, as can be seen in FIG. 3, the vertices of primitives 1 to 14 that reside along the outer boundary of domain 56 are not shared with any of the primitives in ring 60 (e.g., primitive 43 onwards in ring 60). Accordingly, there may be very little to no negative impact on the efficiency of the reuse buffer if patch coordinates that correspond to the domain coordinates of the vertices that reside along the outer boundary of domain 56 are lost. For example, there may be little to no negative impact on the efficiency of reuse buffer if vertices along one side of the ring are lost, if the vertices along the other side of the ring are preserved in the reuse buffer.

However, in the examples of FIGS. 3-5 such preservation of vertices along one side of the ring may not occur. For example, the order in which the domain coordinates of vertices are output in examples of FIGS. 3-5 may be considered as axis aligned. After the tessellation unit of these other techniques output the domain coordinates of primitives 1 to 14, most of the primitives 15 to 28 do not share any vertices with primitives 1 to 14 (with primitive 15 and 16 being the exception). However, the primitives 43 onwards in ring 60 share vertices with the primitives 1 to 14, which are lost in the reuse buffer due to the limited size. Accordingly, it may be more desirable to ensure that the patch coordinates for primitives 1 to 14 are available when outputting the primitives 43 and onward, than the patch coordinates for primitives 15 to 28.

As described above, the techniques described in this disclosure provide for an output scheme of the domain coordinates to maximize the efficiency of the reuse buffer. For example, as described above, the tessellation unit, in accordance with the techniques described in this disclosure (e.g., tessellation stage 24 and primitive generator 42), may divide the domain into a plurality of portions, where at least one of the portions is a contiguous portion. The rings illustrated in FIGS. 3-5 should not be considered as contiguous portions.

For example, as used in this disclosure, a contiguous portion includes any primitive that falls within the area of the contiguous portion (e.g., within the ends of the edges of the contiguous portion) such that there is no gap in the domain. The rings illustrated in FIGS. 3-5 exclude primitives that fall within the area encompassed by the rings such that there is a gap in the domain. For example, in FIG. 3, although ring 58 encompasses all of domain 56, ring 58 excludes primitives that fall within ring 60. In this way, ring 58 hollows out domain 56 creating a gap in domain 56. Such similar exclusion of primitives can also be seen in FIGS. 4 and 5.

The tessellation unit (e.g., tessellation stage 24 or primitive generator 42) may output domain coordinates along diagonal strips within the contiguous portion. In other words, the tessellation unit outputs domain coordinates in a diagonal walking direction. "Walking" as used in this disclosure refers to the steps in which the tessellation unit outputs the domain coordinates of the primitives. One potential advantage of outputting in the diagonal walking direction is that the diagonal strip length grows gradually starting from a strip length of one primitive. This may result in vertices being added from the outer side of the diagonal strip, while the reuse buffer replaces vertices from the inner side of the diagonal strip in a first-in-first-out scheme.

FIG. 6 is a block diagram illustrating a GPU in further detail in accordance with one or more examples described in this disclosure. For example, FIG. 6 illustrates an example of GPU 12 in further detail. As illustrated, GPU 12 includes tessellation unit 66, controller 74, domain shader 76, and reuse buffer 78. Tessellation unit 66 is one example of tessellation stage 24 of FIG. 1 or primitive generator 42 of FIG. 2. Reuse buffer 78 is an example of the reuse buffer described above.

Domain shader 76 is illustrated in dashed lines to indicate that domain shader 76 executes on GPU 12, such as on one or more shader cores of GPU 12, where a shader core is a dedicated hardware of GPU 12 for the execution of shaders such as domain shader 76. In other words, in this example, domain shader 76 is not a hardware block, but rather a software unit executing on a hardware block. One example of domain shader 76 is domain shader stage 26 (FIG. 1). Another example of domain shader 76 is tessellation evaluation shader 44 (FIG. 2).

Controller 74 may be a control unit of GPU 12 that controls the overall functionality of GPU 12. For example, controller 74 may determine whether and when to execute shader programs. Controller 74 may also determine the mode of operation of tessellation unit 66. Alternatively, tessellation unit 66 may determine the mode of operation. Controller 74 may be hardware, software executing on hardware, or firmware executing on hardware. Furthermore, in some examples, instead of or in addition to controller 74 determining when to execute domain shader 76, reuse buffer 78 may include a cache controller that is configured to determine when to execute domain shader 76. However, for purposes of illustration, the techniques are described in context of controller 74 determining the mode of operation and determining when domain shader 76 is to be executed.

Because either controller 74 or tessellation unit 66 may determine the mode of operation of tessellation unit 66, the techniques described in this disclosure may be considered as a processing unit being configured to determine the mode of operation of tessellation unit 66. In some examples, the processing unit may be controller 74. In some examples, the processing unit may be tessellation unit 66. In some examples, the processing unit may be the combination of controller 74 and tessellation unit 66. For ease of illustration, as described above, the techniques for determining the mode of operation are described with examples where the processing unit is controller 74. However, the processing unit may alternatively or in conjunction with controller 74 be tessellation unit 66.

As illustrated, tessellation unit 66 includes setup unit 68, point generators 70, and connectivity generator 72. Setup unit 68, point generators 70, and connectivity generator 72 may be fixed-function hardware units of tessellation unit 86. Setup unit 68, point generators 70, and connectivity generator 72 are illustrated as separate components for ease of description. Setup unit 68, point generators 70, and connectivity generator 72 may be formed as a single unit, as separate units, or a combination thereof.

Setup unit 68 may receive the tessellation factors as input from a first shader unit such as hull shader stage 22 of FIG. 1 or tessellation control shader 40 of FIG. 2, and may determine the domain type from the tessellation factors. For example, if there are four tessellation factors, setup unit 68 may determine that the domain type is a triangle, and if there are six tessellation factors, setup unit 68 may determine that the domain type is a quad. Setup unit 68 may perform other setup functions such as correcting rounding problems, ceiling and floor functions, determining half tessellation factors, and reducing and combining tessellation factors. In general, setup unit 68 may process the tessellation factors to ensure that the other components of tessellation unit 66 can perform respective functions.

Point generators 70 may determine how many points reside along each edge of each ring of the domain, from the tessellation factors, and the locations of the points (e.g., the u, v coordinates or the u, v, w coordinates of the points). Connectivity generator 72 may connect (i.e., stitch) the points to form a plurality of primitives in the domain.

In some examples, connectivity generator 72 may be configured to implement the techniques described in this disclosure. For example, rather than outputting domain coordinates of primitives as illustrated in FIGS. 3-5, connectivity generator 72 may be configured to divide the domain into a plurality of portions, and output domain coordinates of primitives in diagonal strips within the portions. In some examples, point generators 70 and connectivity generator 72 may function together for outputting the domain coordinates.

For example, point generators 70 may determine the coordinates of the vertices of primitives that reside within a first diagonal strip, where the first diagonal strip resides within the contiguous portion. Point generator 70 may then output the determined coordinates to connective generator 72 (e.g., via a shallow buffer separate from reuse buffer 78 and not illustrated in FIG. 6). Connectivity generator 72 may assemble the primitives and output domain coordinates of vertices of the primitives that reside within a first diagonal strip, where the first diagonal strip resides within the contiguous portion. Point generators 70 may also determine the coordinates of vertices of primitives that reside within a second diagonal strip, where the second diagonal strip resides within the contiguous portion, and output the determined coordinates to connectivity generator 72 (e.g., via the shallow buffer). After outputting the domain coordinates of vertices that reside within the first diagonal strip, connectivity generator 72 may output domain coordinates of vertices that reside within a second diagonal strip, where the second diagonal strip resides within the contiguous portion.

In one mode of operation, the second diagonal strip may be parallel with the first diagonal strip, and connectivity generator 72 may output domain coordinates of vertices that reside within the second, parallel diagonal strip. In this example, the second, parallel diagonal strip may include a different number of primitives than the first diagonal strip.

In another mode of operation, the second diagonal strip may be tangent with the first diagonal strip. Tangent, as used in this disclosure, means that only one primitive in the second diagonal strip shares two vertices with only one primitive in the first diagonal strip. In this way, the second diagonal strip may be considered as being connected to the first diagonal strip at only one primitive, and hence tangent with the first diagonal strip. In this example, the second, tangent diagonal strip may include a same number of primitives as the first diagonal strip.

Also, point generators 70 may determine the coordinates of the vertices of primitives that reside within a third diagonal strip, and output the determined coordinates to connectivity generator 72 (e.g., via the shallow buffer). After outputting vertices of primitives that reside within the second diagonal strip, connectivity generator 72 may then output vertices of primitives that reside within the third diagonal strip that is within the contiguous portion. In either mode of operation, the third diagonal strip may be parallel with the first diagonal strip. For instance, in the mode of operation where the first and second diagonal strips are parallel with one another, the third diagonal strip may be parallel with both the first and second diagonal strip. In the mode of operation where the second diagonal strip is tangent with the first diagonal strip, the third diagonal strip may be parallel with the first diagonal strip, but may not be parallel with the second diagonal strip.

Point generators 70 may determine coordinates of primitives and connectivity generator 72 may output primitives within the diagonal strips until connectivity generator 72 completes outputting the primitives within one of the contiguous portions of the domain. Point generators 70 may determine coordinates of primitives and connectivity generator 72 may then output primitives within another contiguous portion in the domain in a substantially similar manner.

Connectivity generator 72 may output the domain coordinates of one primitive to controller 74. Controller 74 may then determine whether reuse buffer 78 stores patch coordinates that correspond to the outputted domain coordinates. For instance, the domain coordinates may be indices into reuse buffer 78. As described above, the domain coordinates may be Cartesian coordinates (e.g., u, v coordinates) or Barycentric coordinates (e.g., u, v, w coordinates). The u coordinate, the v coordinate, and the w coordinate may each be 17-bits. Accordingly, the u, v coordinates may include thirty-four bits, while the u, v, w coordinates may include fifty-one bits.

Controller 74 may output these thirty-four or fifty-one bits to an XOR gate within reuse buffer 78. The XOR gate may compare the received bits with bits indicative of the indices of reuse buffer 78. If the output of the XOR gate indicates that the received bits match an index in reuse buffer 78, reuse buffer 78 may output a cache hit to controller 74. A cache hit means that reuse buffer 78 stores patch coordinates for the domain coordinates that formed the thirty-four or fifty-one bits. If the output of the XOR gate indicates that the received bits do not match an index in reuse buffer 78, reuse buffer 78 may output a cache miss to controller 74. A cache miss means that reuse buffer 78 does not store patch coordinates for the domain coordinates that formed the thirty-four or fifty-one bits.

If a cache hit occurs, controller 74 may not cause an instantiation of domain shader 76 to execute because reuse buffer 78 already stores the patch coordinates for the domain coordinates that formed the thirty-four or fifty-one bits. In this case, controller 74 may cause subsequent units of the graphics pipeline to read the patch coordinates that correspond to the outputted domain coordinates for further processing. For example, controller 74 may cause geometry shader stage 28 (FIG. 1) or geometry shader (FIG. 2) to read the patch coordinates that correspond to the outputted domain coordinates from reuse buffer 78 for further processing.

If a cache miss occurs, controller 74 may cause an instantiation of domain shader 76 to execute because reuse buffer 78 does not store the patch coordinates for the domain coordinates that formed the thirty-four or fifty-one bits. In this case, controller 74 may provide the domain coordinates to domain shader 76, and domain shader 76 may transform the domain coordinates into corresponding patch coordinates. Domain shader 76 may output the patch coordinates to reuse buffer 78. Reuse buffer 78, in turn, may store the patch coordinates at indices equal to the thirty-four or fifty-one bits that formed the domain coordinates. After reuse buffer 78 stores the patch coordinates, controller 74 may cause subsequent units of the graphics pipeline to read the patch coordinates from reuse buffer 78 for further processing.

Controller 74 may repeat these steps for each of the domain coordinates outputted by connectivity generator 72. For example, for every cache miss, controller 74 may cause an instantiation of domain shader 76 to execute, and for every cache miss, controller 74 may not cause an instantiation of domain shader 76 to execute.

As described above, the techniques described in this disclosure may minimize the number of instantiations of domain shader 76. To this end, the techniques described in this disclosure may minimize the number of cache misses that occur. For example, outputting domain coordinates of primitives in diagonal strips within contiguous portions increase the likelihood that patch coordinates that correspond to the domain coordinates of shared vertices remain in reuse buffer 78, and that reuse buffer 78 removes (e.g., washes out) patch coordinates that correspond to the domain coordinates of unshared vertices.

In the techniques described in this disclosure, each of the diagonal strips may include a first side (e.g., an inner side) and a second side (e.g., an outer side). In the example mode of operation in which the first, second, and third diagonal strips are all parallel with one another, the outer side of the first diagonal strip may be the same as the inner side of the second diagonal strip, and the outer side of the second diagonal strip may be same as the inner side of the third diagonal strip. In this example, the number of primitives in each of the diagonal strips may be different.

As one example, the number of primitives in the second diagonal strip may be greater than the number of primitives in the first diagonal strip, and the number of primitives in the third diagonal strip may be greater than the number of primitives in the first and second diagonal strip. This results in the number of vertices on the outer side of the first diagonal strip being greater than the number of vertices on the inner side of the first diagonal strip, and the number of vertices on the outer side of the second diagonal strip being greater than the number of vertices on the inner side of the second diagonal strip, where the inner side of the second diagonal strip is the same as the outer side of the first diagonal strip.

By ensuring that the patch coordinates that correspond to the domain coordinates of the vertices on the outer side of the diagonal strips remain within reuse buffer 78, the techniques described in this disclosure may progressively grow the number of patch coordinates that are stored in reuse buffer 78. Then, when reuse buffer 78 becomes full, reuse buffer 78 may remove patch coordinates that correspond to domain coordinates of vertices that reside along the inner side of the diagonal strips. As there are fewer primitives in the inner side of the diagonal strip, these primitives may not share as many vertices, if any, with other primitives in the domain. Accordingly, if the patch coordinates that correspond to the domain coordinates of these inner side vertices are removed from reuse buffer 78, the impact on the number of times domain shader 76 needs to execute may be minor. In this way, this mode of operation allows for a reduction in the number of times domain shader 76 needs to execute as compared to the examples described above with respect to FIGS. 3-5.

The example mode of operation where the second diagonal strip is tangent with the first diagonal strip may also minimize the execution of domain shader 76 by increasing the likelihood that patch coordinates that correspond to domain coordinates of shared vertices remain in reuse buffer 78. For example, if the storage capabilities of reuse buffer 78 (e.g., the number of slots in reuse buffer 78) is sufficiently large and/or the number of vertices in the domain is sufficiently small, after connectivity generator 72 outputs the domain coordinates for the primitives in the second diagonal strip, reuse buffer 78 may still store the patch coordinates that correspond to the domain coordinates of primitives in the first diagonal strip.

Then, when connectivity generator 72 outputs the domain coordinates of primitives in the third diagonal strip, controller 74 may determine that domain shader 76 does not need to execute for many of the domain coordinates. For example, in this mode of operation, the inner side of the third diagonal strip may be the same as the outer side of the first diagonal strip. The patch coordinates that correspond to the domain coordinates for the vertices that reside along the outer side of the diagonal strip may still be stored in reuse buffer 78, and controller 74 may determine that domain shader 76 does not need to execute for at least these vertices.

In this way, even in the mode of operation where the second diagonal strip is tangent with the first diagonal strip, the techniques described in this disclosure may progressively grow the patch coordinates that are stored in reuse buffer 78 such that patch coordinates that correspond to domain coordinates that reside on the outer side of the diagonal strips remain in reuse buffer 78 and patch coordinates that correspond to domain coordinates that reside on the inner side of the diagonal strips are removed from reuse buffer 78. For instance, in the mode of operation where the second diagonal strip is tangent with the first diagonal strip, the number of primitives in the third diagonal strip may be greater than the number of primitives in the first diagonal strip.

Accordingly, the number of vertices that resides on the inner side of the first diagonal strip are less than the number of vertices that reside on the outer side of the first diagonal strip. In this manner, even if reuse buffer 78 removes the patch coordinates that correspond to the domain coordinates of vertices that reside along the inner side of the first diagonal strip, there may be minor, if any, negative impact on the number of times domain shader 76 needs to execute. In this way, this mode of operation also allows for a reduction in the number of times domain shader 76 needs to execute as compared to the examples described above with respect to FIGS. 3-5.

As described above, point generators 70 and connectivity generator 72 together may divide the domain into a plurality of portions, where at least one of the portions is a contiguous portion. Point generators 70 and connectivity generator 72 together may divide the domain into the plurality of portions based on the tessellation factors and the storage capability of reuse buffer 78. Point generators 70 and connectivity generator 72 may then implement one of the example modes of operations described above based on the manner in which point generators 70 and connectivity generator 72 divides the domain.

For a quad domain, tessellation unit 66 may receive an $f_x$ tessellation factor, and an $f_y$ tessellation factor. The $f_x$ tessellation factor may indicate the number of vertices that reside on a ring in the x-direction, and the $f_y$ tessellation factor may indicate the number of vertices that reside on a ring in the y-direction. For example, point generators 70 of tessellation unit 66 may utilize the $f_x$ tessellation factor and the $f_y$ tessellation factor to determine the number of points that reside on each of the rings. It should be noted that although rings are needed to determine the location of the points (e.g., the vertices), connectivity generator 72 outputs primitives in diagonal strips and not based on the rings. In other words, once point generators 70 utilize the rings to determine the location of the vertices, connectivity generator 72 outputs domain coordinates of the vertices of the primitives in the diagonal strips, and not in the ring-by-ring fashion described above with respect to FIGS. 3-5.

In some examples, setup unit 68 may preprocess the $f_x$ and $f_y$ tessellation factors. For example, setup unit 68 may round $f_x$ and $f_y$ to integer values if tessellation unit 66 is to apply integer partitioning. Setup unit 68 may round $f_x$ and $f_y$ to an odd integer if tessellation unit 66 is to apply odd fractional partitioning. Setup unit 68 may round $f_x$ and $f_y$ to an even integer if tessellation unit 66 is to apply even fractional partitioning. Setup unit 68 may round $f_x$ and $f_y$ to $2^n$ (i.e., a dyadic integer) if tessellation unit 66 is to apply power of 2 (pow2) partitioning. In any event, this disclosure refers to the $f_x$ and $f_y$ tessellation factors as being factors subsequent to the preprocessing by setup unit 68.

Connectivity generator 72 may divide the quad domain based on the lesser of $f_x$ and $f_y$. For example, a processing unit (e.g., controller 74 and/or tessellation unit 66) may determine the lesser of $f_x$ and $f_y$. For instance, let $f_1$ equal the lesser of $f_x$ and $f_y$, where $f_2$ equals the greater of $f_x$ and $f_y$. If $f_x$ is equal to $f_y$, then let $f_1$ equal either $f_x$ or $f_y$. In other words, $f_1$ is less than or equal to $f_2$ (i.e., $f_1 \leq f_2$).

The above example assumed the domain to be a quad domain. For a triangle domain, tessellation unit 66 may not receive an $f_x$ and an $f_y$ tessellation factor. Rather, tessellation unit 66 may receive one tessellation factor, which this disclosure refers to as $f_1$ for simplicity.

As described in more detail the value of tessellation factor $f_1$ may determine the manner in which point generators 70 and connectivity generator 72 divide the domain. Also, the number of slots in reuse buffer 78 may determine the manner in which point generators 70 and connectivity generator 72 divide the domain. Let "C" equal the number of slots in reuse buffer 78 (i.e., the storage capabilities of reuse buffer 78).

In some examples, controller 74 may determine whether $f_1+1$ is less than or equal to C−2. It should be understood that it may be possible for tessellation unit 66 to determine whether $f_1+1$ is less than or equal to C−2. For example, tessellation unit 66 may be preloaded with the value of C. In other words, the processing unit (e.g., controller 74 and/or tessellation unit 66) may determine whether $f_1+1$ is less than or equal to C−2. However, for ease of description, controller 74 is described as determining whether $f_1+1$ is less than or equal to C−2.

If controller 74 determines that $f_1+1$ is less than or equal to C−2, then controller 74 may instruct connectivity generator 72 to operate in a first mode of operation. This first mode of operation may be referred to as a joint diagonal walk. In the first mode of operation, point generators 70 and connectivity generator 72 may divide the domain into two portions, where one or more both portions are contiguous portions. For example, point generators 70 and connectivity generator 72 may divide the quad domain into two halves, and may implement the first mode of operation on each of the two halves. As another example, point generators 70 and connectivity generator 72 may divide the triangle domain into a one-third portion and a two-thirds portion. In this example, point generators 70 and connectivity generator 72 may implement a first mode of operation on the two-thirds portion, and may implement a second mode of operation, described in more detail below, on the one-third portion.

Figure 7:
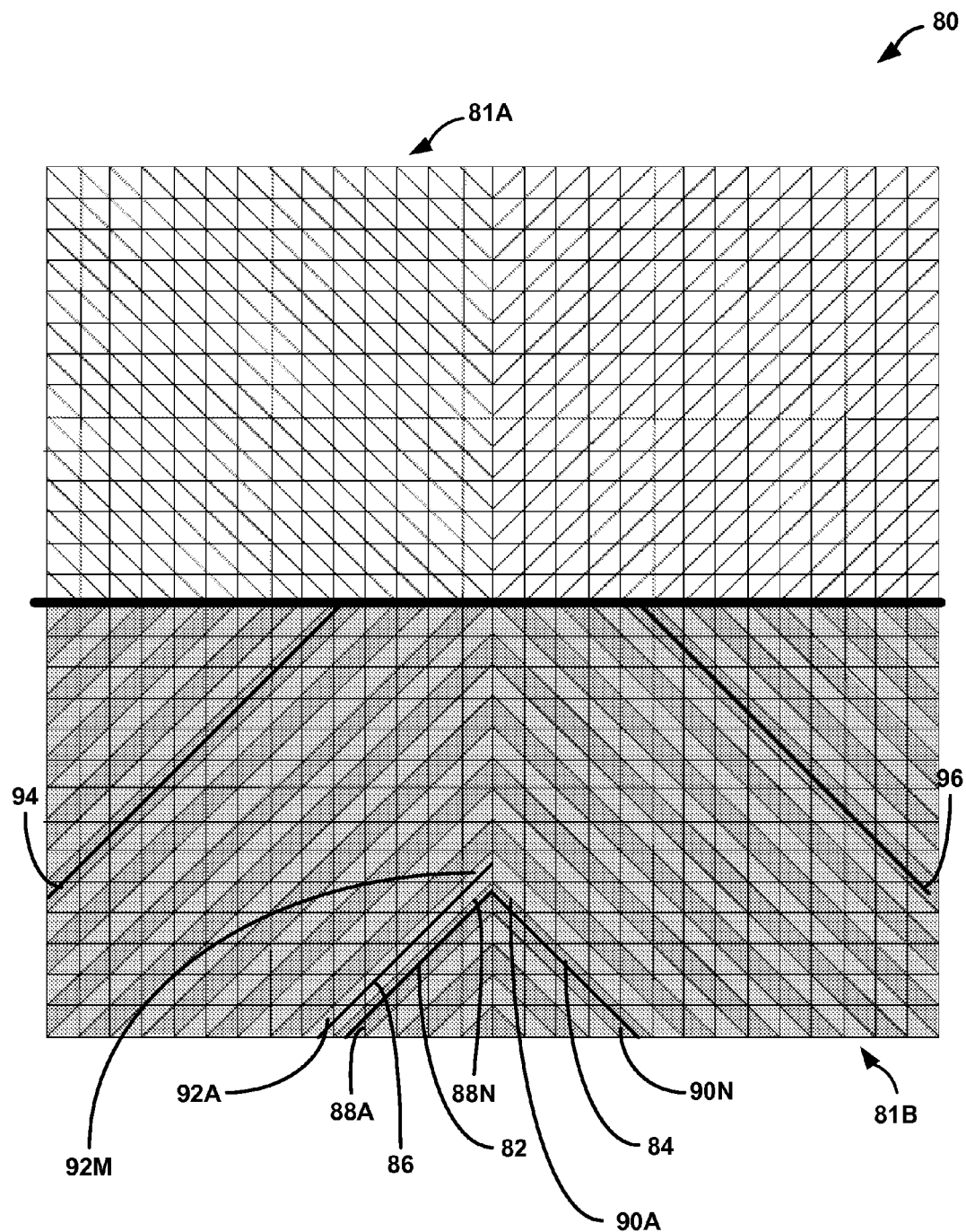
FIG. 7 is a diagram illustrating an example technique of outputting domain coordinates of vertices of primitives in a contiguous portion of a domain in accordance with one or more examples described in this disclosure.

FIG. 7 is a diagram illustrating an example technique of outputting domain coordinates of vertices of primitives in a contiguous portion of a domain in accordance with one or more examples described in this disclosure. FIG. 7 illustrates domain 80, which is a quad domain. As illustrated, point generators 70 and connectivity generator 72 may divide domain 80 into two portions 81A and 81B, because in this example, the processing unit (e.g., controller 74 and/or tessellation unit 66) may have determined that $f_1+1$ is less than or equal to C−2. In other words, point generators 70 and connectivity generator 72 may implement the first mode of operation. In this case, portions 81A and 81B may each be considered as joint portions. For instance, if point generators 70 and connectivity generator 72 were to divide domain 80 into quadruplets, then portion 81A includes a joint portion comprising two of the quadruplets, and portion 81B includes a joint portion comprising the other two of the quadruplets.

For purposes of illustration, FIG. 7 illustrates the manner in which connectivity generator 72 may output domain coordinates for primitives within portion 81B. It should be understood that connectivity generator 72 outputs the domain coordinates based on the determined domain coordinates by point generators 70. Portion 81B is a contiguous portion because all primitives of domain 80 that fall within portion 81B are included as part of portion 81B. For instance, portion 81B does not create a gap in domain 80.

In the example illustrated in FIG. 7, connectivity generator 72 may start outputting domain coordinates of primitives that are located at the center of portion 81B, along the x-axis boundary of domain 80, and extend outwards. This is further illustrated with respect to first diagonal strip 82, second diagonal strip 84, and third diagonal strip 86. For instance, first diagonal strip 82 includes primitives 88A to 88N, second diagonal strip 84 includes primitives 90A to 90N, and third diagonal strip 86 includes primitives 92A to 92M.

In the first mode of operation (e.g., where $f_1+1$ is less than or equal to C−2), second diagonal strip 84 may include a same number of primitives as first diagonal strip 82. For example, in FIG. 7, first diagonal strip 82 includes "N" number of primitives and second diagonal strip 84 also includes "N" number of primitives. In the first mode operation, third diagonal strip 86 includes a different number of primitives than first diagonal strip 82 and second diagonal strip 84. For instance, third diagonal strip 86 includes "M" number of primitives.

Also, in the first mode of operation, second diagonal strip 84 is tangent with first diagonal strip 82. For example, second diagonal strip 84 includes only one primitive that shares two vertices with only one primitive of first diagonal strip 82. As illustrated in FIG. 7, primitive 90A of second diagonal strip 84 shares two vertices with primitive 88N of first diagonal strip 82, and none of the remaining primitives of second diagonal strip 84 shares two vertices with any remaining primitives of first diagonal strip 82.

Furthermore, in the first mode of operation, third diagonal strip 86 is parallel with first diagonal strip 82, but not parallel with second diagonal strip 84. Each of first diagonal strip 82, second diagonal strip 84, and third diagonal strip 86 may include an inner side and an outer side. The inner side refers to the side of first diagonal strip 82, second diagonal strip 84, and third diagonal strip 86 that is closer to the center of portion 81B, and the outer side refers to the side of first diagonal strip 82, second diagonal strip 84, and third diagonal strip 86 that is away from the center of portion 81B.

Two diagonal strips being parallel with one another means that the two diagonal strips start from the same axis and extend outwards in the same direction. For example, first diagonal strip 82 and third diagonal strip 86 both start along the x-axis of domain 80 and extend outwards in the same direction. Second diagonal strip 84 starts along the x-axis of domain 80 but does not extend outwards in the same direction as first diagonal strip 82 and third diagonal strip 86.

In some examples, two diagonal strips being parallel with one another means that an outer side of one of the two diagonal strips is the same as an inner side of the other of the two diagonal strips. For example, the outer side of first diagonal strip 82 is the same as the inner side of third diagonal strip 86. Accordingly, third diagonal strip 86 is parallel with first diagonal strip 82. However, neither the inner side nor the outer side of second diagonal strip 84 is the same as the inner side or outer side of first diagonal strip 82 and third diagonal strip 86. Accordingly, third diagonal strip 86 is not parallel with second diagonal strip 84.

Furthermore, even if two diagonal strips do not share an inner side and outer side, it may be possible for the two diagonal strips to be considered parallel with one another. For instance, as described above, if two diagonal strips start from a same axis of the domain and extend outwards in the same direction, the two diagonal strips may be considered as being parallel with one another.

In FIG. 7, connectivity generator 72 may output the domain coordinates for primitives 88A to 88N (i.e., domain coordinates for primitives in first diagonal strip 82). For any of these domain coordinates of primitives 88A to 88N, for which reuse buffer 78 does not store corresponding patch coordinates, controller 74 may cause an instantiation of domain shader 76 to execute, and domain shader 76 may store the transformed coordinates (i.e., the patch coordinates that correspond to the domain coordinates) in reuse buffer 78. Connectivity generator 72 may then output domain coordinates for primitives 90A to 90N (i.e., domain coordinates for primitives in second diagonal strip 84). Again, for any of these domain coordinates of primitives 90A to 90N, for which reuse buffer 78 does not store corresponding patch coordinates, controller 74 may cause an instantiation of domain shader 76 to execute, and domain shader 76 may store the transformed coordinates in reuse buffer 78. Next, connectivity generator may output domain coordinates for primitives 92A to 92M (i.e., domain coordinates for primitives in third diagonal strip 86). As above, for any of these domain coordinates of primitives 92A to 92M, for which reuse buffer 78 does not store corresponding patch coordinates, controller 74 may cause an instantiation of domain shader 76 to execute, and domain shader 76 may store the transformed coordinates in reuse buffer 78.

Connectivity generator 72 may keep outputting domain coordinates in this manner until connectivity generator 72 completes outputting domain coordinates of all of the primitives in portion 81B. Connectivity generator 72 may then repeat these steps with respect to portion 81A. As illustrated in FIG. 7, portion 81B and portion 81A share many vertices. In some cases, it may be possible that the patch coordinates that correspond to the domain coordinates for some of these vertices that shared by portion 81A and portion 81B are no longer available in reuse buffer 78. For some of vertices, controller 74 may cause domain shader 76 to execute. However, although domain shader 76 may need execute for retransforming the domain coordinates of these shared vertices to patch coordinates, the techniques described in this disclosure may still reduce the overall number of times domain shader 76 needs to execute, as compared to the examples illustrated in FIGS. 3-5.

In some instances, as illustrated in FIG. 7, after outputting primitives of a diagonal strip, there may be no diagonal strip that is congruent (i.e., tangent) to that diagonal strip. In this case, connectivity generator 72 may output primitives of the diagonal strip that is the mirror opposite. For example, after connectivity generator 72 outputs the domain coordinates of primitives within diagonal strip 94, there may be no tangent diagonal strip to diagonal strip 94. In this case, connectivity generator 72 may output the domain coordinates of primitives in diagonal strip 96, which is the mirror opposite of diagonal strip 94.

Diagonal strips that are mirror opposites of one another refer to diagonal strips that would intersect a line of symmetry within the domain at the same point if extended. For instance, in FIG. 7, the line of symmetry may be considered as a vertical line that extends upwards from a center bottom-end of domain 80 or downwards from a center top-end of domain 80. In this example, if diagonal strip 94 and diagonal strip 96 extended further, diagonal strip 94 and diagonal strip 96 would intersect along the line of symmetry of domain 80.

In this manner, as illustrated in FIG. 7, connectivity generator 72 starts from the center of the bottom-end of portion 81B and outputs domain coordinates of primitives extending in the outwards direction towards both the right-end and left-end of portion 81B, and towards the top-end of portion 81B. Alternatively, connectivity generator 72 may start from the center of top-end of portion 81B outwards towards both the right-end and left-end of portion 81B, and towards the bottom-end of portion 81B. In this case, the likelihood that patch coordinates that correspond to the domain coordinates of vertices that are shared by portion 81B and 81A will be removed from reuse buffer 78. Accordingly, it may be more advantageous for connectivity generator 72 to start from the center of bottom-end of portion 81B, rather than the top-end of portion 81B. In either situation (e.g., starting from top-end or bottom-end of portion 81), the output scheme may be referred to as a joint walk in the x-direction because first diagonal strip 82 starts from the x-axis, and second diagonal strip 84 ends at the x-axis.

However, the techniques described in this disclosure are not so limited. In some other examples, point generators 70 and connectivity generator 72 may divide domain 80 into two vertical portions, rather than the horizontal portions illustrated in FIG. 7. In this case, connectivity generator 72 may start from a center of the left-end or a center of the right-end and output domain coordinates of primitives extending in the outwards direction towards both the top-end and the bottom-end of a vertical portion of the two vertical portions. Such an output scheme may be referred to as a joint walk in the y-direction because the first diagonal strip, in this example, may start from the y-axis of the domain, and the second diagonal strip, in this example, may end at the y-axis of the domain. For instance, the joint walk in the y-direction may be considered as the same as the joint walk in the x-direction if domain 80 were rotated 90 degrees.

When the processing unit (e.g., controller 74 or tessellation unit 66) determines that connectivity generator 72 is to implement the first mode of operation, controller 74 may further determine whether connectivity generator 72 is to implement the joint walk in the x-direction or the joint walk in the y-direction. For example, controller 74 may determine whether connectivity generator 72 is to implement the joint walk in the x-direction or the joint walk in the y-direction based on the tessellation factors.

For instance, in the first mode of operation, $f_1+1$ is less than or equal to C−2, and $f_1$ equaled to the lesser of $f_x$ and $f_y$. If controller 74 determines that $f_1$ equals $f_x$ (i.e., $f_x$ is less than or equal to $f_y$), then controller 74 may determine that connectivity generator 72 is to implement the joint walk in the x-direction to output the domain coordinates of primitives in the contiguous portion. If controller 74 determines that $f_1$ equals $f_y$ (i.e., $f_y$ is less than or equal to $f_x$), then controller 74 may determine that connectivity generator 72 is to implement the joint walk in the y-direction to output the domain coordinates of primitives in the contiguous portion. Connectivity generator 72 may then output domain coordinates of primitives in the contiguous portion in either the joint walk in the x-direction or joint walk in the y-direction based on the determination of controller 74.

Figure 8:
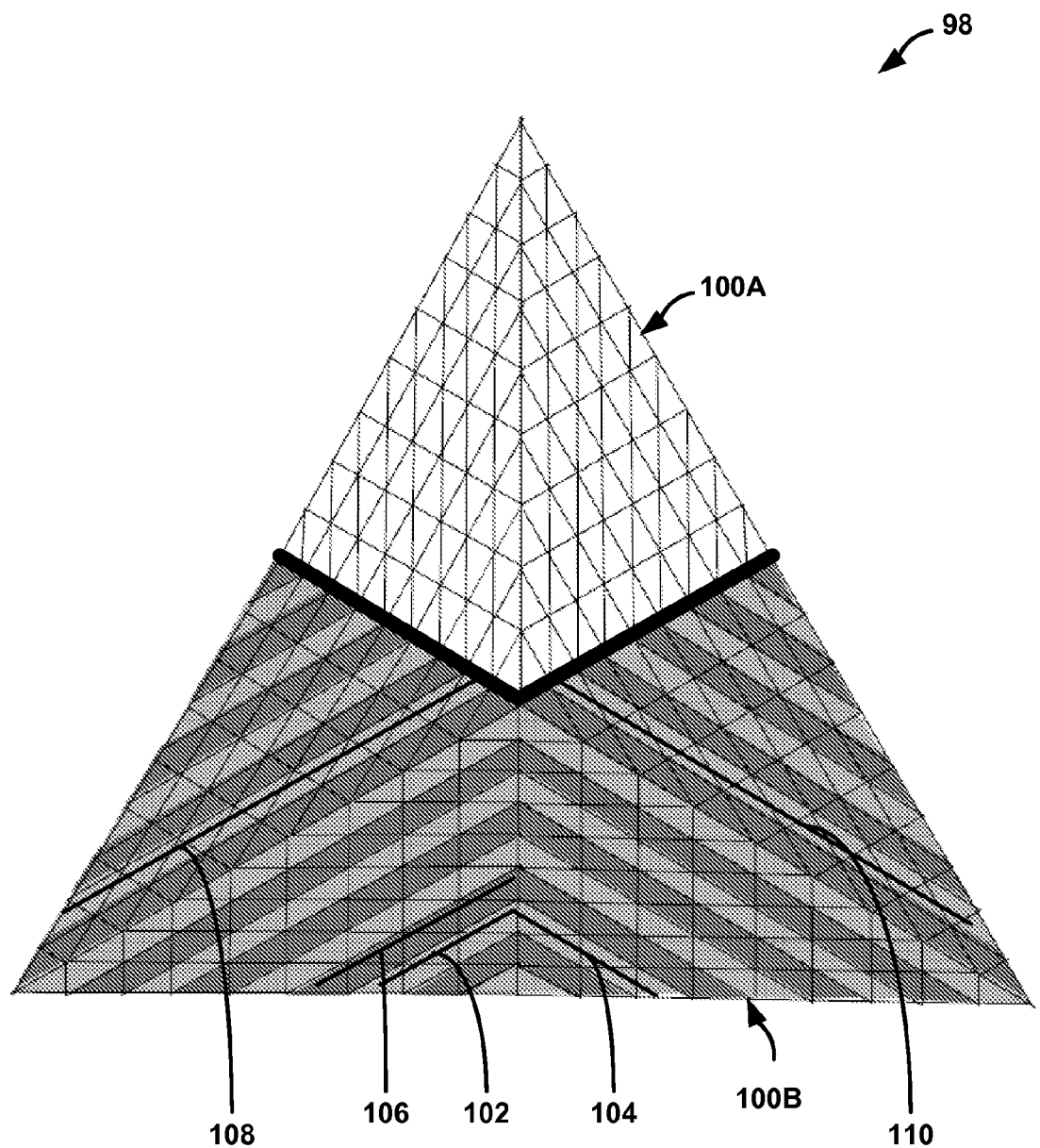
FIG. 8 is a diagram illustrating another example technique of outputting domain coordinates of vertices of primitives in a contiguous portion of a domain in accordance with one or more examples described in this disclosure.

FIG. 8 is a diagram illustrating another example technique of outputting domain coordinates of vertices of primitives in a contiguous portion of a domain in accordance with one or more examples described in this disclosure. FIG. 8 illustrates domain 98, which is a triangle domain. As illustrated, point generators 70 and connectivity generator 72 may divide domain 98 into two portions 100A and 100B, because in this example, the processing unit (e.g., controller 74 or tessellation unit 66) may have determined that $f_1+1$ is less than or equal to C−2. In other words, similar to FIG. 7, connectivity generator 72 may implement the first mode of operation.

For triangle domain 98, tessellation unit 66 may receive one tessellation factor that indicates the number of points that reside along each side of a ring, rather than two tessellation factors (i.e., $f_x$ and $f_y$) for a quad domain such as quad domain 80 of FIG. 7. For consistency, the tessellation factor that indicates the number of points that reside along each side of a ring for triangle domain 98 is referred to as $f_1$. However, $f_1$ may simply be referred to as f, as there is no $f_x$ and $f_y$ tessellation factors.

Furthermore, in the first mode of operation where connectivity generator point generators 70 and 72 divide domain 98 into two portions, one of the two portions may include one-third of domain 98 and the other of the two portions may include two-thirds of domain 98. For example, portion 100B is a contiguous portion that includes two-thirds of domain 98, and portion 100A is a contiguous portion that includes one-third of domain 98.

It may be possible for point generators 70 and connectivity generator 72 to divide domain 98 into equal halves. However, in the case where $f_1+1$ is less than or equal to C−2, there may be sufficient storage slots in reuse buffer 78 for connectivity generator 72 to output domain coordinates for primitives within two-thirds of domain 98 (i.e., within portion 100B). Because two-thirds of domain 98 is larger than one-half of domain 98, it may be more advantageous for connectivity generator 72 to divide domain 98 into a one-third portion 100A and a two-thirds portion 100B.

For purposes of illustration, FIG. 8 illustrates the manner in which connectivity generator 72 may output domain coordinates for primitives within portion 100B. As described above, connectivity generator 72 may output domain coordinates that point generators 70 determined. Outputting domain coordinates of primitives in portion 100B may be considered as a joint walk because portion 100B is a combination of two triplets (e.g., two-thirds of domain 98 equals a combination of two one-thirds of domain 98).

In the example illustrated in FIG. 8, connectivity generator 72 may start outputting domain coordinates of primitives that are located at the center of portion 100B and extend outwards. For example, FIG. 8 illustrates first diagonal strip 102, second diagonal strip 104, and third diagonal strip 106. In this example, connectivity generator 72 may output the domain coordinates of primitives that reside within first diagonal strip 102, followed by the domain coordinates of primitives that reside with second diagonal strip 104, and then followed by the domain coordinates of primitives that reside with third diagonal strip 106. After the outputting of the domain coordinates, for each of the diagonal strips, for any of the domain coordinates, for which reuse buffer 78 does not store corresponding patch coordinates, controller 74 may cause an instantiation of domain shader 76 to execute, and domain shader 76 may store the transformed coordinates (i.e., the patch coordinates that correspond to the domain coordinates) in reuse buffer 78.

In the example illustrated in FIG. 8, because connectivity generator 72 is implementing the first mode of operation, second diagonal strip 104 is tangent to first diagonal strip 102, and second diagonal strip 104 may include the same number of primitives as first diagonal strip 102. Also, in the first mode of operation, third diagonal strip 106 may be parallel with first diagonal strip 102, and not diagonal with second diagonal strip 104. As illustrated, third diagonal strip 106 may include a different number of primitives than the first diagonal strip 102 and the second diagonal strip 104.

Connectivity generator 72 may keep outputting domain coordinates in this manner until connectivity generator 72 completes outputting domain coordinates of all of the primitives in portion 100B. It should be understood that although FIG. 8 illustrates portion 100B as including the bottom two-thirds of domain 98, aspects of this disclosure are not so limited. In other examples, portion 100B may include the right or left two-thirds of domain 98. For portion 100A, connectivity generator 72 may output primitives in accordance with a second mode of operation described below.

In the examples illustrated in FIGS. 7 and 8, point generators 70 and connectivity generator 72 may implement the joint walk, where joint walk includes two sections of a quadruplet for a quad domain, and two sections of a triplet for a triangle domain. In the joint walk, the two sections are adjacent to one another and share vertices on a hypothetical middle line extending throughout the domain (i.e., in the vertical direction in FIGS. 7 and 8). FIGS. 7 and 8 also illustrate an example of uniform tessellation in which there are the same number of vertices along each of the rings, and the number of vertices along each of the rings is even. This may allow point generators 70 of tessellation unit 66 to exploit the symmetry pattern in the tessellation and save computations by computing the coordinates for half the vertices along a ring, and mirroring the coordinates of the other half of the vertices along the ring using an internal buffer (other than or including reuse buffer 78).

Similar to FIG. 7, after outputting primitives of a diagonal strip, there may be no diagonal strip that is congruent to that diagonal strip. In this case, connectivity generator 72 may output primitives of the diagonal strip that is the mirror opposite. For example, after connectivity generator 72 outputs the domain coordinates of primitives within diagonal strip 108, there may be no diagonal strip that is tangent to diagonal strip 108. In this case, connectivity generator 72 may output the domain coordinates of primitives in diagonal strip 110, which is the mirror opposite of diagonal strip 108. For example, if diagonal strip 108 and diagonal strip 110 were to extend, diagonal strip 108 and diagonal strip 110 would meet at the same point along a line of symmetry.

Figure 9:
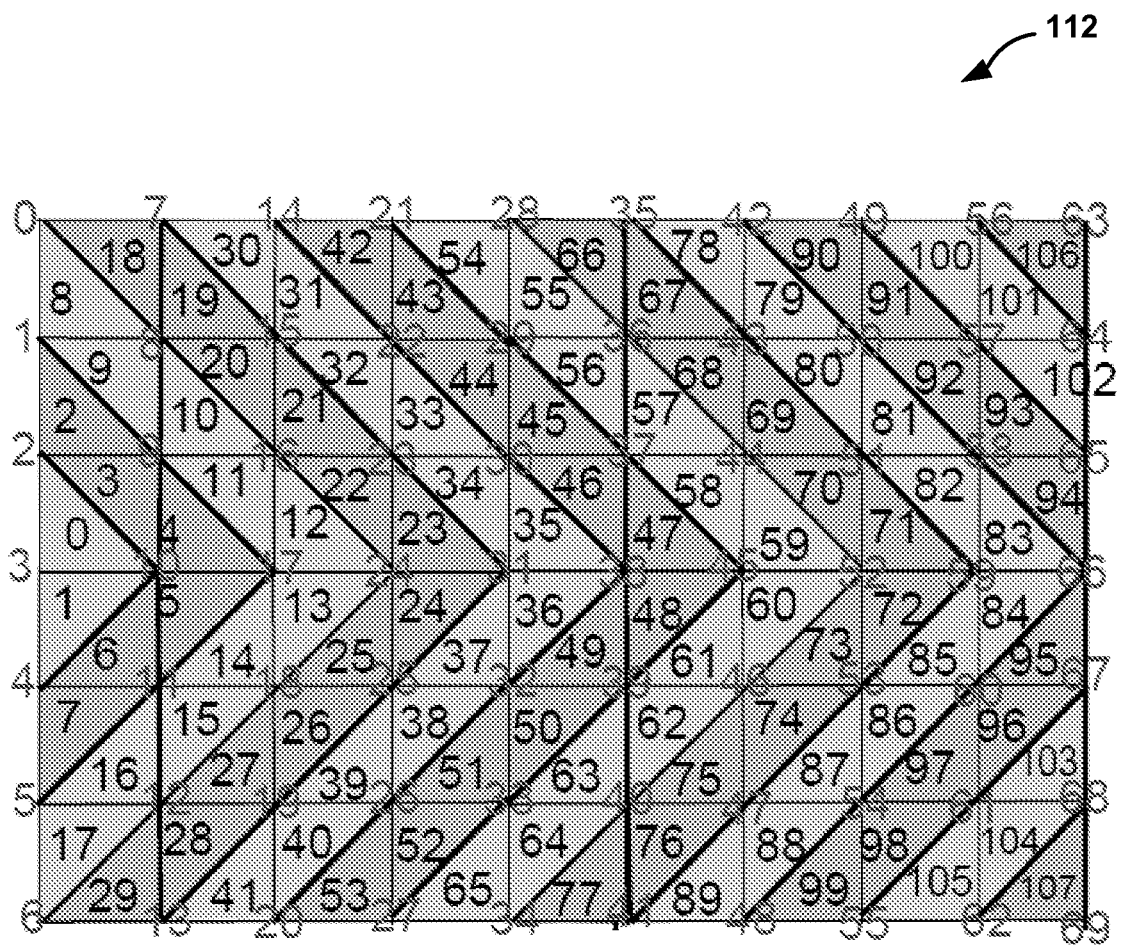
FIG. 9 is a diagram illustrating an example of a contiguous portion of a domain that a connectivity generator outputs in accordance with one or more examples described in this disclosure.

FIG. 9 is a diagram illustrating an example of a contiguous portion of a domain that a connectivity generator outputs in accordance with one or more examples described in this disclosure. For example, FIG. 9 illustrates contiguous portion 112. The primitives of contiguous portion 112 are identified by numeral values within the primitives, and indicate the order in which connectivity generator 72 may output the domain coordinates. For example, connectivity generator 72 may output the domain coordinates of vertices of primitive 0, followed by primitive 1, followed by primitive 2, and so forth. The numerical values at the vertices of the primitives represent domain coordinates. For example, the domain coordinates for primitive 0 are (2, 3, 10). It should be understood that the domain coordinates are (u, v) coordinates or (u, v, w) coordinates. However, for ease of description, the domain coordinates are provided with a single value.

In the example illustrated in FIG. 9, $f_y$ equals 6, and $f_x$ equals 18. However, for ease of illustration only half of contiguous portion is illustrated. For instance, FIG. 9 illustrates six segments along the y-axis, where a segment is a line between two vertices, and nine segments along the x-axis. The full contiguous portion includes six segments along the y-axis and eighteen segments along the x-axis. For ease of illustration, only the part of the contiguous portion that includes six segments along the y-axis and nine segments along the x-axis is illustrated (i.e., half of the contiguous portion). For instance, $f_y$ equals 6 because there are six segments along the y-axis, where a segment includes two end points, and the two end points are vertices of primitives. In FIG. 9, $f_x$ equals 18 because there are actually eighteen segments along the x-axis, but only nine of the eighteen segments are illustrated in FIG. 9.

Also, in the example illustrated in FIG. 9, assume that the number of slots in reuse buffer 78 is 9 (i.e., C equals 9). In this case, because $f_y$ is less than $f_x$, the processing unit (e.g., controller 74 and/or tessellation unit 66) may determine that $f_1$ equals $f_y$ (i.e., $f_1$ equals 6). In this example, $f_1+1$ equals 7, and C−2 also equals 7. Therefore, in this example, controller 74 may determine that $f_1+1$ is less than or equal to C−2, and may cause point generators 70 and connectivity generator 72 to implement the first mode of operation (i.e., the joint walk).

Furthermore, in this example, because $f_y$ is less than $f_x$, controller 74 may cause point generators 70 and connectivity generator 72 to implement the joint walk in the y-direction. For example, as illustrated in FIG. 9, connectivity generator 72 may start from the left-end of contiguous portion 112 and extend outwards to the right-end of contiguous portion 112. In the example illustrated in FIG. 9, a first diagonal strip may include primitives 2, 3, and 4, a second diagonal strip may include primitives 5, 6, and 7, and a third diagonal strip may include primitives 8, 9, 10, 11, and 12. The first diagonal strip starts from the y-axis, and the second diagonal strip ends at the y-axis, hence joint walk in the y-direction.

In this case, the second diagonal strip is tangent with the first diagonal strip, and the third diagonal strip is parallel with the first diagonal, and not parallel with the second diagonal. Also, the number of primitives in the first and second diagonal strips is the same (i.e., 3 primitives in each), and the number of primitives in the third diagonal strip is different (i.e., 5 primitives instead of 3 primitives).

Table 1 below illustrates the behavior of reuse cache 78 for the first 42 primitives of contiguous portion 112. In Table 1, the first column indicates the primitive, the second column indicates the domain coordinates, and the third column indicates the patch coordinates stored in reuse buffer 78. For ease of illustration, the patch coordinates are given the same value as their corresponding domain coordinates. Also, in the third column of Table 1, patch coordinates that are bolded and underlined indicate the instance when domain shader 78 executed to transform the domain coordinates to patch coordinates.

TABLE 1

| Primitive | Domain Coordinates | Patch Coordinates in 9 slots of reuse buffer 78 |
|---|---|---|
| 0 | (2, 3, 10) | 2, 3, 10, x, x, x, x, x, x |
| 1 | (10, 3, 4) | 2, 3, 10, 4, x, x, x, x, x |
| 2 | (1, 2, 9) | 2, 3, 10, 4, 1, 9, x, x, x |
| 3 | (9, 2, 10) | 2, 3, 10, 4, 1, 9, x, x, x |
| 4 | (9, 10, 17) | 2, 3, 10, 4, 1, 9, 17, x, x |
| 5 | (17, 10, 11) | 2, 3, 10, 4, 1, 9, 17, 11, x |
| 6 | (10, 4, 11) | 2, 3, 10, 4, 1, 9, 17, 11, x |
| 7 | (11, 4, 5) | 2, 3, 10, 4, 1, 9, 17, 11, 5 |
| 8 | (0, 1, 8) | 10, 4, 1, 9, 17, 11, 5, 0, 8 |
| 9 | (8, 1, 9) | 10, 4, 1, 9, 17, 11, 5, 0, 8 |
| 10 | (8, 9, 16) | 4, 1, 9, 17, 11, 5, 0, 8, 16 |
| 11 | (16, 9, 17) | 4, 1, 9, 17, 11, 5, 0, 8, 16 |
| 12 | (16, 17, 24) | 1, 9, 17, 11, 5, 0, 8, 16, 24 |
| 13 | (24, 17, 18) | 9, 17, 11, 5, 0, 8, 16, 24, 18 |
| 14 | (17, 11, 18) | 9, 17, 11, 5, 0, 8, 16, 24, 18 |
| 15 | (18, 11, 12) | 17, 11, 5, 0, 8, 16, 24, 18, 12 |
| 16 | (11, 5, 12) | 17, 11, 5, 0, 8, 16, 24, 18, 12 |
| 17 | (12, 5, 6) | 11, 5, 0, 8, 16, 24, 18, 12, 6 |
| 18 | (7, 0, 8) | 5, 0, 8, 16, 24, 18, 12, 6, 7 |
| 19 | (7, 8, 15) | 0, 8, 16, 24, 18, 12, 6, 7, 15 |
| 20 | (15, 8, 16) | 0, 8, 16, 24, 18, 12, 6, 7, 15 |
| 21 | (15, 16, 23) | 8, 16, 24, 18, 12, 6, 7, 15, 23 |
| 22 | (23, 16, 24) | 8, 16, 24, 18, 12, 6, 7, 15, 23 |
| 23 | (23, 24, 31) | 16, 24, 18, 12, 6, 7, 15, 23, 31 |
| 24 | (31, 24, 25) | 24, 18, 12, 6, 7, 15, 23, 31, 25 |
| 25 | (24, 18, 25) | 24, 18, 12, 6, 7, 15, 23, 31, 25 |
| 26 | (25, 18, 19) | 18, 12, 6, 7, 15, 23, 31, 25, 19 |
| 27 | (18, 12, 19) | 18, 12, 6, 7, 15, 23, 31, 25, 19 |
| 28 | (29, 12, 13) | 12, 6, 7, 15, 23, 31, 25, 19, 13 |
| 29 | (12, 6, 13) | 12, 6, 7, 15, 23, 31, 25, 19, 13 |
| 30 | (14, 7, 15) | 6, 7, 15, 23, 31, 25, 19, 13, 14 |
| 31 | (14, 15, 22) | 7, 15, 23, 31, 25, 19, 13, 14, 22 |
| 32 | (22, 15, 23) | 7, 15, 23, 31, 25, 19, 13, 14, 22 |
| 33 | (22, 23, 30) | 15, 23, 31, 25, 19, 13, 14, 22, 30 |
| 34 | (30, 23, 31) | 15, 23, 31, 25, 19, 13, 14, 22, 30 |
| 35 | (30, 31, 38) | 23, 31, 25, 19, 13, 14, 22, 30, 38 |
| 36 | (38, 31, 32) | 23, 31, 25, 19, 13, 14, 22, 30, 38 |
| 37 | (31, 25, 32) | 31, 25, 19, 13, 14, 22, 30, 38, 32 |
| 38 | (32, 25, 26) | 25, 19, 13, 14, 22, 30, 38, 32, 26 |
| 39 | (25, 19, 26) | 25, 19, 13, 14, 22, 30, 38, 32, 26 |
| 40 | (26, 19, 20) | 19, 13, 14, 22, 30, 38, 32, 26, 20 |
| 41 | (19, 13, 20) | 19, 13, 14, 22, 30, 38, 32, 26, 20 |
| ... | ... | ... |

In Table 1, for primitive 0, controller 74 may cause three instantiations of domain shader 76 to execute to transform the domain coordinates of primitive 0 to patch coordinates. Primitive 1 shares two vertices with primitive 0 (i.e., the vertex with domain coordinate 3 and 10). In this case, for primitive 1, controller 74 may cause one instantiation of domain shader 76 to execute: one for domain coordinate 4. Because the patch coordinates that correspond to domain coordinates 3 and 10 are already stored in reuse buffer 78, controller 74 may not cause an instantiation of domain shader for domain coordinates 3 and 10.

As illustrated in Table 1, after primitive 7, reuse buffer 78 is full. In this case, after connectivity generator 72 outputs the domain coordinates of primitive 8, controller 74 may determine that two instantiations of domain shader 76 need to execute: one for domain coordinate 0 of primitive 8, and one for domain coordinate 8 of primitive 8. Accordingly, reuse buffer 78 may remove the earliest stored patch coordinates, which are patch coordinates 2 and 3, to free storage space for patch coordinates 0 and 8.

Table 1 may indicate the manner in which to efficiently utilize reuse buffer 78 to minimize the execution of domain shader 76 for the first mode of operation. For example, all shared vertices are fully utilized (e.g., no extra cache misses). For instance, the patch coordinates that correspond to the domain coordinates of a vertex remain stored in reuse buffer until connectivity generator 72 outputs the domain coordinates for most of the primitives that share that vertex. This may minimize the number of times domain shader 76 needs to execute.

The above examples described the techniques for the first mode of operation where $f_1+1$ is less than or equal to C−2. However, the condition that $f_1+1$ is less than or equal to C−2 may be not true in every case. For example, for larger values of $f_1$ and/or smaller values of C, compared to above examples, the condition that $f_1+1$ is less than or equal to C−2 may not hold true.

In some examples, if the processing unit (e.g., controller 74 and/or tessellation unit 66) determines that $f_1+1$ is not less than or equal to C−2, controller 74, in this example, may determine whether $f_1/2+1$ is less than or equal to C−1. If controller 74 determines that $f_1/2+1$ is less than or equal to C−1, controller 74 may cause connectivity generator 72 to implement a second mode of operation.

In the second mode of operation, point generators 70 and connectivity generator 72 may divide a quad domain into four portions (e.g., quadruplets), where at least one of the portions is a contiguous portion. In the second mode of operation, point generators 70 and connectivity generator 72 may divide a triangle domain into three portions (e.g., triplets), where at least one of the portions is a contiguous portion.

For the second mode of operation, similar to the first mode of operation, connectivity generator 72 may output domain coordinates of primitives that reside within a first diagonal strip, followed by domain coordinates of primitives that reside within the second diagonal strip, and then followed by domain coordinates of primitives that reside within a third diagonal strip. However, in the second mode of operation, the second diagonal strip is parallel with the first diagonal strip and the third diagonal strip.

For instance, an inner side of the second diagonal strip may be the same as an outer side of the first diagonal strip. Also, an outer side of the second diagonal strip may be the same as an inner side of the third diagonal strip. In this example, because the second diagonal strip is parallel with both the first and the third diagonal strips, the first diagonal strip is parallel with the third diagonal strip even if neither the outer nor inner side of the first diagonal strip is the same as the inner or outer side of the third diagonal strip.

Figure 10:
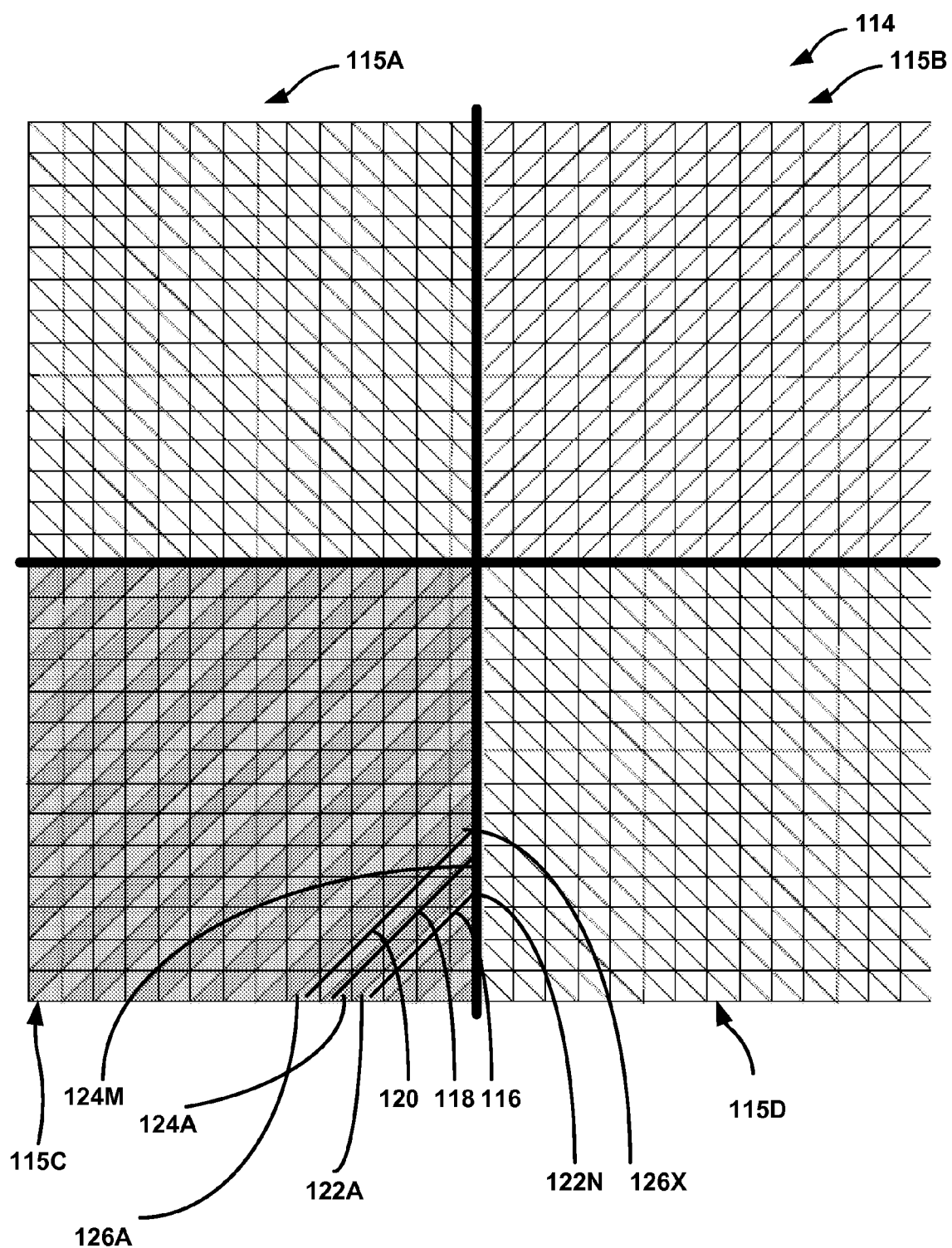
FIG. 10 is a diagram illustrating another example technique of outputting domain coordinates of vertices of primitives in a contiguous portion of a domain in accordance with one or more examples described in this disclosure.

FIG. 10 is a diagram illustrating another example technique of outputting domain coordinates of vertices of primitives in a contiguous portion of a domain in accordance with one or more examples described in this disclosure. FIG. 10 illustrates domain 114, which is a quad domain. As illustrated, connectivity generator 72 may divide domain 114 into four portions 115A-115D, because in this example, controller 74 may have determined that $f_1/2+1$ is less than or equal to C−1 (i.e., connectivity generator 72 is to implement the first mode of operation). In the example of FIG. 7, portions 81A and 81B were described as being joint portions. In the example of FIG. 10, portions 115A-115 may be considered as single portions, where two single portions together form a joint portion.

For purposes of illustration, FIG. 10 illustrates the manner in which connectivity generator 72 may output domain coordinates for primitives within portion 115C. Portion 115C may be considered as a contiguous portion because portion 115C does not create a gap in domain 114.

In the example illustrated in FIG. 10, connectivity generator 72 may start outputting domain coordinates of primitives that are located at a corner of portion 115C and extend outwards towards the opposing corner of portion 115C. For example, in FIG. 10, connectivity generator 72 may start from the bottom-right corner of portion 115C and extent outwards towards the top-left corner of portion 115C. This is further illustrated with respect to first diagonal strip 116, second diagonal strip 118, and third diagonal strip 120. As illustrated, second diagonal strip 118 is closer to the top-right corner than first diagonal strip 116, and third diagonal strip 120 is closer to the top-right corner than both second diagonal strip 118 and first diagonal strip 116.

First diagonal strip 116 includes primitives 122A to 122N, second diagonal strip 118 includes primitives 124A to 124M, and third diagonal strip 120 includes primitives 126A to 126X. In the second mode of operation, second diagonal strip 118 may include a different number of primitives than first diagonal strip 116. For example, second diagonal strip 118 may include "M" number of primitives, and first diagonal strip 116 may include "N" number of primitives, where M and N are different numbers. Also, third diagonal strip 120 may include a different number of primitives than first diagonal strip 116 and second diagonal strip 118. For example, third diagonal strip 120 includes "X" number of primitives, where X is different than M and N.

In the second mode of operation, first diagonal strip 116 may be parallel with second diagonal strip 118. For example, an inner side of second diagonal strip 118 is the same as an outer side of first diagonal strip 116. Also, in the second mode of operation, third diagonal strip 120 may be parallel with second diagonal strip 118. For example, an inner side of third diagonal strip 120 is the same as an outer side of second diagonal strip 118. In this case, because second diagonal strip 118 is parallel with both first diagonal strip 116 and third diagonal strip 120, first diagonal strip 116 and third diagonal strip 120 may be considered parallel with one another.

In FIG. 10, connectivity generator 72 may output the domain coordinates for primitives 122A to 122N (i.e., domain coordinates for primitives in first diagonal strip 116). For any of these domain coordinates of primitives 122A to 122N, for which reuse buffer 78 does not store corresponding patch coordinates, controller 74 may cause an instantiation of domain shader 76 to execute, and domain shader 76 may store the transformed coordinates (i.e., the patch coordinates that correspond to the domain coordinates) in reuse buffer 78. Connectivity generator 72 may then output domain coordinates for primitives 124A to 124M (i.e., domain coordinates for primitives in second diagonal strip 118). Again, for any of these domain coordinates of primitives 124A to 124M, for which reuse buffer 78 does not store corresponding patch coordinates, controller 74 may cause an instantiation of domain shader 76 to execute, and domain shader 76 may store the transformed coordinates in reuse buffer 78. Next, connectivity generator may output domain coordinates for primitives 126A to 126×(i.e., domain coordinates for primitives in third diagonal strip 120). As above, for any of these domain coordinates of primitives 126A to 126X, for which reuse buffer 78 does not store corresponding patch coordinates, controller 74 may cause an instantiation of domain shader 76 to execute, and domain shader 76 may store the transformed coordinates in reuse buffer 78.

In the second mode of operation, connectivity generator 72 may output domain coordinates of primitives in a zig-zag manner. For instance, connectivity generator 72 may start outputting domain coordinates of first diagonal strip 116 starting from the x-axis of domain 114. Then, in some examples, connectivity generator 72 may output domain coordinates of second diagonal strip 118 starting from the x-axis of domain 114. For third diagonal strip 120, connectivity generator 72 may once again start from the x-axis of domain 114. Such outputting may form a zig-zag pattern.

Connectivity generator 72 may keep outputting domain coordinates in this manner until connectivity generator 72 completes outputting domain coordinates of all of the primitives in portion 115C. Connectivity generator 72 may then repeat these steps with respect to portions 115A, 115B, and 115D. As illustrated in FIG. 10, portion 115C and portions 115A, 115B, and 115D share many vertices. In some cases, it may be possible that the patch coordinates that correspond to the domain coordinates for some of these vertices that shared by portion 115C with each one of portions 115A, 115B, and 115D are no longer available in reuse buffer 78. For some of vertices, controller 74 may cause domain shader 76 to execute. However, although domain shader 76 may need execute for retransforming the domain coordinates of these shared vertices to patch coordinates, the techniques described in this disclosure may still reduce the overall number of times domain shader 76 needs to execute, as compared to the examples illustrated in FIGS. 3-5.

In the example of FIG. 10, connectivity generator 72 started from the bottom-right corner of portion 115C and extended outwards towards the top-left corner of portion 115C. Such an output scheme may be referred to as a single walk in the x-direction because connectivity generator 72 starts from the x-axis of domain 114. Another example of the single walk in the x-direction may be where connectivity generator 72 starts from the bottom-left corner of portion 115C and extends outwards towards the top-right corner of portion 115C.

However, aspects of this disclosure are not limited to a single walk in the x-direction. In some other examples, point generators 70 and connectivity generator 72 may implement a single walk in the y-direction, where point generators 70 and connectivity generator 72 start from the top-left corner of portion 115C and extend outwards to the bottom-right corner of portion 115C, or starts from the top-right corner of portion 115C and extends outwards to the bottom-left corner of portion 115C. These output schemes may be referred to as a single walk in the y-direction because point generators 70 and connectivity generator 72 start from the y-axis of domain 114.

The processing unit (i.e., controller 74 in this example) may determine whether connectivity generator 72 is to implement the single walk in the x-direction or the single walk in the y-direction. For example, in the second mode of operation, $f_1/2+1$ is less than or equal to C−1. If controller 74 determines that $f_1$ equals $f_x$ (i.e., $f_x$ is less than or equal to $f_y$), controller 74 may cause connectivity generator 72 to output domain coordinates in accordance with the single walk in the x-direction. If controller 74 determines that $f_1$ equals $f_y$ (i.e., $f_y$ is less than or equal to $f_x$), controller 74 may cause connectivity generator 72 to output domain coordinates in accordance with the single walk in the y-direction.

Figure 11:
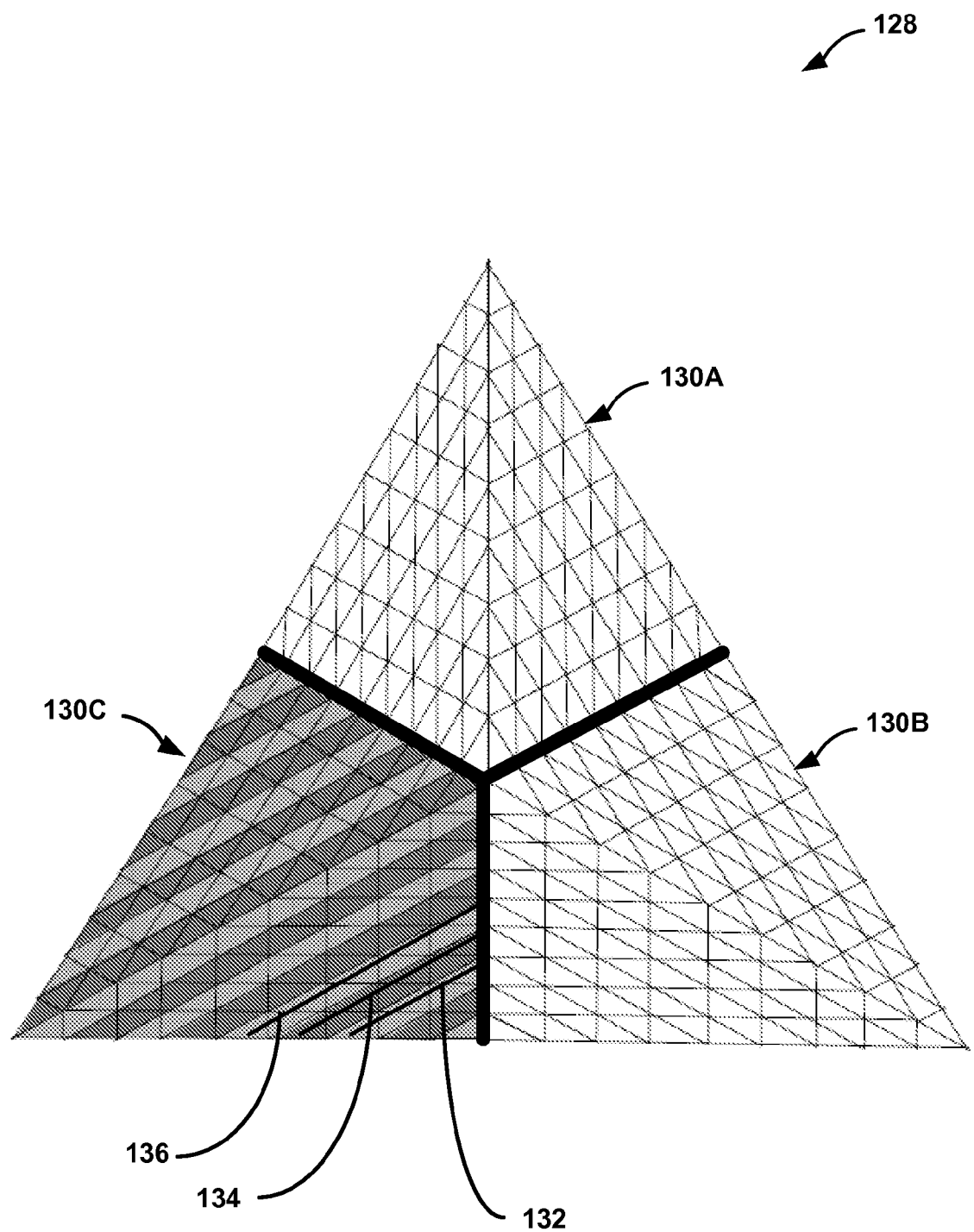
FIG. 11 is a diagram illustrating another example technique of outputting domain coordinates of vertices of primitives in a contiguous portion of a domain in accordance with one or more examples described in this disclosure.

FIG. 11 is a diagram illustrating another example technique of outputting domain coordinates of vertices of primitives in a contiguous portion of a domain in accordance with one or more examples described in this disclosure. FIG. 11 illustrates domain 128, which is a triangle domain. As illustrated, point generators 70 and connectivity generator 72 may divide domain 128 into three portions 130A-130C because the processing unit (controller 74 in this example) may have determined that $f_1/2+1$ is less than or equal to C−1 (e.g., point generators 70 and connectivity generator 72 is to implement the second mode of operation). In this example, $f_1$ may be referred to simply as f because for a triangle domain, tessellation unit 66 may receive one tessellation factor that indicates the number of points that reside on a ring.

For purposes of illustration, FIG. 11 illustrates the manner in which connectivity generator 72 outputs the domain coordinates for primitives in portion 130C. Connectivity generator 72 may similarly output the domain coordinates of primitives within portions 130A and 130B. Furthermore, with respect to FIG. 8, connectivity generator 72 may similarly output the domain coordinates of primitives within portion 1 OOA.

FIG. 11 illustrates portion 130C as including first diagonal strip 132, second diagonal strip 134, and third diagonal strip 136. In this example, first diagonal strip 132 is parallel with second diagonal strip 134, and second diagonal strip 134 is parallel with third diagonal strip 136. Accordingly, first diagonal strip 132 is also parallel with third diagonal strip 136. Furthermore, the number of primitives in first diagonal strip 132 may be different than the number of primitives in second diagonal strip 134, and the number of primitives in third diagonal strip 136 may be different than the number of primitives in first diagonal strip 132 and second diagonal strip 134.

In this example, connectivity generator 72 may output the domain coordinates for primitives in first diagonal strip 132, and controller 74 may execute instantiations of domain shader 76 for each domain coordinate whose corresponding patch coordinate is not stored in reuse buffer 78. Connectivity generator 72 may then output the domain coordinates for primitives in second diagonal strip 134, and controller 74 may execute instantiations of domain shader 76 for each domain coordinate whose corresponding patch coordinate is not stored in reuse buffer 78. Next, connectivity generator 72 may output the domain coordinates for primitives in third diagonal strip 136, and controller 74 may execute instantiations of domain shader 76 for each domain coordinate whose corresponding patch coordinate is not stored in reuse buffer 78.

Connectivity generator 72 may keep outputting domain coordinates in this manner until connectivity generator 72 reaches the last primitive in portion 130C. Then, connectivity generator 72 may output domain coordinates of primitives in portions 130A and 130B in a substantially similar fashion.

Figure 12:
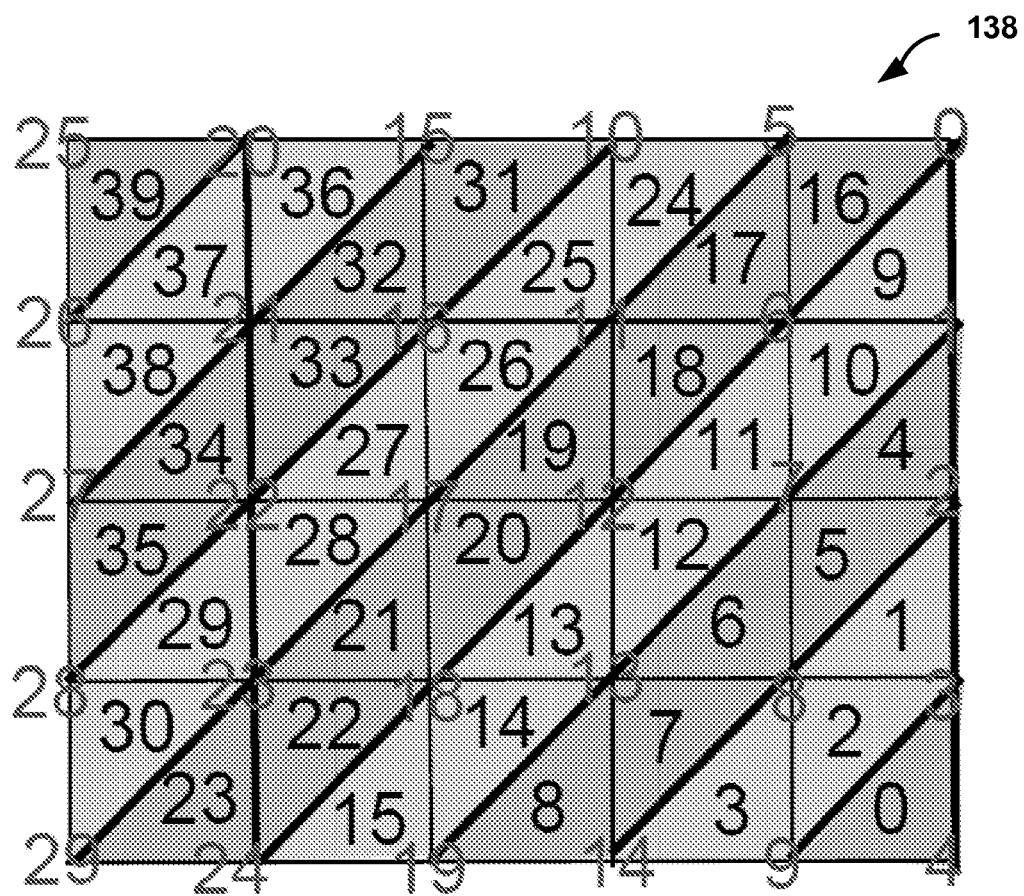
FIG. 12 is a diagram illustrating another example of a contiguous portion of a domain that a connectivity generator outputs in accordance with one or more examples described in this disclosure.

FIG. 12 is a diagram illustrating another example of a contiguous portion of a domain that a connectivity generator outputs in accordance with one or more examples described in this disclosure. For example, FIG. 12 illustrates contiguous portion 138. Similar to FIG. 9, the primitives of contiguous portion 138 are identified by numeral values within the primitives, and indicate the order in which connectivity generator 72 may output the domain coordinates. For example, connectivity generator 72 may output the domain coordinates of vertices of primitive 0, followed by primitive 1, followed by primitive 2, and so forth. The numerical values at the vertices of the primitives represent domain coordinates.

In the example illustrated in FIG. 12, $f_x$ equals 10, and $f_y$ equals 8. FIG. 12 illustrates a quarter of the contiguous portion. For example, FIG. 12 illustrates five segments along the x-axis and four segments along the y-axis, where the full contiguous portion includes ten segments along the x-axis and eight segments along y-axis. Also, in the example illustrated in FIG. 12, assume that the number of slots of reuse buffer 78 is 6 (i.e., C equals 6). In this case, because $f_y$ is less than $f_x$, the processing unit (e.g., controller 74 and/or tessellation unit 66) may determine that $f_1$ equals $f_y$ (i.e., $f_y$ equals 8). In this example, $f_1/2+1$ equals 5, and C−1 also equals 5. Therefore, in this example, controller 74 may determine that $f_1/2+1$ is less than or equal to C−1, and may cause point generators 70 and connectivity generator 72 to implement the second mode of operation (i.e., single walk).

For example, connectivity generator 72 may output domain coordinates of primitives within a first diagonal strip, which may include primitives 1, 2, and 3. Connectivity generator 72 may then output domain coordinates of primitives within a second diagonal strip, which may include primitives 4, 5, 6, 7, and 8. Then, connectivity generator 72 may output domain coordinates of primitives within a third diagonal strip, which may include primitives 9, 10, 11, 12, 13, 14, and 15. In this example, each of the first, second, and third diagonal strips may include different number of primitives (i.e., 3, 5, and 7 primitives, respectively).

Furthermore, in this example, because $f_y$ is less than $f_x$, point generators 70 and connectivity generator 72 may implement the single walk in the y-direction. For example, primitive 1 of the first diagonal strip is located along the y-axis of contiguous portion 138, primitive 4 (i.e., the first primitive of the second diagonal strip) is located along the y-axis of contiguous portion 138, and primitive 9 (i.e., the first primitive of the third diagonal strip) is located along the y-axis of contiguous portion 138.

Table 2 below illustrates the behavior of reuse cache 78 for the 40 primitives of contiguous portion 138. In Table 2, the first column indicates the primitive, the second column indicates the domain coordinates, and the third column indicates the patch coordinates stored in reuse buffer 78. For ease of illustration, the patch coordinates are given the same value as their corresponding domain coordinates. Also, in the third column of Table 2, patch coordinates that are bolded and underlined indicate the instance when domain shader 78 executed to transform the domain coordinates to patch coordinates.

TABLE 2

| Primitive | Domain Coordinates | Patch Coordinates in 6 slots of reuse buffer 78 |
| --- | --- | --- |
| 0 | (3, 9, 4) | 3, 9, 4, x, x, x |
| 1 | (2, 8, 3) | 3, 9, 4, 2, 8, x |
| 2 | (3, 8, 9) | 3, 9, 4, 2, 8, x |
| 3 | (8, 14, 9) | 3, 9, 4, 2, 8, 14 |
| 4 | (1, 7, 2) | 4, 2, 8, 14, 1, 7 |
| 5 | (2, 7, 8) | 4, 2, 8, 14, 1, 7 |
| 6 | (7, 13, 8) | 2, 8, 14, 1, 7, 13 |
| 7 | (8, 13, 14) | 2, 8, 14, 1, 7, 13 |
| 8 | (13, 19, 14) | 8, 14, 1, 7, 13, 19 |
| 9 | (0, 6, 1) | 1, 7, 13, 19, 0, 6 |
| 10 | (1, 6, 7) | 1, 7, 13, 19, 0, 6 |
| 11 | (6, 12, 7) | 7, 13, 19, 0, 6, 12 |
| 12 | (7, 12, 13) | 7, 13, 19, 0, 6, 12 |
| 13 | (12, 18, 13) | 13, 19, 0, 6, 12, 18 |
| 14 | (13, 18, 19) | 13, 19, 0, 6, 12, 18 |
| 15 | (18, 24, 19) | 19, 0, 6, 12, 18, 24 |
| 16 | (0, 5, 6) | 0, 6, 12, 18, 24, 5 |
| 17 | (5, 11, 6) | 6, 12, 18, 24, 5, 11 |
| 18 | (6, 11, 12) | 6, 12, 18, 24, 5, 11 |
| 19 | (11, 17, 12) | 12, 18, 24, 5, 11, 17 |
| 20 | (12, 17, 18) | 12, 18, 24, 5, 11, 17 |
| 21 | (17, 23, 18) | 18, 24, 5, 11, 17, 23 |
| 22 | (18, 23, 24) | 18, 24, 5, 11, 17, 23 |
| 23 | (23, 29, 24) | 24, 5, 11, 17, 23, 29 |
| 24 | (5, 10, 11) | 5, 11, 17, 23, 29, 10 |
| 25 | (10, 16, 11) | 11, 17, 23, 29, 10, 16 |
| 26 | (11, 16, 17) | 11, 17, 23, 29, 10, 16 |
| 27 | (16, 22, 17) | 17, 23, 29, 10, 16, 22 |
| 28 | (17, 22, 23) | 17, 23, 29, 10, 16, 22 |
| 29 | (22, 28, 23) | 23, 29, 10, 16, 22, 28 |
| 30 | (23, 28, 29) | 23, 29, 10, 16, 22, 28 |
| 31 | (10, 15, 16) | 29, 10, 16, 22, 28, 15 |
| 32 | (15, 21, 16) | 10, 16, 22, 28, 15, 21 |
| 33 | (16, 21, 22) | 10, 16, 22, 28, 15, 21 |
| 34 | (21, 27, 22) | 16, 22, 28, 15, 21, 27 |
| 35 | (22, 27, 28) | 16, 22, 28, 15, 21, 27 |
| 36 | (15, 20, 21) | 22, 28, 15, 21, 27, 20 |
| 37 | (20, 26, 21) | 28, 15, 21, 27, 20, 26 |
| 38 | (21, 26, 27) | 28, 15, 21, 27, 20, 26 |
| 39 | (20, 25, 26) | 15, 21, 27, 20, 26, 25 |

In Table 2, for primitive 0, controller 74 may cause three instantiations of domain shader 76 to execute to transform the domain coordinates of primitive 0 to patch coordinates. Primitive 1 shares one vertex with primitive 0 (i.e., the vertex with domain coordinate 3). In this case, for primitive 1, controller 74 may cause two instantiations of domain shader 76 to execute: one for domain coordinate 2 and one for domain coordinate 8. Because the patch coordinates that correspond to domain coordinate 3 is already stored in reuse buffer 78, controller 74 may not cause an instantiation of domain shader for domain coordinate 3.

As illustrated in Table 2, after primitive 3, reuse buffer 78 is full. In this case, after connectivity generator 72 outputs the domain coordinates of primitive 4, controller 74 may determine that two instantiations of domain shader 76 need to execute: one for domain coordinate 1 of primitive 4, and one for domain coordinate 7 of primitive 4. Accordingly, reuse buffer 78 may remove the earliest stored patch coordinates, which are patch coordinates 3 and 9, to free storage space for patch coordinates 1 and 7.

Table 2, as an example, indicates a way in which to efficiently utilize reuse buffer 78 to minimize the execution of domain shader 76 for the second mode of operation. For example, all shared vertices are fully utilized (e.g., no extra cache misses). For instance, similar to the example in Table 1, the patch coordinates that correspond to the domain coordinates of a vertex remain stored in reuse buffer until connectivity generator 72 outputs the domain coordinates for most of the primitives that share that vertex. This may minimize the number of times domain shader 76 needs to execute.

The above examples illustrated the first mode of operation and the second mode of operation. However, in some examples, point generators 70 and connectivity generator 72 may need to implement a third mode of operation. For example, $f_1/2+1 \leq C-1$ can be rewritten as $f_1+2 \leq 2*(C-1)$. If the size of $f_1$ is too large, or the size of C is too small, then there may be instances where $f_1+2$ is not less than or equal to $2*(C-1)$. In these cases, $f_1+1$ may also not be less than or equal to $C-2$. In such cases, it may not be possible for point generators 70 and connectivity generator 72 to divide a quad domain into quadruplets or divide a triangle domain into triplets, and implement the single walk in each of these quadruplets or triplets such that each of the shared vertices is reused.

In such a case (i.e., when $f_1+2$ is greater than $2*(C-1)$), connectivity point generators 70 and generator 72 may implement the third mode of operation. The third mode of operation may be a combination of the first mode of operation and the second mode of operation. For example, when the processing unit (e.g., controller 74 and/or tessellation unit 66) determines that $f_1+2$ is greater than $2*(C-1)$, controller 74, as the example of the processing unit, may cause point generators 70 and connectivity generator 72 to divide a quad domain into more than quadruplets, and may cause point generators 70 and connectivity generator 72 to divide a triangle domain into more than triplets. Connectivity generator 72 may then implement the first mode of operation (e.g., single walk) on a first set of the plurality of portions, and implement the second mode of operation (e.g., joint walk) on a second set of the plurality of portions.

Figure 13:
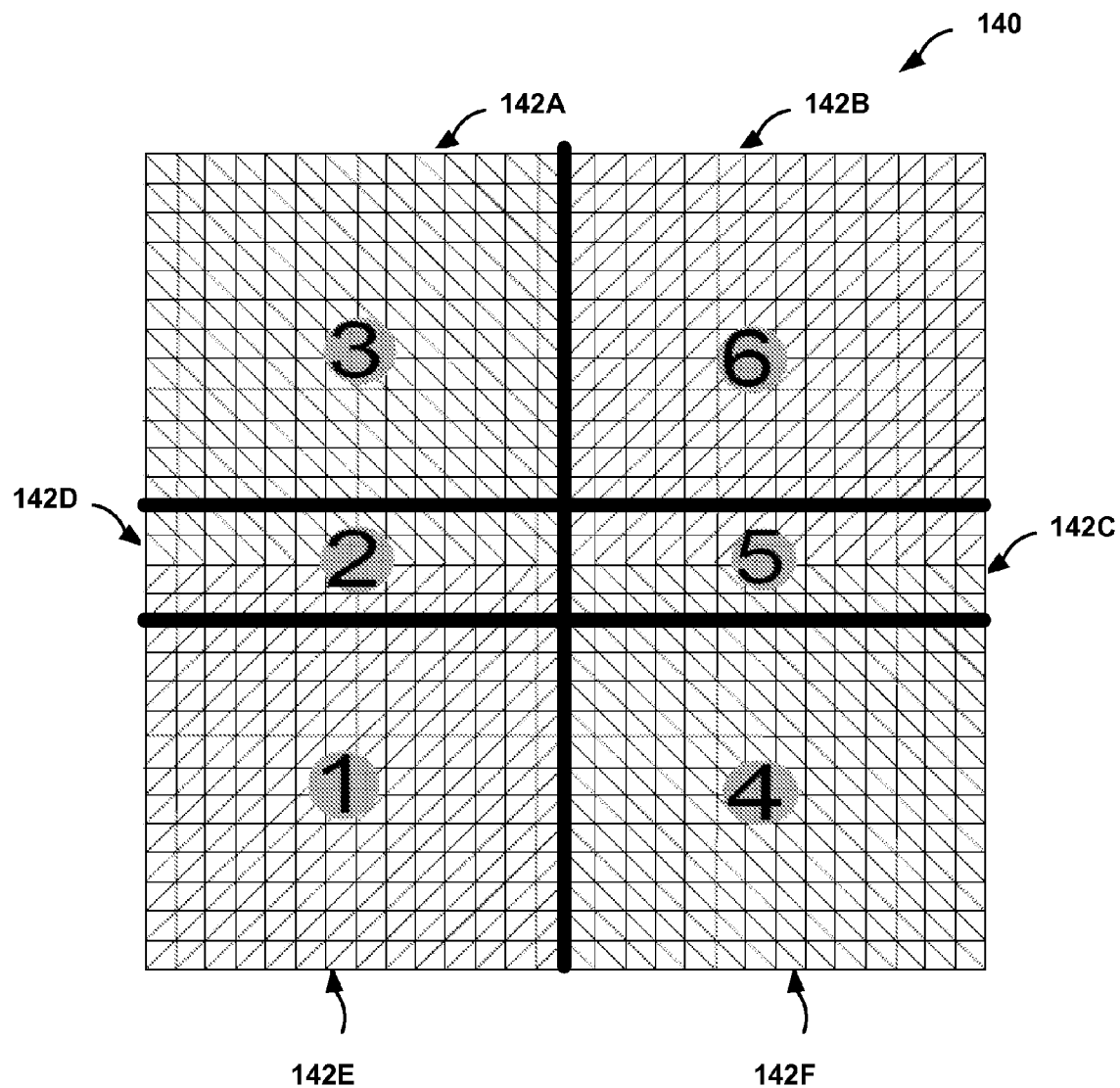
FIG. 13 is a diagram illustrating another example technique of outputting domain coordinates of vertices of primitives in a contiguous portion of a domain in accordance with one or more examples described in this disclosure.

FIG. 13 is a diagram illustrating another example technique of outputting domain coordinates of vertices of primitives in a contiguous portion of a domain in accordance with one or more examples described in this disclosure. FIG. 13 illustrates domain 140, which is a quad domain. In this example, controller 74 may have determined that $f_1+2$ is greater than $2*(C-1)$, and may cause connectivity generator 72 to implement the third mode of operation. For example, connectivity generator 72 may divide quad domain 140 into more than four portions. As illustrated, connectivity generator 72 may divide quad domain 140 into six portions 142A-142F. In this example, controller 74 may cause connectivity generator 72 to implement the single walk (i.e., the first mode of operation) on each one of portions 142A, 142B, 142E, and 142F. Controller 74 may cause connectivity generator 72 to implement the joint walk (i.e., the second mode of operation) across portions 142C and 142D. In other words, controller 74 may combine portions 142C and 142D into a joint portion, and cause connectivity generator 72 to implement the joint walk across the joint portion.

For example, connectivity generator 72 may output domain coordinates of primitives within a first, second, and third diagonal strips, where the diagonal strips are within portion 142A. In this example, the first, second, and third diagonal strips may be parallel with one another. For the joint walk across the combined portions 142C and 142D, connectivity generator may output domain coordinates within a fourth, fifth, and sixth diagonal strips, where the diagonal strips are within combined portions 142C and 142D. In this example, the fifth diagonal strip may be tangent with the fourth diagonal strip, and the sixth diagonal strip may be parallel with the fourth diagonal strip.

In some examples, tessellation unit 66 may have tessellated the example domains illustrated in FIGS. 7, 8, 10, and 11 using uniform tessellation with even tessellation factors. Uniform tessellation means that there are an equal number of points (i.e., vertices) along the rings. Also, in the example illustrated in FIG. 7, the tessellation factors were $f_x$ equals 18 and $f_y$ equals 6 (both of which are even tessellation factors), and in the example illustrated in FIG. 10, the tessellation factors were $f_x$ equals 10 and $f_y$ equals 8 (both of which are even tessellation factors). Even tessellation factors results in mirroring across the half-way point of an edge of the domain.

However, not all domains may be tessellated using uniform tessellation or with even tessellation factors. The following describes a few examples in which the domains are not tessellated using uniform tessellation, and examples in which the tessellation factors are even and odd, and are both odd.

For uniform tessellation with odd tessellation factors, the manner in which connectivity generator 72 divides the domain may be slightly different than the examples with even tessellation factors. However, the order in which connectivity generator 72 outputs the domain coordinates of the primitives may be the same.

Figures 14A, 14B:
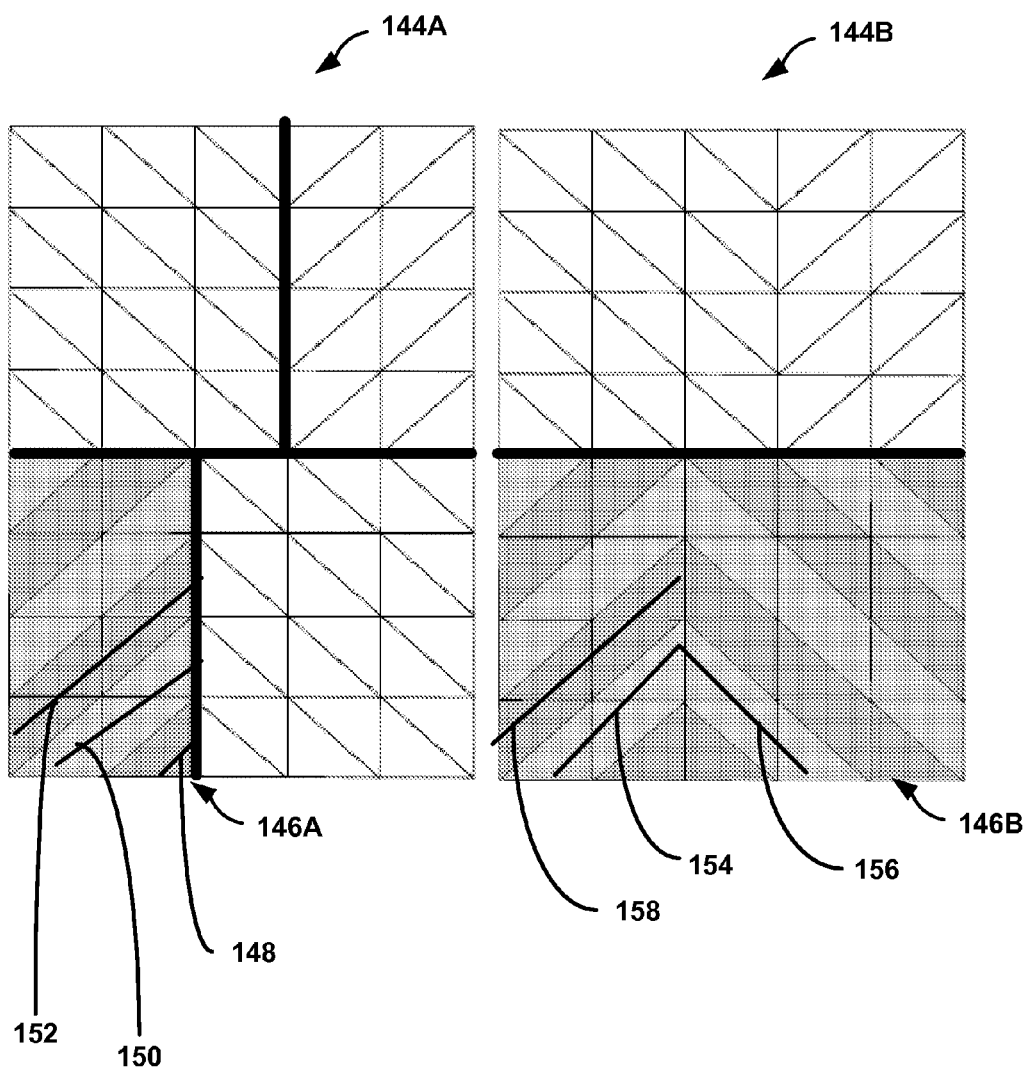
FIGS. 14A and 14B are diagrams illustrating example techniques of outputting domain coordinates of vertices of primitives in contiguous portions of domains in accordance with one or more examples described in this disclosure.

FIGS. 14A and 14B are diagrams illustrating example techniques of outputting domain coordinates of vertices of primitives in contiguous portions of domains in accordance with one or more examples described in this disclosure. FIG. 14A illustrates domain 144A, and FIG. 14B illustrates domain 144B. Domain 144A and domain 144B are each a quad domain. As illustrated, tessellation unit 66 may have tessellated domain 144A and domain 144B with one even tessellation factor and one odd tessellation factor. The even tessellation factor may be $f_y$ because there are eight segments along the y-axis of domain 144A and domain 144B. The odd tessellation factor may be $f_x$ because there are five segment along the x-axis of domain 144A and domain 144B. For purposes of illustration, FIGS. 14A and 14B illustrate the manner in which connectivity generator 72 outputs domain coordinates for primitives within contiguous portion 146A and contiguous portion 146B, respectively.

In the example illustrated in FIG. 14A, the processing unit (e.g., controller 74 and/or tessellation unit 66) may have determined that $f_1/2+1$ is less than or equal to C−2, and may cause point generators 70 and connectivity generator 72 to implement the second mode of operation (i.e., the single walk). For example, connectivity generator 72 may output domain coordinates for primitives within first diagonal strip 148, followed by second diagonal strip 150, and then third diagonal strip 152. As illustrated, first diagonal strip 148 is parallel with second diagonal strip 150, which is parallel with third diagonal strip 152. Accordingly, first diagonal strip 148, second diagonal strip 150, and third diagonal strip 152 are each parallel with one another. Also, the number of primitives in first diagonal strip 148, second diagonal strip 150, and third diagonal strip 152 is different.

In the example illustrated in FIG. 14B, the processing unit (e.g., controller 74 and/or tessellation unit 66) may have determined that $f_1+1$ is less than or equal to C−2, and may cause point generators 70 and connectivity generator 72 to implement the first mode of operation (i.e., the joint walk). For example, connectivity generator 72 may output domain coordinates for primitives within first diagonal strip 154, followed by second diagonal strip 156, and then third diagonal strip 158. As illustrated, second diagonal strip 156 is tangent with first diagonal strip 154. Third diagonal strip 158 is parallel with first diagonal strip 154, and not parallel with second diagonal strip 156. Also the number of primitives in first diagonal strip 154 and second diagonal strip 156 is the same, and different than the number of primitives in third diagonal strip 158.

Figures 15A, 15B:
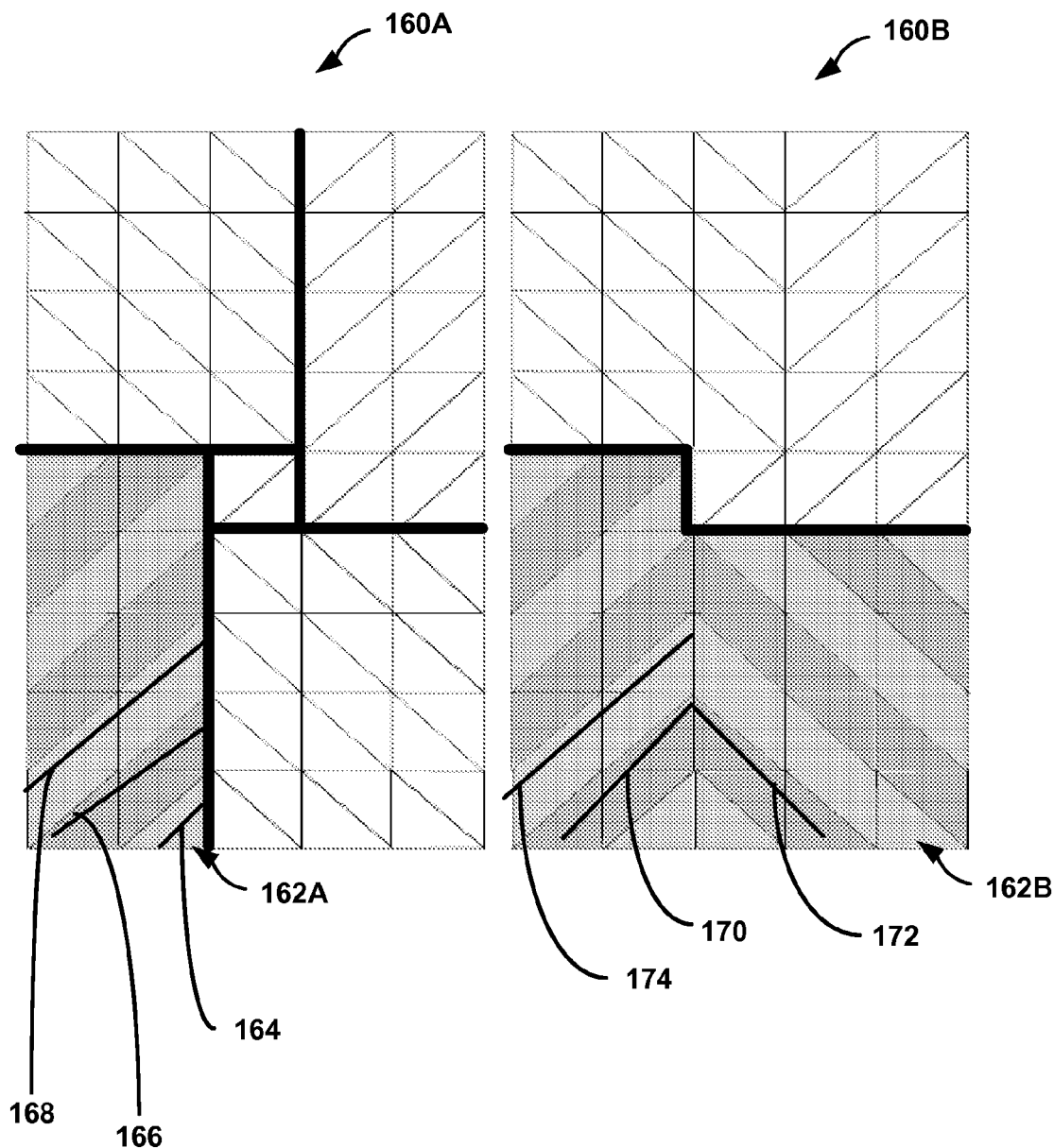
FIGS. 15A and 15B are diagrams illustrating example techniques of outputting domain coordinates of vertices of primitives in contiguous portions of domains in accordance with one or more examples described in this disclosure.

FIGS. 15A and 15B are diagrams illustrating example techniques of outputting domain coordinates of vertices of primitives in contiguous portions of domains in accordance with one or more examples described in this disclosure. FIG. 15A illustrates domain 160A, and FIG. 15B illustrates domain 160B. Domain 160A and domain 160B are each a quad domain. As illustrated, tessellation unit 66 may have tessellated domain 160A and domain 160B with odd tessellation factors (i.e., $f_x$ and $f_y$ are both odd numbers). For purposes of illustration, FIGS. 15A and 15B illustrate the manner in which connectivity generator 72 outputs domain coordinates for primitives within contiguous portion 162A and contiguous portion 162B, respectively.

In the example illustrated in FIG. 15A, the processing unit (e.g., controller 74 and/or tessellation unit 66) may have determined that $f_1/2+1$ is less than or equal to C−2, and may cause point generators 70 and connectivity generator 72 to implement the second mode of operation (i.e., the single walk). For example, connectivity generator 72 may output domain coordinates for primitives within first diagonal strip 164, followed by second diagonal strip 166, and then third diagonal strip 168. In the example illustrated in FIG. 15B, the processing unit (e.g., controller 74 and/or tessellation unit 66) may have determined that $f_1+1$ is less than or equal to C−2, and may cause point generators 70 and connectivity generator 72 to implement the first mode of operation (i.e., the joint walk). For example, connectivity generator 72 may output domain coordinates for primitives within first diagonal strip 170, followed by second diagonal strip 172, and then third diagonal strip 174.

In the examples illustrated in FIG. 15A, after connectivity generator 72 outputs the domain coordinates for the contiguous portions, there may be some remaining primitives whose domain coordinates have not yet been outputted. For instance, in FIG. 15A, the two triangles that form the center of domain 160A may not be encompassed by the contiguous portions. In these examples, connectivity generator 72 may output the domain coordinates of the remaining primitives (e.g., the triangles that form the center of domain 160A).

Figures 16A, 16B:
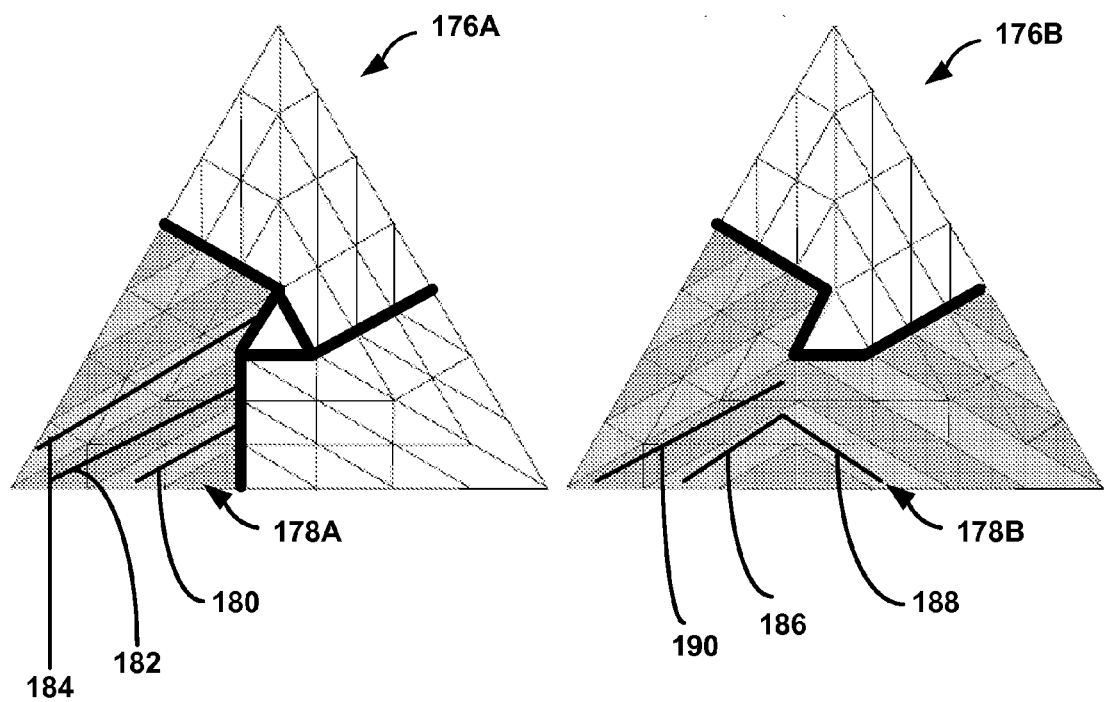
FIGS. 16A and 16B are diagrams illustrating example techniques of outputting domain coordinates of vertices of primitives in contiguous portions of domains in accordance with one or more examples described in this disclosure.

FIGS. 16A and 16B are diagrams illustrating example techniques of outputting domain coordinates of vertices of primitives in contiguous portions of domains in accordance with one or more examples described in this disclosure. FIG. 16A illustrates domain 176A, and FIG. 16B illustrates domain 176B. Domain 176A and domain 176B are each a triangle domain. As illustrated, tessellation unit 66 may have tessellated domain 160A and domain 160B with an odd tessellation factor (i.e., f is an odd number). For purposes of illustration, FIGS. 16A and 16B illustrate the manner in which connectivity generator 72 outputs domain coordinates for primitives within contiguous portion 178A and contiguous portion 178B, respectively.

In the example illustrated in FIG. 16A, controller 74 (as one example of the processing unit) may have determined that $f_1/2+1$ is less than or equal to C−2, and may cause point generators 70 and connectivity generator 72 to implement the second mode of operation (i.e., the single walk). For example, connectivity generator 72 may output domain coordinates for primitives within first diagonal strip 180, followed by second diagonal strip 182, and then third diagonal strip 184. In the example illustrated in FIG. 16B, controller 74 may have determined that $f_1+1$ is less than or equal to C−2, and may cause connectivity generator 72 to implement the first mode of operation (i.e., the joint walk). For example, connectivity generator 72 may output domain coordinates for primitives within first diagonal strip 186, followed by second diagonal strip 188, and then third diagonal strip 190.

Similar to FIG. 15B, after connectivity generator 72 outputs the domain coordinates for the contiguous portions, there may be a remaining primitive in FIGS. 16A and 16B whose domain coordinates have not yet been outputted. For instance, in FIGS. 16A and 16B, the triangle that forms the center of domain 176A and 176B, respectively, may not be encompassed by the contiguous portions. In these examples, connectivity generator 72 may output the domain coordinates of the remaining primitive (e.g., the triangle that forms the center of domain 176A and 176B).

The above examples describes the manner in which connectivity generator 72 outputs domain coordinates of primitives within a contiguous portion of a domain, where tessellation unit 66 tessellates the domain with uniform tessellation and even tessellation factors, even and odd tessellation factors, and odd tessellation factors. The following describes the manner in which connectivity generator 72 outputs domain coordinates of primitives for a non-uniform tessellated domain. In a non-uniform tessellation domain, tessellation unit 66 may tessellate parts of the domain utilizing non-uniform tessellation, and may tessellate other parts of the domain utilizing uniform tessellation.

For instance, for a quad domain, there may be a total of six tessellation factors. Four of the six tessellation factors may define the number of segments along each of the four sides of the quad domain, respectively. These four tessellation factors may not be the same, resulting in non-uniform tessellation. The remaining two tessellation factors may define the number of segments along the x-axis and y-axis of the rings within the quad domain, resulting in uniform tessellation within the quad domain.

For a triangle domain, there may be a total of four tessellation factors. Three of the four tessellation factors may define the number of segments along each of the three sides of the triangle domain, respectively. These three tessellation factors may not be the same, resulting in non-uniform tessellation. The remaining tessellation factor may define the number of segments for the triangle rings within the triangle domain, resulting in uniform tessellation within the triangle domain.

For example, non-uniform tessellation refers to instances when the number of vertices on one or more sides of an outer ring is different. In examples of non-uniform tessellation, if the tessellation factors for the uniform portions are $f_x$ and $f_y$, setup unit 68 of tessellation unit 66 may determine the values of $F_X$ and $F_y$, where $f_x$ equals $F_X$−2.0, and $f_y$ equals $F_y$−2.0.

In examples where tessellation unit 66 tessellates a domain utilizing both non-uniform tessellation and uniform tessellation, controller 74 may cause point generators 70 and connectivity generator 72 to implement the first, second, or third mode of operation on the uniform tessellated part of the domain. In the techniques described in this disclosure, the manner in which point generators 70 and connectivity generator 72 output the domain coordinates of primitives within the non-uniform part of the domain may be generally immaterial.

Figure 17:
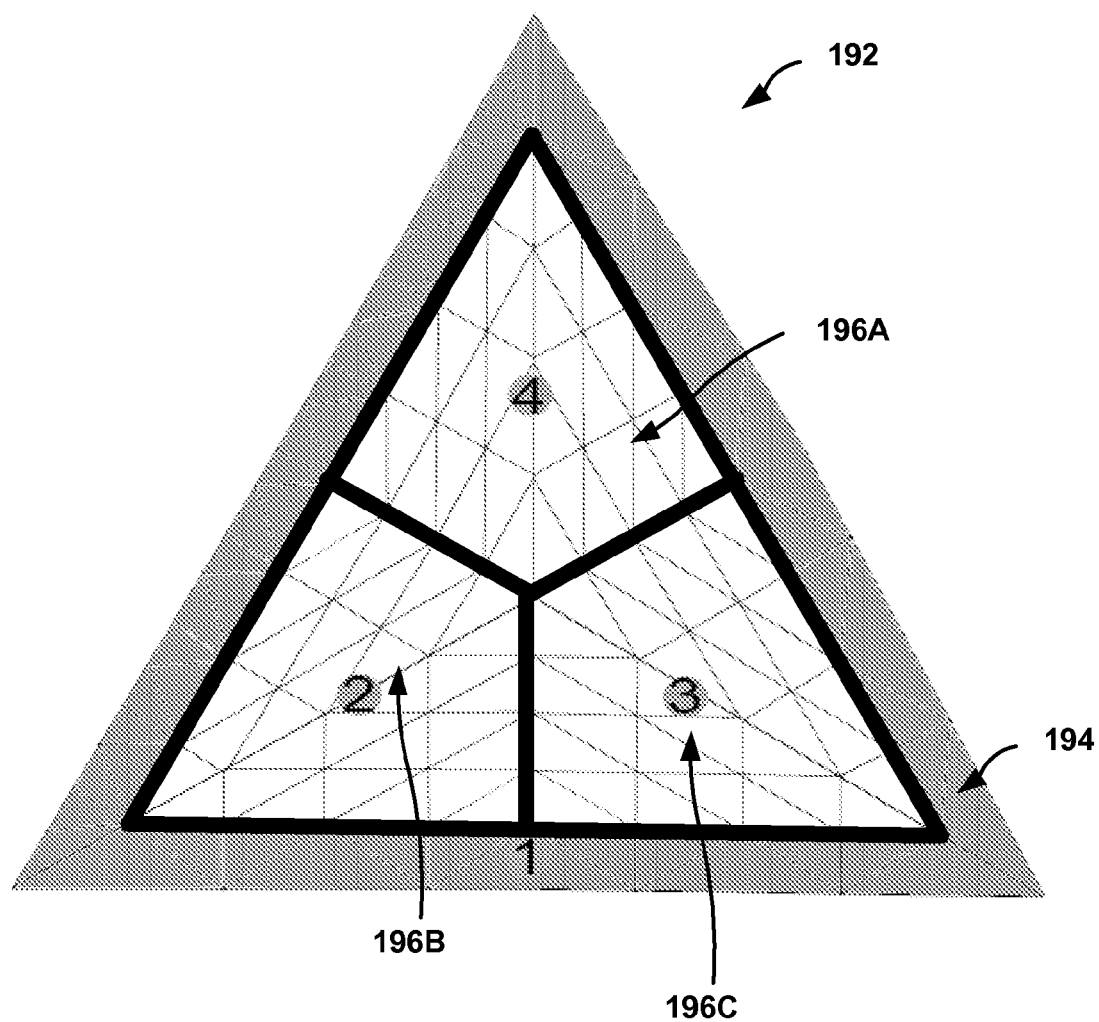
FIG. 17 is a diagram illustrating another example technique of outputting domain coordinates of vertices of primitives in a contiguous portion of a domain in accordance with one or more examples described in this disclosure.

FIG. 17 is a diagram illustrating another example technique of outputting domain coordinates of vertices of primitives in a contiguous portion of a domain in accordance with one or more examples described in this disclosure. For example, FIG. 17 illustrates domain 192, which is a triangle domain. In the example illustrated in FIG. 17, tessellation unit 66 may have tessellated portion 194 using non-uniform tessellation, and may have tessellated the area of domain 192 encompassed by portions 196A, 196B, and 196C using uniform tessellation. For example, in portion 194, the number of vertices that reside along each of the three boundaries of domain 192 is different, hence non-uniform tessellation. In the remainder of domain 192 (i.e., portions 196A, 196B, and 196C) the number of vertices that reside along each of the boundaries is the same, hence uniform tessellation.

In accordance with techniques described in this disclosure, controller 74 (one example of the processing unit) may cause point generators 70 and connectivity generator 72 to implement the first, second, or third mode of operation on portions 196A, 196B, and 196C based on the values of $f_1$ and C. Point generators 70 and connectivity generator 72 may implement any existing technique or technique yet to be developed to output the domain coordinates of the primitives within portion 194. As illustrated, portion 194 may be the outer ring of domain 192.

Figure 18:
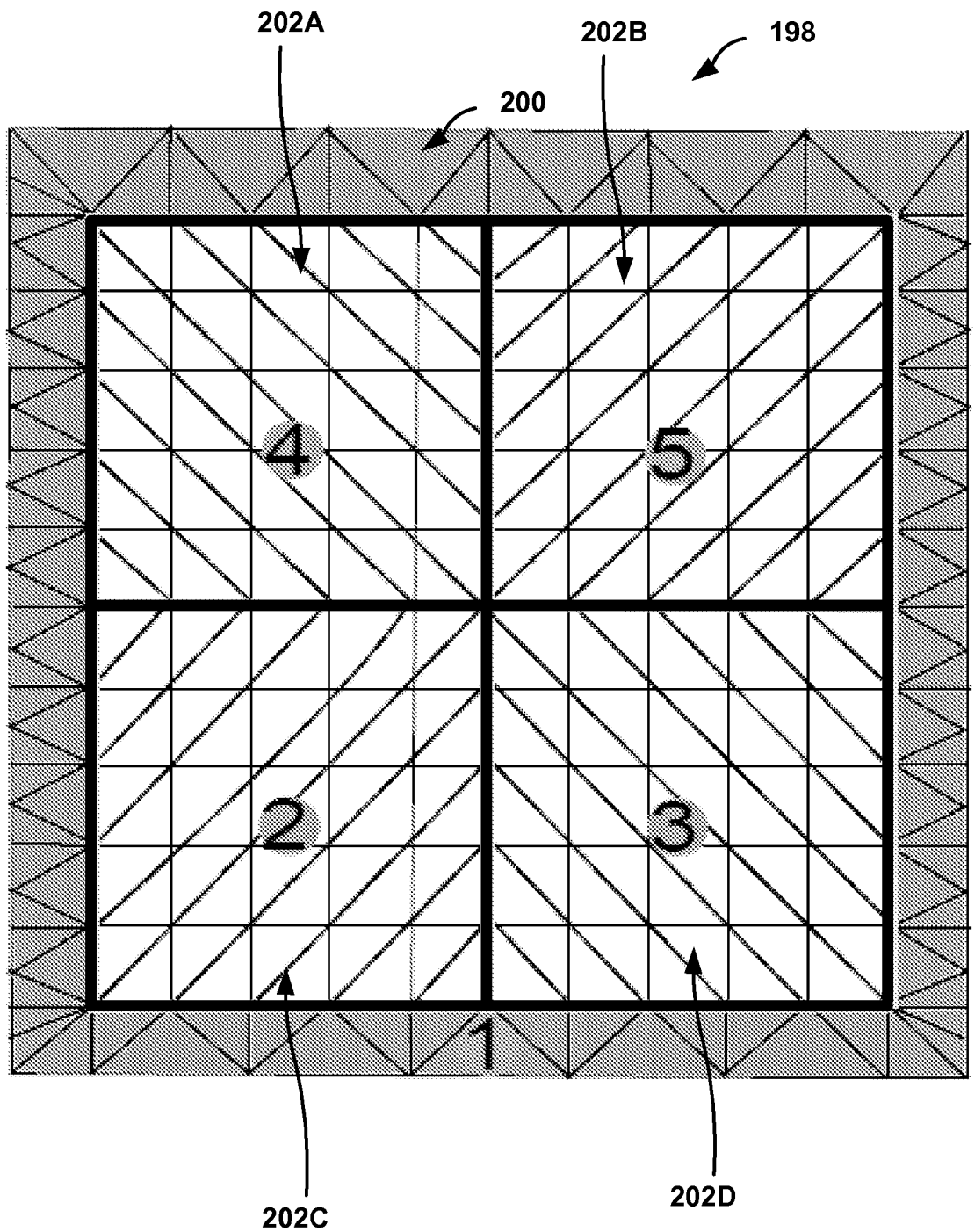
FIG. 18 is a diagram illustrating another example technique of outputting domain coordinates of vertices of primitives in a contiguous portion of a domain in accordance with one or more examples described in this disclosure.

FIG. 18 is a diagram illustrating another example technique of outputting domain coordinates of vertices of primitives in a contiguous portion of a domain in accordance with one or more examples described in this disclosure. For example, FIG. 18 illustrates domain 198, which is a quad domain. In the example illustrated in FIG. 18, tessellation unit 66 may have tessellated portion 200 using non-uniform tessellation, and may have tessellated the area of domain 198 encompassed by portions 202A-202D using uniform tessellation. For example, in portion 200, the number of vertices that reside along at least two of the four boundaries of domain 198 is different, and hence the tessellation in this case may be referred to as non-uniform tessellation. In the remainder of domain 198 (i.e., portions 202A-202D) the number of vertices that reside along each of the boundaries is the same, hence uniform tessellation.

In accordance with techniques described in this disclosure, the processing unit (e.g., controller 74) may cause point generators 70 and connectivity generator 72 to implement the first, second, or third mode of operation on portions 202A-202D based on the values of $f_1$ and C. Point generators 70 and connectivity generator 72 may implement any existing technique or technique yet to be developed to output the domain coordinates of the primitives within portion 200.

Figure 19:
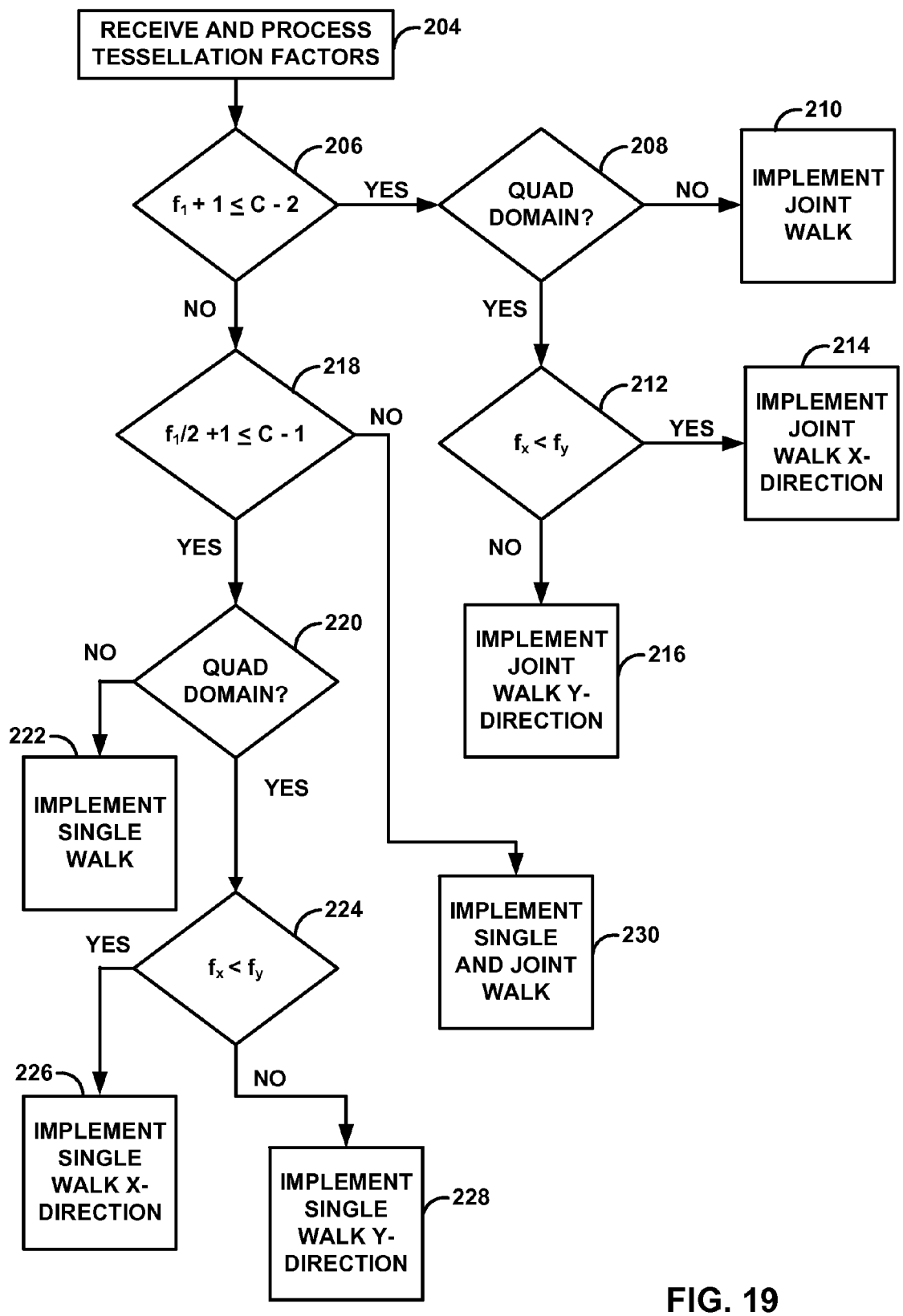
FIG. 19 is a flowchart illustrating an example operation in accordance with one or more examples described in this disclosure.

FIG. 19 is a flowchart illustrating an example operation in accordance with one or more examples described in this disclosure. For purposes of illustration only, reference is made to FIG. 6. Furthermore, many of the techniques are described as being performed by controller 74. However, such description is provided for illustration purposes and should not be considered limiting. In other examples, tessellation unit 66 may be configured to implement the functions described with respect to controller 74, or some other hardware or software unit may be configured to implement the techniques of controller 74. Accordingly, the techniques illustrated in FIG. 19 are described with respect to a processing unit, examples of which include controller 74 and/or tessellation unit 66.

Tessellation unit 66 may receive and process tessellation factors for a domain (204). For example, setup unit 68 may receive the $f_x$ and $f_y$ tessellation factors for a quad domain, or the f tessellation factor for the triangle domain, where these tessellation factors indicate the number of segments along each ring of the domain. For example, point generators 70 may partition each ring within the domain based on these tessellation factors, and the end points of each segment may be a vertex for one or more primitives. In addition, setup unit 68 may round $f_x$ and $f_y$ to an integer, round $f_x$ and $f_y$ to an odd integer, round $f_x$ and $f_y$ to an even integer, or round $f_x$ and $f_y$ to 2" (i.e., a dyadic integer) based on the manner in which the domain is to be tessellated.

Furthermore, if the received tessellation factors indicate that the domain is to be tessellated using uniform tessellation and non-uniform tessellation, tessellation unit 66 may implement the example techniques illustrated in FIG. 19 on the uniform tessellated part of the domain. For the non-uniform tessellated part of the domain, such as the outer ring of the domain, tessellation unit 66 may output the domain coordinates of the non-uniformed tessellated part of the domain utilizing any technique. For instance, for the non-uniformed tessellated part, tessellation unit 66 may output the domain coordinates in the manner illustrated in FIGS. 3-5 (i.e., in a ring fashion, which is non-contiguous).

The processing unit may determine whether $f_1+1$ is less than or equal to C−2 (206). If the processing unit determines that $f_1+1$ is less than or equal to C−2 (YES of 206), the processing unit may cause tessellation unit 66, via point generators 70 and connectivity generator 72, to implement the first mode of operation.

For example, the processing unit may determine whether the domain is a quad domain (208). If the domain is a quad domain (YES of 208), the processing unit may determine whether $f_x$ is less than or equal $f_y$ (212). If $f_x$ is less than or equal to $f_y$ (YES of 212), the processing unit may cause tessellation unit 66, via point generators 70 and connectivity generator 72, to implement the joint walk in the x-direction (214). For example, point generators 70 and connectivity generator 72 may divide the quad domain into two portions, where one of the portions is a contiguous portion, and may output domain coordinates of primitives within the contiguous portion in accordance with the joint walk in the x-direction technique.

If $f_x$ is not less than or equal to $f_y$ (NO of 212), the processing unit may cause tessellation unit 66, via point generators 70 and connectivity generator 72, to implement the joint walk in the y-direction (216). For example, connectivity generator 72 may divide the quad domain into two portions, where one of the portions is a contiguous portion, and may output domain coordinates of primitives within the contiguous portion in accordance with the joint walk in the y-direction technique.

If the domain is not a quad domain (NO of 208), the processing unit may cause tessellation unit, via point generators 70 and connectivity generator 72, to implement the joint walk on a triangle domain (210). For example, connectivity generator 72 may divide the triangle domain into a one-third portion and a two-thirds portion, where at least the two-thirds portion is a contiguous portion. Connectivity generator 72 may output domain coordinates of primitives within the contiguous two-thirds portion in accordance with the joint walk technique.

If the processing unit determined that $f_1+1$ is not less than or equal to C−2 (NO of 206), the processing unit may determine whether $f_1/2+1$ is less than or equal to C−1 (218). If the processing unit determines that $f_1/2+1$ is less than or equal to C−2 (YES of 218), the processing unit 74 may cause tessellation unit 66, via point generators 70 and connectivity generator 72, to implement the second mode of operation.

The processing unit may determine whether the domain is a quad domain (220). If the domain is a quad domain (YES of 220), the processing unit may determine whether $f_x$ is less than or equal $f_y$ (224). If $f_x$ is less than or equal to $f_y$ (YES of 224), the processing unit may cause tessellation unit 66, via point generators 70 and connectivity generator 72, to implement the single walk in the x-direction (226). For example, connectivity generator 72 may divide the quad domain into four portions, where one of the four portions is a contiguous portion, and may output domain coordinates of primitives within the contiguous portion in accordance with the single walk in the x-direction technique.

If $f_x$ is not less than or equal to $f_y$ (NO of 224), the processing unit may cause tessellation unit 66, via point generators 70 and connectivity generator 72, to implement the single walk in the y-direction (228). For example, connectivity generator 72 may divide the quad domain into four portions, where one of the portions is a contiguous portion, and may output domain coordinates of primitives within the contiguous portion in accordance with the single walk in the y-direction technique.

If the domain is not a quad domain (NO of 220), the processing unit may cause tessellation unit 66, via point generators 70 and connectivity generator 72, to implement the single walk on a triangle domain (222). For example, connectivity generator 72 may divide the triangle domain into three portions, where at least one portion is a contiguous portion. Connectivity generator 72 may output domain coordinates of primitives within the contiguous portion in accordance with the single walk technique.

If the processing unit determined that $f_1/2+1$ is not less than C−1 (NO of 218), the processing unit may cause point generator 70 and connectivity generator 72 to implement the third mode of operation. For example, the processing unit may cause connectivity generator 72 to implement both the single walk technique and the joint walk technique (230). For instance, in the third mode of operation, connectivity generator 72 may divide a quad domain into more than four portions, and may divide a triangle domain into more than three portions. In this example, for the quad domain, connectivity generator 72 may implement the single walk technique on four of the portions, and may implement the joint walk technique on the other portions. For the triangle domain, connectivity generator 72 may implement the single walk technique on three of the portions, and may implement the joint walk technique on the other portions.

In the example of FIG. 19, connectivity generator 72 may implement the single walk in the x-direction, the single walk in the y-direction, the joint walk in the x-direction, and the joint walk in the y-direction. In some examples, walking in the x-direction or the y-direction may be based on the lesser of the two tessellation factors. For example, the processing unit may determine that a first tessellation factor is less than or equal to a second tessellation factor. When outputting the domain coordinates of primitives within the first, second, and third diagonal strips, connectivity generator 74 may start from an axis of the domain that corresponds to the first tessellation factor and extends outwards.

For instance, if $f_x$ is less than $f_y$, then connectivity generator 74 starts from the x-axis of the domain and extends outwards when outputting the domain coordinates of primitives within the first, second, and third diagonal strips. If $f_y$ is less than $f_x$, then connectivity generator 74 starts from the y-axis of the domain and extends outwards when outputting the domain coordinates of primitives within the first, second, and third diagonal strips.

In general, in accordance with the example illustrated FIG. 19, the processing unit may select a mode of operation, from a plurality of different modes of operation, based at least on a number of storage slots in reuse buffer 78, where each of the different modes of operation indicate a different manner in which connectivity generator 72 outputs domain coordinates of primitives within a contiguous portion of a domain. Examples of the plurality of different modes of operation include the first, second, and third modes of operation. The processing unit may select the mode of operation based at least on the storage capabilities of a reuse buffer. The processing unit may then cause connectivity generator 72 to output the domain coordinates of the primitives within the contiguous portion of the domain based on the selected mode of operation.

For example, if at least one tessellation factor plus one is less than or equal to a number of storage slots in reuse buffer 78 minus two, the processing unit may cause connectivity generator 72 to output domain coordinates in accordance with the first mode of operation. If the at least one tessellation factor plus one is not less than or equal to the number of storage slots in reuse buffer 78 minus two, and the at least one tessellation factor divided by two plus one is less than or equal to the number of storage slots in reuse buffer 78 minus one, the processing unit may cause connectivity generator 72 to output domain coordinates in accordance with the second mode of operation. If the at least one tessellation factor divided by two plus one is not less than or equal to the number of storage slots in reuse buffer 78 minus one, the processing unit may cause connectivity generator 72 to output domain coordinates in accordance with the third mode of operation. The third mode of operation may be considered to be different than just the first mode of operation and just the second mode of operation because the third mode of operation is a combination of the first mode of operation and the second mode of operation.

The following pseudo-code further illustrates example techniques in accordance with this disclosure.

```
1.    If non-uniform tessellation;
          process outer ring;
      endIf
      If quad domain
          continue to step 2 for uniform tessellation
      else //triangle domain
          continue to step 3 for uniform tessellation
      endIf
2.    //quad domain
      divide domain into quadruplets
      If f_x + 1 ≤ C - 2, (f_x ≤ f_y)
          process joint walk on x-direction based on even/odd
          tessellation factors
      elseIf f_y + 1 ≤ C - 2, (f_y ≤ f_x)
          process joint walk on y-direction based on even/odd factors
      elseIf f_x /2 + 1 ≤ C - 1, (f_x ≤ f_y)
          process single walk on x-direction
      elseIf f_y /2 + 1 ≤ C - 1, (f_y ≤ f_x)
          process single walk on y-direction
      else
          add partitions in each quadruplet
          process single walk and joint walk
      endIf
      exit
```

```
3.    //triangle domain
      divide domain into triplets
      If f + 1 ≤ C - 2
          process joint walk on x-direction based on even/odd factors
      elseIf f/2 + 1 ≤ C - 1
          process single walk
      else
          add partitions in each triplet
          process single walk and joint walk
      endIf
      exit
```

Figure 20:
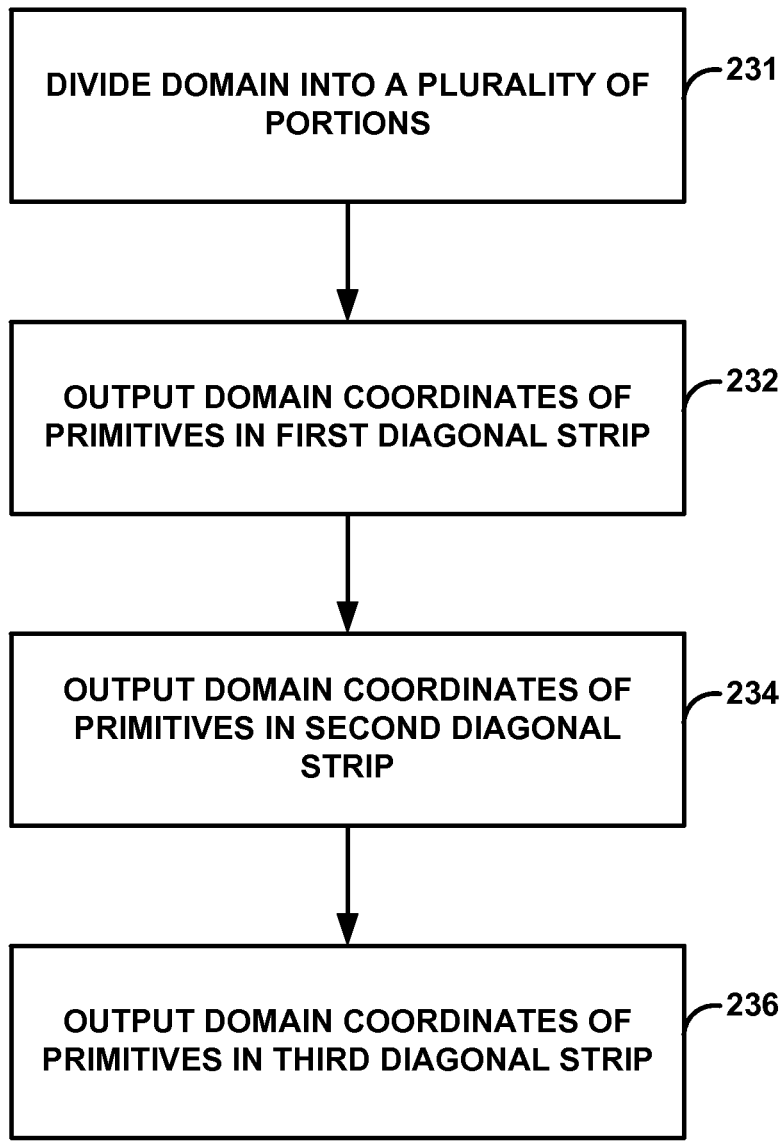
FIG. 20 is another flowchart illustrating an example operation in accordance with one or more examples described in this disclosure.

FIG. 20 is another flowchart illustrating an example operation in accordance with one or more examples described in this disclosure. For purposes of illustration only, the techniques are described with respect to FIG. 6.

Point generators 70 and connectivity generator 72 may divide a domain into a plurality of portions (231). At least one of the portions is a contiguous portion. If operating in the first mode of operation, point generators 70 and connectivity generator 72 may divide a quad domain into two equal portions, and may divide a triangle domain into two portions, where one portion is one-third of the domain, and the other portion is two-thirds of the domain. If operating in the second mode of operation, point generators 70 and connectivity generator 72 may divide a quad domain into four portions, and may divide a triangle domain into three portions. If operating in the third mode of operation, point generators 70 and connectivity generator 72 may divide the quad domain into more than four portions, and may divide the triangle domain into more than three portions.

Connectivity generator 72 may output domain coordinates of primitives in a first diagonal strip within the contiguous portion (232). Connectivity generator 72 may then output domain coordinates of primitives in a second diagonal strip within the contiguous portion (234). Connectivity generator 72 may then output domain coordinates of primitives in a third diagonal strip within the contiguous portion (236).

The second diagonal strip may be one of parallel with the first diagonal strip or tangent with the first diagonal strip. The third diagonal strip may be parallel with the first diagonal strip. The third diagonal strip may be parallel with the second diagonal strip in examples where the second diagonal strip is parallel with the first diagonal strip. The third diagonal strip may not be parallel with the second diagonal strip in examples where the second diagonal strip is tangent with the first diagonal strip.

The number of primitives in the first diagonal strip may the same as the number of primitives in the second diagonal strip in examples where the second diagonal strip is tangent with the first diagonal strip. The number of primitives in the first diagonal strip may be different then the number of primitives in the second diagonal strip in examples where the second diagonal strip is parallel with the first diagonal strip. In either case, the number of primitives in the third diagonal strip may be different than the number of primitives in the first and second diagonal strips.

FIGS. 21-27 are graphs illustrating comparisons of results achieved by implementing one or more example techniques described in this disclosure and implementing one or more other techniques. For example, the techniques described in this disclosure may result in the graphics pipeline completing tessellation faster than some other techniques by effectively ensuring that patch coordinates that correspond to domain coordinates of shared vertices remain in reuse buffer 78. The techniques described in this disclosure may significantly decrease extra miss rate (i.e., decrease the rate cache misses) as compared to some other techniques. The rate of cache misses may refer to rate at which controller 74 needs to execute domain shader 76 for vertices that were previously transformed from domain coordinates to patch coordinates.

In the following examples, the number of storage slots in reuse buffer 78 is 32 slots. The tessellation factors range from 1.0 to 64.0. In general, the techniques described above with respect to FIGS. 3 and 4 result in almost a 100% miss rate for uniform tessellation. The techniques described above with respect to FIG. 5 result in about a 45% miss rate. The techniques described above with respect to FIGS. 6-20 result in a 5% miss rate. Minimizing the miss rate may be beneficial, as it results in fewer instantiations of domain shader 76. Execution of domain shader 76 may be time and processing extensive, and therefore, minimized execution of domain shader 76 may be beneficial.

Figure 21:
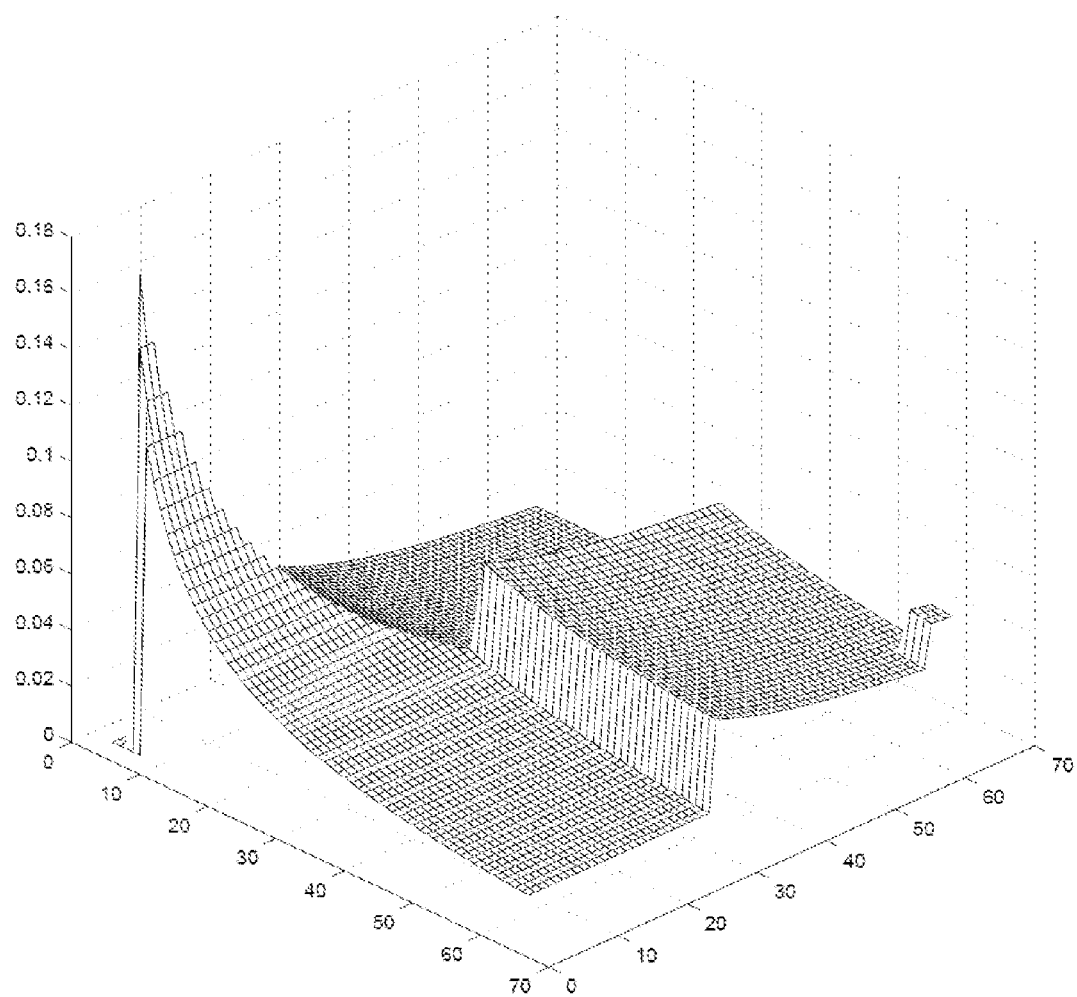
FIGS. 21-27 are graphs illustrating comparisons of results achieved by implementing one or more example techniques described in this disclosure and implementing one or more other techniques.

FIG. 21 illustrates the miss rate of non-fully reused vertices in accordance with one or more techniques described in this disclosure for uniform tessellation on a quad domain. The x-axis and y-axis are for tessellation factors (e.g., $f_x$ and $f_y$), and the z-axis indicates the miss rate. In this example, the miss rate is zero when the tessellation factors are small and all patch coordinates of a contiguous portion can fit within reuse buffer 78. For some small values of the tessellation factors, the miss rate may rise to approximately 0.16 (i.e., approximately 16%). However, the miss rate then drops substantially and stays within a miss rate of 2% to 5%. Even when the miss rate is 16%, the techniques described in this disclosure may still provide a much lower miss rate than some other techniques, such as those illustrated in FIGS. 22 and 23.

Figure 22:
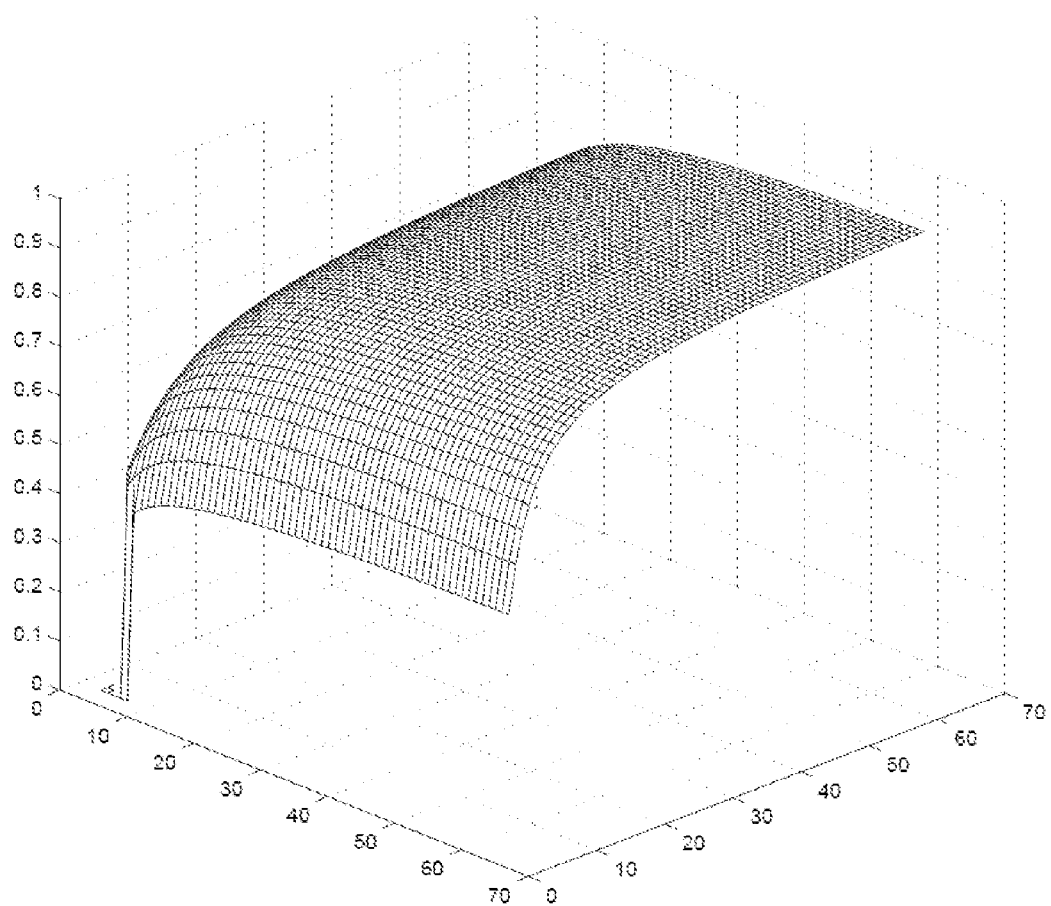

FIG. 22 illustrates the miss rate of non-fully reused vertices in accordance with one or more techniques described with respect to FIG. 4 for uniform tessellation on a quad domain. The x-axis and y-axis are for tessellation factors (e.g., $f_x$ and $f_y$), and the z-axis indicates the miss rate. In this example, the miss rate is zero when the tessellation factors are small and all patch coordinates of a contiguous portion can fit within reuse buffer 78. However, for large tessellation factors (e.g., $f_x$ and $f_y$ equal 64), FIG. 22 illustrates that the miss rate is approximately one (i.e., approximately 100%).

Figure 23:
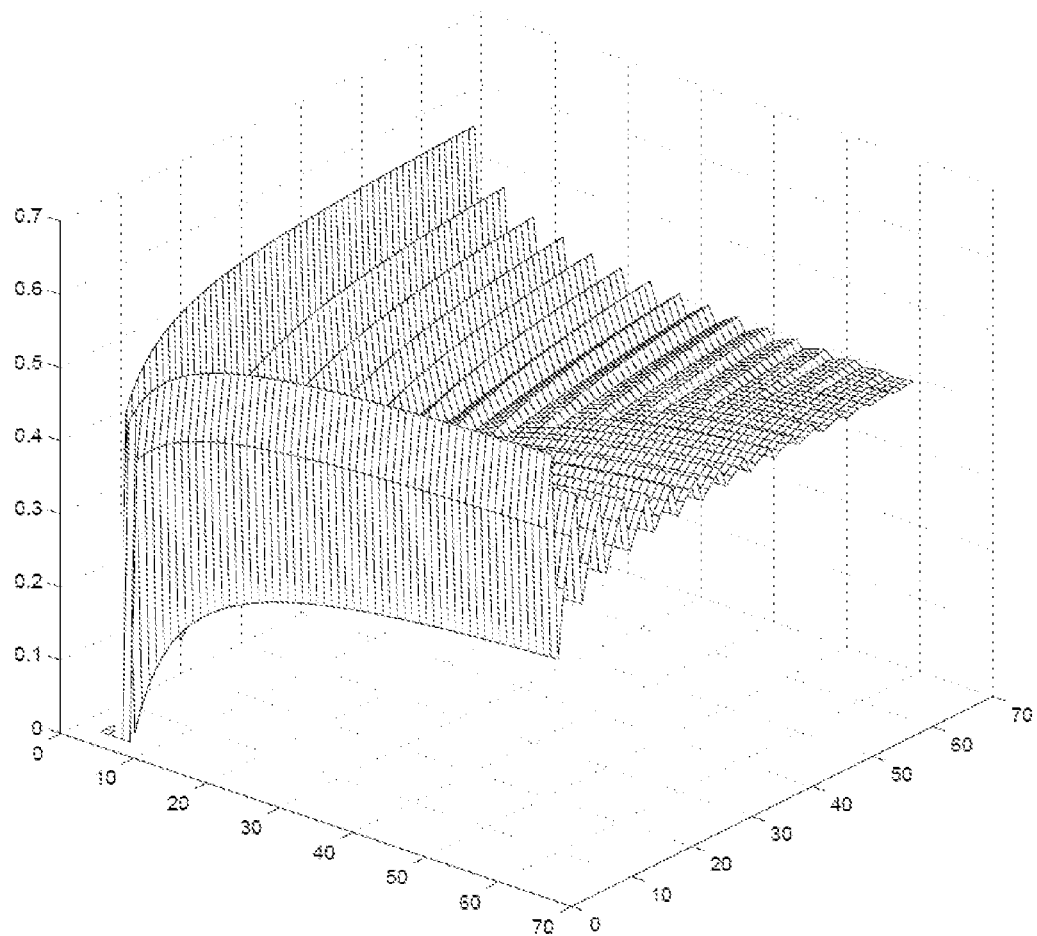

FIG. 23 illustrates the miss of non-fully reused vertices in accordance with one or more techniques described with respect to FIG. 5 for uniform tessellation on a quad domain. The x-axis and y-axis are for tessellation factors (e.g., $f_x$ and $f_y$), and the z-axis indicates the miss rate. In this example, the miss rate is zero when the tessellation factors are small and all patch coordinates of a contiguous portion can fit within reuse buffer 78. However, for large tessellation factors (e.g., $f_x$ and $f_y$ equal 64), FIG. 23 illustrates that the miss rate is approximately 0.45 (i.e., approximately 45%). Moreover, if there are large differences between the tessellation factors (e.g., $f_x \gg f_y$, or vice-versa), FIG. 23 illustrates the miss rate as rising up to approximately 0.55 (i.e., approximately 55%).

Figure 24:
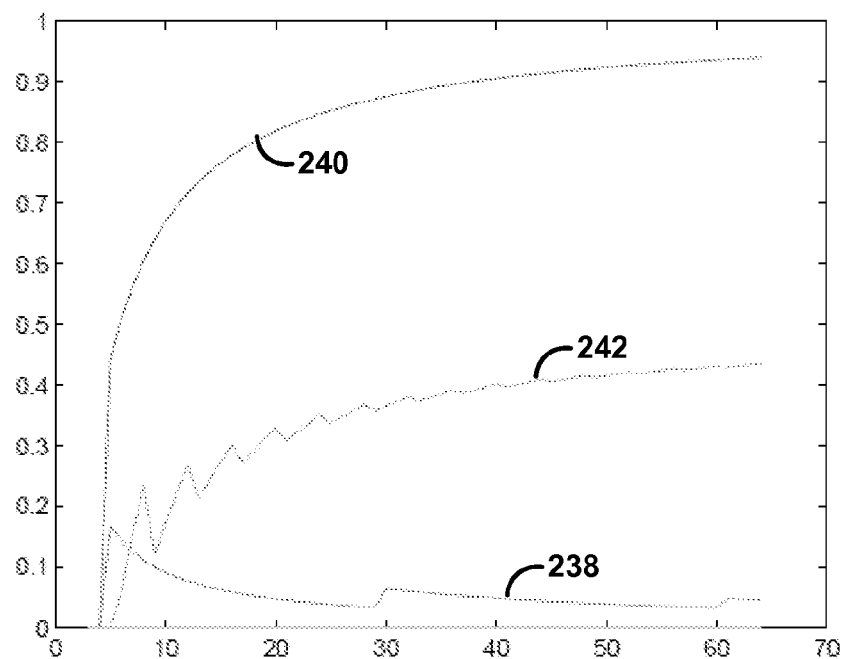
Figure 25:
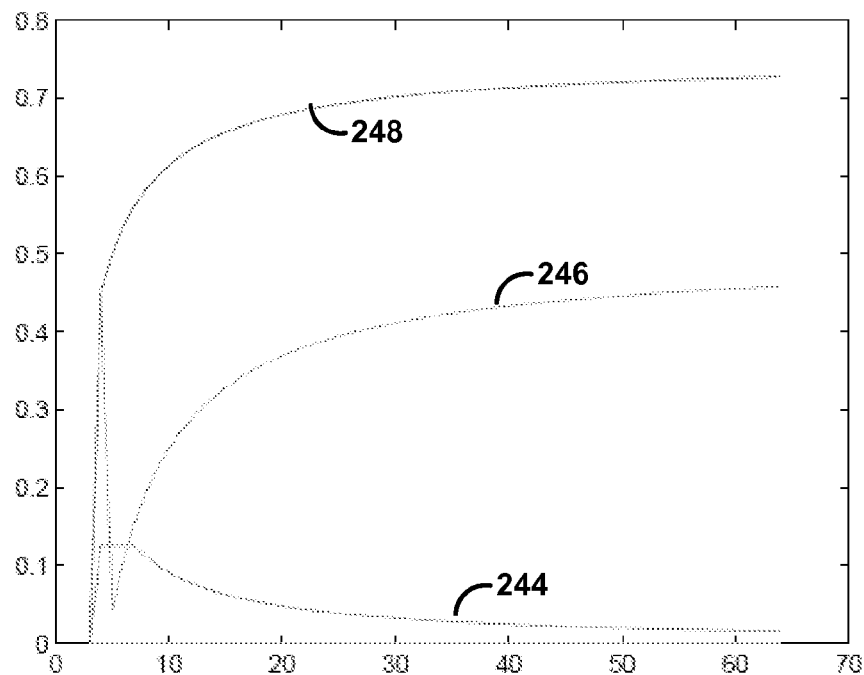
Figure 26:
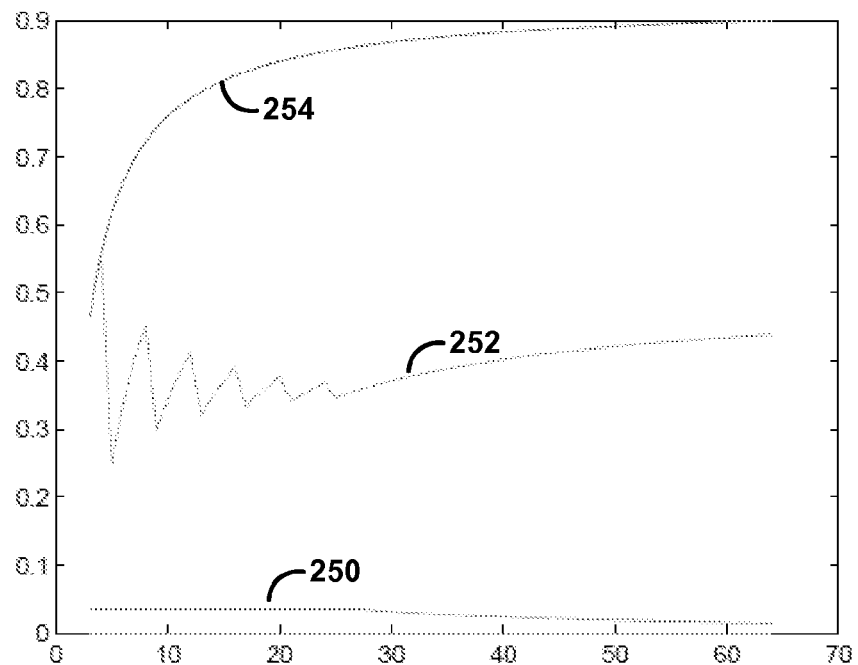
Figure 27:
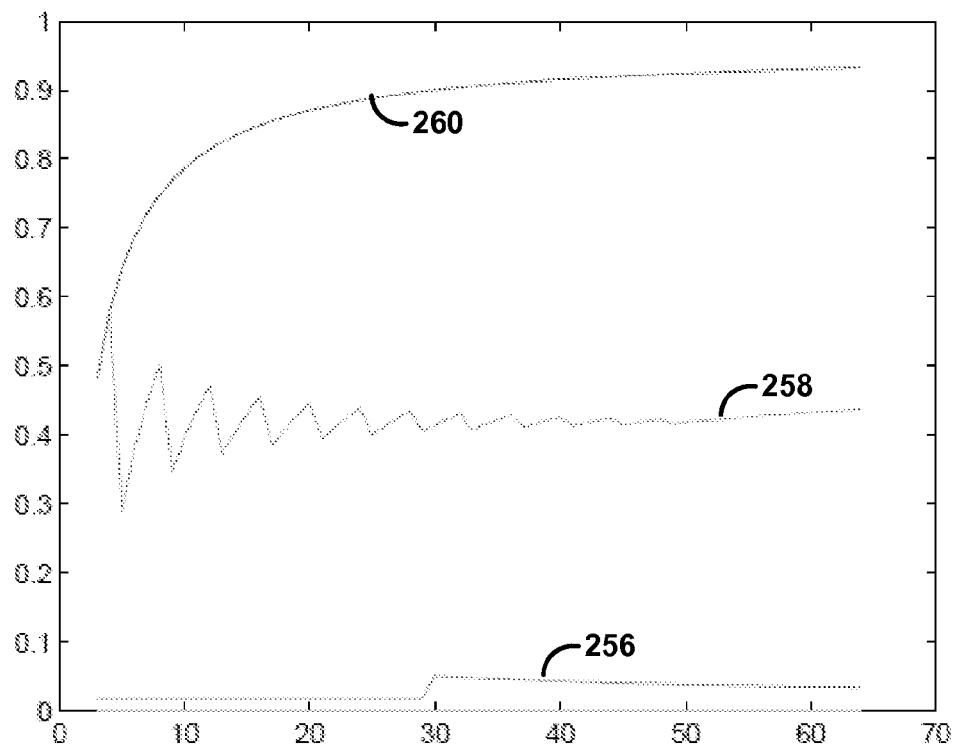

FIGS. 24-27 illustrate a comparison between the miss rate between the techniques described above with respect to FIG. 3, FIG. 4, and FIGS. 6-20 for a quad domain. In FIG. 24, both tessellation factors are equal to one another and in the range of (1.0-64.0). In FIG. 25, one tessellation factor is equal to 5.0, and the other tessellation factor is in the range of (1.0-64.0). In FIG. 26, one tessellation factor is equal to 25.0, and the other tessellation factor is in the range of (1.0-64.0). In FIG. 27, one tessellation factor is equal to 50.0, and the other tessellation factor is in the range of (1.0-64.0).

Line 238 of FIG. 24, line 244 of FIG. 25, line 250 of FIG. 26, and line 256 of FIG. 27 illustrate the miss rate when connectivity generator 72 outputs domain coordinates of primitives in accordance with the techniques described in this disclosure. As illustrated by these lines, the miss rate is very low, and close to 0%. Line 242 of FIG. 24, line 246 of FIG. 25, line 252 of FIG. 26, and line 258 of FIG. 27 illustrate the miss rate when a connectivity generator, unlike connectivity generator 72, outputs domain coordinates of primitives in accordance with the techniques described above with respect to FIG. 5. As illustrated by these lines, the miss rate is much greater than the miss rate when connectivity generator 72 implements one or more example techniques described in this disclosure. Line 240 of FIG. 24, line 248 of FIG. 25, line 254 of FIG. 26, and line 260 of FIG. 27 illustrate the miss rate when a connectivity generator, unlike connectivity generator 72, outputs domain coordinates of primitives in accordance with the techniques described above with respect to FIG. 4. As illustrated by these lines, the miss rate is much greater than the miss rate when connectivity generator 72 implements one or more example techniques described in this disclosure, and also greater than when a connectivity generator, unlike connectivity generator 72, implements the techniques illustrated in FIG. 5.

Figure 28:
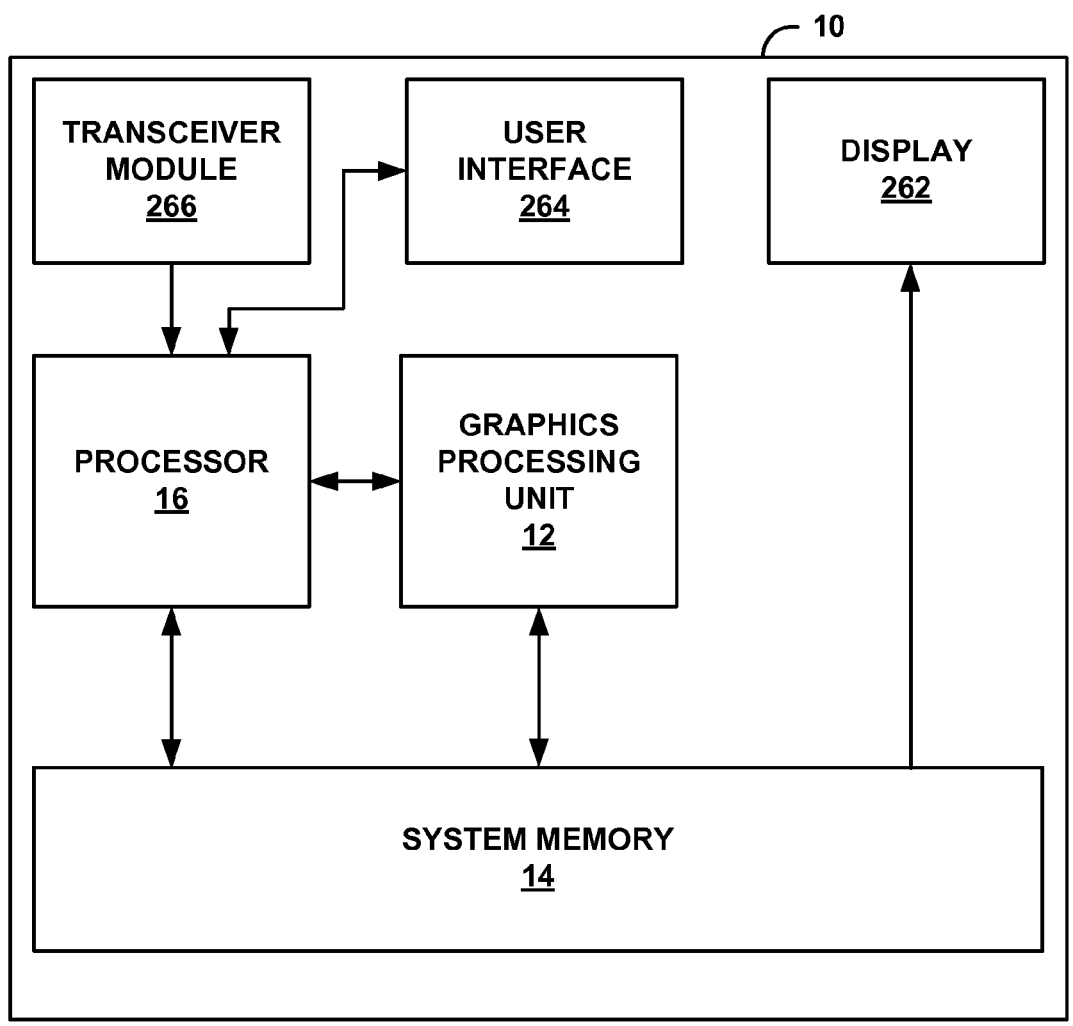
FIG. 28 is a block diagram illustrating a device of including a GPU as shown in FIGS. 1 and 2.

FIG. 28 is a block diagram illustrating a device of including a GPU as shown in FIGS. 1 and 2. For example, FIG. 28 further illustrates device 10. Examples of device 28 include, but are not limited to, wireless devices, mobile telephones such as so-called smartphones, personal digital assistants (PDAs), video gaming consoles that include video displays, mobile video conferencing units, laptop computers, desktop computers, television set-top boxes, tablet computing devices, e-book readers, and the like. Device 10 may include graphics processing unit (GPU) 12, system memory 14, processor 16, display 262, user interface 264, and transceiver module 266. Device 10 may include additional modules or units not shown in FIG. 28 for purposes of clarity. For example, device 10 may include a speaker and a microphone, neither of which are shown in FIG. 28, to effectuate telephonic communications, or otherwise process speech input or emit sound, in examples where device 10 is a mobile wireless telephone. Furthermore, the various modules and units shown in device 10 may not be necessary in every example of device 10. For example, user interface 264 and display 262 may be external to device 10 in examples where device 10 is a desktop computer. As another example, display 262 may be part of user interface 264 in examples where display 262 is a touch-sensitive or presence-sensitive display of a mobile device.

GPU 12, system memory 14, and processor 16 of FIG. 28 may be similar to GPU 12, system memory 14, and processor 16 of FIGS. 1 and 2. Examples of user interface 264 include, but are not limited to, a trackball, a mouse, a keyboard, and other types of input devices. User interface 264 may also be a touch screen and may be incorporated as a part of display 262. Transceiver module 266 may include circuitry to allow wireless or wired communication between device 10 and another device or a network. Transceiver module 266 may include modulators, demodulators, amplifiers and other such circuitry for wired or wireless communication. Display 262 may comprise a liquid crystal display (LCD), a cathode ray tube (CRT) display, a plasma display, a touch-sensitive display, a presence-sensitive display, or another type of display device.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for tessellation, the method comprising:
dividing, with a tessellation unit, a domain into a plurality of portions, wherein at least one of the portions is a contiguous portion;
outputting, with the tessellation unit, domain coordinates of a plurality of primitives within a first diagonal strip that is within the contiguous portion, wherein at least two primitives within the first diagonal strip do not share any vertices;
outputting, with the tessellation unit, domain coordinates of a plurality of primitives within a second diagonal strip that is within the contiguous portion, wherein the second diagonal strip is one of parallel with the first diagonal strip or tangent with the first diagonal strip, wherein at least two primitives within the second diagonal strip do not share any vertices, wherein when the second diagonal strip is parallel with the first diagonal strip, the first diagonal strip and the second diagonal strip start from a same axis of the domain and extend outwards in a same direction, and wherein when the second diagonal strip is tangent with the first diagonal strip, the second diagonal strip includes one primitive that shares two vertices with one primitive of the first diagonal strip, none of remaining primitives within the second diagonal strip share two vertices with any remaining primitives within the first diagonal strip, and at least one primitive within the second diagonal strip shares no vertices with any of the primitives within the first diagonal strip; and
outputting, with the tessellation unit, domain coordinates of a plurality of primitives within a third diagonal strip that is within the contiguous portion, wherein at least two primitives within in the third diagonal strip do not share any vertices, wherein the third diagonal strip is parallel with at least the first diagonal strip, starts from the same axis as the first diagonal strip, and extends outwards in the same direction as the first diagonal strip, and wherein a number of primitives within the third diagonal strip is different than a number of primitives within the first diagonal strip and the second diagonal strip.

2. The method of claim 1, further comprising:
selecting a mode of operation from a plurality of different modes of operation based at least in part on a number of storage slots within a reuse buffer,
wherein each mode of the different modes of operation indicates a different manner in which to output the domain coordinates within the contiguous portion of the domain, and
wherein dividing the domain comprises dividing the domain based on the selected mode of operation.

3. The method of claim 1, further comprising:
determining whether at least one tessellation factor plus one is less than or equal to a number of storage slots in a reuse buffer minus two,
wherein, when the domain is a quad domain, the at least one tessellation factor is less than or equal to another tessellation factor of the quad domain,
wherein dividing the domain comprises dividing the domain into two portions when the at least one tessellation factor plus one is less than or equal to the number of storage slots in the reuse buffer minus two, and
wherein outputting the domain coordinates of primitives within the second diagonal strip comprises outputting the domain coordinate of primitives within the second diagonal strip that is tangent with the first diagonal strip when the at least one tessellation factor plus one is less than or equal to the number of storage slots in the reuse buffer minus two.

4. The method of claim 3, further comprising:
outputting domain coordinates of primitives within a fourth diagonal strip; and
outputting domain coordinates of primitives within a fifth diagonal strip,
wherein the fifth diagonal strip is a mirror opposite of the fourth diagonal strip.

5. The method of claim 3,
wherein, when the domain is the quad domain, dividing the domain into two portions comprises dividing the domain into two halves,
wherein, when the domain is a triangle domain, dividing the domain into two portions comprises dividing the domain into a one-third portion and a two-thirds portion, and
wherein the two-thirds portion comprises the contiguous portion.

6. The method of claim 1, further comprising:
determining whether at least one tessellation factor divided by two plus one is less than or equal to a number of storage slots in a reuse buffer minus one,
wherein, when the domain is a quad domain, the at least one tessellation factor is less than or equal to another tessellation factor of the quad domain, wherein dividing the domain comprises dividing the domain into four portions when the domain is the quad domain and when the at least one tessellation factor divided by two plus one is less than or equal to the number of storage slots in the reuse buffer minus one,
wherein dividing the domain comprises dividing the domain into three portions when the domain is a triangle domain and when the at least one tessellation factor divided by two plus one is less than or equal to the number of storage slots in the reuse buffer minus one, and
wherein outputting the domain coordinates of primitives within the second diagonal strip comprises outputting the domain coordinates of primitives within the second diagonal strip that is parallel with the first diagonal strip when the at least one tessellation factor divided by two plus one is less than or equal to the number of storage slots in the reuse buffer minus one.

7. The method of claim 1, further comprising:
determining that a first tessellation factor is less than or equal to a second tessellation factor,
wherein outputting the domain coordinates of the primitives within the first diagonal strip, outputting the domain coordinates of the primitives within the second diagonal strip, and outputting the domain coordinates of the primitives within the third diagonal strip comprises outputting starting from an axis of the domain that corresponds to the first tessellation factor and extending outwards.

8. The method of claim 1, further comprising:
determining whether at least one tessellation factor divided by two plus one is greater than a number of storage slots in a reuse buffer minus one,
wherein, when the domain is a quad domain, the at least one tessellation factor is less than or equal to another tessellation factor of the quad domain,
wherein, when the at least one tessellation factor divided by two plus one is greater than the number of storage slots in the reuse buffer minus one:
outputting domain coordinates of primitives within the first diagonal strip comprises outputting domain coordinates of primitives within the first diagonal strip that is within a first contiguous portion;
outputting domain coordinates of primitives within the second diagonal strip comprises outputting domain coordinates of primitives within the second diagonal strip that is parallel with the first diagonal strip and that is within the first contiguous portion; and
outputting domain coordinates of primitives within the third diagonal strip comprises outputting domain coordinates of primitives within the third diagonal strip that is within the first contiguous portion, the method further comprising:
outputting domain coordinates of primitives within a fourth diagonal strip that is within a second contiguous portion;
outputting domain coordinates of primitives within a fifth diagonal strip that is within the second contiguous portion, wherein the fifth diagonal strip is tangent with the fourth diagonal strip; and
outputting domain coordinates of primitives within a sixth diagonal strip that is within the second contiguous portion, wherein the sixth diagonal strip is parallel with the first diagonal strip.

9. The method of claim 1, further comprising:
determining that a first part of the domain is non-uniform tessellated; and
determining that a second part of the domain is uniform tessellated,
wherein dividing the domain into the plurality of portions comprises dividing the second part of the domain into the plurality of portions.

10. The method of claim 9, wherein the first part of the domain comprises an outer ring of the domain, the method further comprising:
outputting domain coordinates of primitives within the outer ring of the domain.

11. The method of claim 1, further comprising:
receiving the domain coordinates for the primitives within the first, second, and third diagonal strips;
determining whether a reuse buffer stores patch coordinates that correspond to the domain coordinates for the primitives within the first, second, and third diagonal strips; and
executing one or more instantiations of a shader based on the determination of whether the reuse buffer stores the patch coordinates that correspond to the domain coordinates for the primitives within the first, second, and third diagonal strips.

12. The method of claim 1,
wherein outputting domain coordinates of the plurality of primitives within the second diagonal strip comprises after outputting the domain coordinates of the primitives within the first diagonal strip, and before outputting any other domain coordinates, outputting domain coordinates of the plurality of primitives within the second diagonal strip, and
wherein outputting domain coordinates of the plurality of primitives within the third diagonal strip comprises after outputting the domain coordinates of the primitives within the second diagonal strip, and before outputting any other domain coordinates, outputting domain coordinates of the plurality of primitives within the third diagonal strip.

13. A device comprising:
a graphics processing unit (GPU) comprising a tessellation unit, the tessellation unit configured to:
divide a domain into a plurality of portions, wherein at least one of the portions is a contiguous portion;
output domain coordinates of a plurality of primitives within a first diagonal strip that is within the contiguous portion, wherein at least two primitives within the first diagonal strip do not share any vertices;
output domain coordinates of a plurality of primitives within a second diagonal strip that is within the contiguous portion, wherein the second diagonal strip is one of parallel with the first diagonal strip or tangent with the first diagonal strip, wherein at least two primitives within the second diagonal strip do not share any vertices, wherein when the second diagonal strip is parallel with the first diagonal strip, the first diagonal strip and the second diagonal strip start from a same axis of the domain and extend outwards in a same direction, and wherein when the second diagonal strip is tangent with the first diagonal strip, the second diagonal strip includes one primitive that shares two vertices with one primitive of the first diagonal strip, none of remaining primitives within the second diagonal strip share two vertices with any remaining primitives within the first diagonal strip, and at least one primitive within the second diagonal strip shares no vertices with any of the primitives within the first diagonal strip; and output domain coordinates of a plurality of primitives within a third diagonal strip that is within the contiguous portion, wherein at least two primitives within the third diagonal strip do not share any vertices, wherein the third diagonal strip is parallel with at least the first diagonal strip, starts from the same axis as the first diagonal strip, and extends outwards in the same direction as the first diagonal strip, and wherein a number of primitives within the third diagonal strip is different than a number of primitives within the first diagonal strip and the second diagonal strip; and a reuse buffer configured to store patch coordinates that correspond to one or more of the outputted domain coordinates of primitives within the first, second, and third diagonal strips.

14. The device of claim 13, further comprising:

a processing unit configured to select a mode of operation from a plurality of different modes of operation based at least in part on a number of storage slots within the reuse buffer, wherein each mode of the different modes of operation indicates a different manner in which to output the domain coordinates within the contiguous portion of the domain, and wherein the tessellation unit is configured to divide the domain based on the selected mode of operation.

15. The device of claim 13, further comprising:

a processing unit configured to determine whether at least one tessellation factor plus one is less than or equal to a number of storage slots in the reuse buffer minus two, wherein, when the domain is a quad domain, the at least one tessellation factor is less than or equal to another tessellation factor of the quad domain, wherein the tessellation unit is configured to divide the domain into two portions when the at least one tessellation factor plus one is less than or equal to the number of storage slots in the reuse buffer minus two, and wherein the tessellation unit is configured to output the domain coordinate of primitives within the second diagonal strip that is tangent with the first diagonal strip when the at least one tessellation factor plus one is less than or equal to the number of storage slots in the reuse buffer minus two.

16. The device of claim 15, wherein the tessellation unit is configured to:
  output domain coordinates of primitives within a fourth diagonal strip; and
  output domain coordinates of primitives within a fifth diagonal strip, and
wherein the fifth diagonal strip is a mirror opposite of the fourth diagonal strip.

17. The device of claim 15, wherein, when the domain is a quad domain, the tessellation unit is configured to divide the domain into two halves, wherein, when the domain is a triangle domain, the tessellation unit is configured to divide the domain into a one-third portion and a two-thirds portion, and wherein the two-thirds portion comprises the contiguous portion.

18. The device of claim 13, further comprising:

a processing unit configured to determine whether at least one tessellation factor divided by two plus one is less than or equal to a number of storage slots in the reuse buffer minus one, wherein, when the domain is a quad domain, the at least one tessellation factor is less than or equal to another tessellation factor of the quad domain, wherein the tessellation unit is configured to divide the domain into four portions when the domain is the quad domain and when the at least one tessellation factor divided by two plus one is less than or equal to the number of storage slots in the reuse buffer minus one, wherein the tessellation unit is configured to divide the domain into three portions when the domain is a triangle domain and when the at least one tessellation factor divided by two plus one is less than or equal to the number of storage slots in the reuse buffer minus one, and wherein the tessellation unit is configured to output the domain coordinates of primitives within the second diagonal strip that is parallel with the first diagonal strip when the at least one tessellation factor divided by two plus one is less than or equal to the number of storage slots in the reuse buffer minus one.

19. The device of claim 13, further comprising:

a processing unit configured to determine that a first tessellation factor is less than or equal to a second tessellation factor, wherein the tessellation unit is configured to output the domain coordinates of the primitives within the first diagonal strip, output the domain coordinates of the primitives within the second diagonal strip, and output the domain coordinates of the primitives within the third diagonal strip starting from an axis of the domain that corresponds to the first tessellation factor and extending outwards.

20. The device of claim 13, further comprising:

a processing unit configured to determine whether at least one tessellation factor divided by two plus one is greater than a number of storage slots in the reuse buffer minus one, wherein, when the domain is a quad domain, the at least one tessellation factor is less than or equal to another tessellation factor of the quad domain, wherein, when the at least one tessellation factor divided by two plus one is greater than the number of storage slots in the reuse buffer minus one, the tessellation unit is configured to:
  output domain coordinates of primitives within the first diagonal strip that is within a first contiguous portion;
  output domain coordinates of primitives within the second diagonal strip that is parallel with the first diagonal strip and that is within the first contiguous portion;
  output domain coordinates of primitives within the third diagonal strip that is within the first contiguous portion,
  output domain coordinates of primitives within a fourth diagonal strip that is within a second contiguous portion;
  output domain coordinates of primitives within a fifth diagonal strip that is within the second contiguous portion, wherein the fifth diagonal strip is tangent with the fourth diagonal strip; and
  output domain coordinates of primitives within a sixth diagonal strip that is within the second contiguous portion, wherein the sixth diagonal strip is parallel with the first diagonal strip.

21. The device of claim 13, further comprising:

a processing unit configured to determine that a first part of the domain is non-uniform tessellated, and determine that a second part of the domain is uniform tessellated, wherein the tessellation unit is configured to divide the second part of the domain into the plurality of portions.

22. The device of claim 21, wherein the first part of the domain comprises an outer ring of the domain, and where the tessellation unit is configured to output domain coordinates of primitives within the outer ring of the domain.

23. The device of claim 13, further comprising:
a controller configured to:
receive the domain coordinates for the primitives within the first, second, and third diagonal strips;
determine whether the reuse buffer stores the patch coordinates that correspond to the domain coordinates for the primitives within the first, second, and third diagonal strips; and
execute one or more instantiations of a shader based on the determination of whether the reuse buffer stores the patch coordinates that correspond to the domain coordinates for the primitives within the first, second, and third diagonal strips.

24. The device of claim 13, wherein the device comprises one of a mobile wireless device, a video gaming console that includes a video display, a mobile video conferencing unit, a laptop computer, a desktop computer, a tablet computer, and a television set-top box.

25. A device comprising:
a graphics processing unit (GPU), the GPU comprising:
means for dividing a domain into a plurality of portions, wherein at least one of the portions is a contiguous portion;
means for outputting domain coordinates of a plurality of primitives within a first diagonal strip that is within the contiguous portion, wherein at least two primitives within the first diagonal strip do not share any vertices;
means for outputting domain coordinates of a plurality of primitives within a second diagonal strip that is within the contiguous portion, wherein the second diagonal strip is one of parallel with the first diagonal strip or tangent with the first diagonal strip, wherein at least two primitives within the second diagonal strip do not share any vertices, wherein when the second diagonal strip is parallel with the first diagonal strip, the first diagonal strip and the second diagonal strip start from a same axis of the domain and extend outwards in a same direction, and wherein when the second diagonal strip is tangent with the first diagonal strip, the second diagonal strip includes one primitive that shares two vertices with one primitive of the first diagonal strip, none of remaining primitives within the second diagonal strip share two vertices with any remaining primitives within the first diagonal strip and at least one primitive within the second diagonal strip shares no vertices with any of the primitives within the first diagonal strip; and
means for outputting domain coordinates of a plurality of primitives within a third diagonal strip that is within the contiguous portion, wherein at least two primitives within the third diagonal strip do not share any vertices, wherein the third diagonal strip is parallel with at least the first diagonal strip, starts from the same axis as the first diagonal strip, and extends outwards in the same direction as the first diagonal strip, and wherein a number of primitives within the third diagonal strip is different than a number of primitives within the first diagonal strip and the second diagonal strip.

26. A non-transitory computer-readable storage medium comprising instruction stored thereon that when executed cause one or more processors to:
divide a domain into a plurality of portions, wherein at least one of the portions is a contiguous portion;
output domain coordinates of a plurality of primitives within a first diagonal strip that is within the contiguous portion, wherein at least two primitives within the first diagonal strip do not share any vertices;
output domain coordinates of a plurality of primitives within a second diagonal strip that is within the contiguous portion, wherein the second diagonal strip is one of parallel with the first diagonal strip or tangent with the first diagonal strip, wherein at least two primitives within the second diagonal strip do not share any vertices, wherein when the second diagonal strip is parallel with the first diagonal strip, the first diagonal strip and the second diagonal strip start from a same axis of the domain and extend outwards in a same direction, and wherein when the second diagonal strip is tangent with the first diagonal strip, the second diagonal strip includes one primitive that shares two vertices with one primitive of the first diagonal strip, none of remaining primitives within the second diagonal strip share two vertices with any remaining primitives within the first diagonal strip, and at least one primitive within the second diagonal strip shares no vertices with any of the primitives within the first diagonal strip; and
output domain coordinates of a plurality of primitives within a third diagonal strip that is within the contiguous portion, wherein at least two primitives within the third diagonal strip do not share any vertices, wherein the third diagonal strip is parallel with at least the first diagonal strip, starts from the same axis as the first diagonal strip, and extends outwards in the same direction as the first diagonal strip, and wherein a number of primitives within the third diagonal strip is different than a number of primitives within the first diagonal strip and the second diagonal strip.

* * * * *